(12) United States Patent
Cai

(10) Patent No.: US 9,780,856 B2
(45) Date of Patent: Oct. 3, 2017

(54) SYSTEM AND METHOD FOR SPATIAL ON SUB-BAND MASSIVE MIMO/BFN TO PROVIDE A LARGE NUMBER OF ORTHOGONAL CHANNELS

(71) Applicant: HON HAI PRECISION INDUSTRY CO., LTD., New Taipei (TW)

(72) Inventor: Khiem Van Cai, Placentia, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 93 days.

(21) Appl. No.: 14/804,936

(22) Filed: Jul. 21, 2015

(65) Prior Publication Data

US 2016/0211898 A1    Jul. 21, 2016

Related U.S. Application Data

(60) Provisional application No. 62/104,441, filed on Jan. 16, 2015, provisional application No. 62/104,458, filed on Jan. 16, 2015.

(51) Int. Cl.
| | |
|---|---|
| *H04B 7/06* | (2006.01) |
| *H04L 5/00* | (2006.01) |
| *H04W 64/00* | (2009.01) |
| *H04W 72/02* | (2009.01) |
| *H04B 7/0413* | (2017.01) |

(Continued)

(52) U.S. Cl.
CPC ......... *H04B 7/0617* (2013.01); *H04B 7/0413* (2013.01); *H04L 5/00* (2013.01); *H04W 64/00* (2013.01); *H04W 72/02* (2013.01); *H04W 28/06* (2013.01); *H04W 28/18* (2013.01); *H04W 72/0453* (2013.01); *H04W 72/082* (2013.01)

(58) Field of Classification Search
CPC .... H04B 7/024; H04B 7/0408; H04B 7/0617; H04J 11/003; H04L 25/03891; H04L 25/03898; H04L 25/03949; H04W 16/28; H04W 72/0453; H04W 72/082
See application file for complete search history.

(56) References Cited

U.S. PATENT DOCUMENTS

| | | | |
|---|---|---|---|
| 2005/0041750 A1* | 2/2005 | Lau | H04L 25/0242 375/267 |
| 2010/0054196 A1* | 3/2010 | Hui | H04W 16/00 370/329 |

(Continued)

*Primary Examiner* — Benjamin H Elliott, IV
(74) *Attorney, Agent, or Firm* — Steven Reiss

(57) ABSTRACT

Systems, methods, and computer-readable storage devices relate to a process for beamforming in a system. An available spectrum is divided into M sub-bands, with each of the M sub-bands having N beams. The system, through using M×N available beams, can maintain frequency domain and spatial domain orthogonality. A method includes receiving a direction indicating a location of a device relative to a transmitter and selecting a beam from the M×N beams. The beam can be a data beam for transmitting data to the device or a null to suppress interference. The bandwidth, spectrum and/or direction associated with the beam can be chosen and/or varied based on one of any number of parameters such as avoiding channel distortions, reducing mismatch in amplitude and/or delay, and adapting to a data type or data amount. Frequency assignments can be staggered through a cell-based region to reduce cell interference in assigning beams.

46 Claims, 31 Drawing Sheets

(51) Int. Cl.
*H04W 72/04* (2009.01)
*H04W 72/08* (2009.01)
*H04W 28/06* (2009.01)
*H04W 28/18* (2009.01)

(56) References Cited

U.S. PATENT DOCUMENTS

| | | | | |
|---|---|---|---|---|
| 2011/0013603 | A1* | 1/2011 | Li | H04B 7/0602 370/338 |
| 2013/0170578 | A1* | 7/2013 | Wu | H04B 7/0426 375/295 |
| 2013/0215989 | A1* | 8/2013 | Miyatani | H04B 7/0617 375/267 |
| 2014/0341310 | A1* | 11/2014 | Rahman | H04B 7/0408 375/260 |
| 2015/0372737 | A1* | 12/2015 | Park | H04W 16/28 370/329 |
| 2016/0149617 | A1* | 5/2016 | Zhu | H04B 7/043 375/267 |

* cited by examiner

SUB-BAND MMIMO/BFN

SNR FOR THE SUB-BAND MMIMO/BFN ALGORITHM

SYSTEM AND METHOD FOR SPATIAL ON SUB-BAND MASSIVE MIMO/BFN TO PROVIDE A LARGE NUMBER OF ORTHOGONAL CHANNELS

PRIORITY CLAIM

This application claims priority to U.S. Provisional Patent Application No. 62/104,441, filed on 16 Jan. 2015, and to U.S. Provisional Patent Application No. 62/104,458, filed on 16 Jan. 2015, the contents of each of which are herein incorporated by reference in their entireties.

BACKGROUND

1. Technical Field

The present disclosure relates to beamforming and more specifically to providing improved communication using frequency sub-units which can be chosen based at least in part on a level of mismatch between an amplitude differential and a group delay differential within a given frequency sub-unit. The disclosed concepts will provide a large number of orthogonal channels that can be assigned to a mobile communication network, and support a large number of users. The disclosed techniques are well-suited for point-to-multipoint cellular communications, and are applicable to one or more of a base station, remote radio head (RRH), Evolved Node B (eNB), mobile devices, user equipment, or other devices.

2. Introduction

Beamforming is a known feature within communication systems in which an array of transmission antennas are used to form respective beams or transmitted signals such that, in given directions, the signals experience constructive interference while in other directions, destructive interference cancels the signal. The traditional concept for Massive Multiple-Input and Multiple-Output/Beam Form Nulling (MMIMO/BFN) is to handle the signal processing over the composite spectrum such as 200 MHz or 1 GHz. The composite beam is targeted for a unique direction. For the traditional MMIMO/BFN technique, the MMIMO device generates N beams; each beam addressing a group of user equipment terminals (UE's) at a location or area.

The beamforming device, such as a base station, mobile station, remote radio head or any other device, transmits one of the N beams of focused energy in a particular direction rather than sending an omnidirectional signal in all directions. The traditional MMIMO/BFN beams can be processed with either digital or analog phased array techniques. The MMIMO/BFN technique, when used for wideband signals in a Point to Multipoint communication system, faces many limitations. For example, with respect to the accuracy and controllability of a beam or a null, the traditional approach can provide high accuracy if implemented in the digital domain but it has a low accuracy if an analog phased array is used. With a wideband composite signal, the system has difficulty with transmission and antenna calibration. The system experiences gain and group delay variation over the wide bandwidth as shall be explained below.

Channels can be dependent on cell frequency and location. One challenge is that multipath characteristics can be different for each cell area and the composite spectrum solution and/or phased array antenna schemes will have a low signal-to-noise ratio. With wide bandwidth beams, interference at surrounding cells is a strong possibility and in an effort to suppress such interference, the system may create a wideband null that also can cause unintended interference. The number of orthogonal channels available in a traditional system is bounded to be a small number and is based on the number of antennas. Further, the antenna gain is low and it is difficult to do gain control over the wide spectrum.

In another aspect of beamforming, the data to be transmitted is meant for a particular device at a known location. Transmitting an omnidirectional signal thus wastes much energy as it projects electromagnetic signals in all directions, where the device which is to receive and decode the signal is only at one location in a known direction from the transmitting device. The transmitting device, by using beamforming, can control the phase and relative amplitude of the signal from each transmitting antenna in order to create a wavefront with the energy focused in a particular beam at a chosen direction (to the receiving device) and not in all directions.

Beamforming has been applied in various forms in standards such as 2G, 3G, 3G Evolution (LTE). It is expected that beamforming will be part of more advanced standards such as the 4G and 5G standards.

SUMMARY

The disclosure herein provides multiple solutions to the limitations of traditional MMIMO/BFN. The developing 5G standard will use beamforming to improve the efficiency of the communication system and to increase the ability to service more user devices. The present disclosure discloses a beamforming technique which achieves this goal and will provide an improved fundamental approach to beamforming in 5G or any other industry standard.

The disclosed approach is called spatial on sub-band Massive multiple-input and multiple output/beam form nulling (SS MMIMO/BFN) and addresses a number of the problems outlined above by using narrower sub-bands. For example, using the SS MMIMO/BFN approach, the accuracy of beam and null control is very high because the transmission and antenna calibration control is each for narrower sub-bands. To address the issue of gain and group delay found in wideband systems, the sub-band approach results in beam patterns that are at different frequencies which have reduced distortion. The SS MMIMO/BFN system can provide a more individual solution for each cell by providing a unique frequency at a location and which will result in a high signal-to-noise ratio. The SS MMIMO/BFN system can provide permuted or staggered frequency patterns to alleviate interference in surrounding cells. By creating narrowband nulls in a particular direction, spectrum is not wasted. Further, the SS MMIMO/BFN system will enable a high number of orthogonal channels at a higher gain.

The present disclosure combines frequency orthogonality (via filtering) and spatial orthogonality (via the array of antennas) to substantially increase the number orthogonal channels. Each orthogonal channel can be assigned to a cell with many users within the cell. The disclosure introduces a design of a Massive MIMO system, located at the eNB, mobile device or other device, which can communicate to another device or to all users at the assigned frequencies, and to reject the interference at the jamming frequencies and directions.

The technique exploits the orthogonal properties in both the frequency domain and spatial domain: on the down-link, instead of applying MMIMO/BFN on the composite bandwidth, the system performs MMIMO/BFN on sub-bands (or carriers) before adding the MIMO signals in the digital domain and before transmitting the signal at the antennas. The approach effectively increases the number of users and achieves high performance gain. The process on the up-link path is similar, but in reverse.

The technique also shows the ability to effectively suppress interference signals by creating narrow-band nulls without wasting the whole spectrum in that direction. In this regard, the system can tailor the null beam bandwidth according to the interference bandwidth. Alternatively, the flexible structure of the SS-MMIMO/BFN system allows the RRH, eNB, or other device to alleviate the interference by not assigning the same frequency on the direction of interference.

Interference from border cells or surrounding cells has been a major issue for cellular communication systems. The disclosure also shows a technique of sub-band permutation or staggering to maximize the Euclidean distance between cells having the same frequency. The use of permutation or staggering has demonstrated the ability to alleviate the bordering/surrounding cell interference.

The disclosed techniques will work well in non-line-of-sight or rich scattering environments since the bandwidth is narrow. The SS MMIMO/BFN system transmits beams that are less sensitive to antenna and channel mismatching. The advantages include less gain loss on beam forming, deeper beam nulls, and less interference between neighboring groups of user equipment terminals.

Disclosed are a number of different examples related to beamforming techniques. The first example is a specific sub-band MIMO/BFN approach. Systems, methods and computer-readable media can provide a beamforming technique which enables the system to create beams each having a frequency sub-band from a plurality of frequency sub-bands such that each beam is associated with a different frequency or a different direction to enable each beam to be orthogonal (e.g., the respective beams do not interfere with each other). An example method example will illustrate the approach.

A method can include partitioning a frequency spectrum into M sub-bands, and assigning N beams for each of the M sub-bands. Based on a recipient device location relative to a cell, the system can select a chosen beam from the N beams and transmit data from a transmitter to the recipient device via the chosen beam. The partitioning, of course, can be done in advance by the system such that a transmitter can transmit data on a chosen beam to a recipient device. Each of the M sub-bands can cover a same frequency range or at least one sub-band can cover a different frequency range from at least one other sub-band of the M sub-bands. Choosing beams as disclosed herein can provide both frequency domain orthogonality and spatial domain orthogonality and thus provide for a larger number of orthogonal channels.

Nulling can also be an aspect of the method in that a beam can be transmitted that is structured in terms of at least one of its bandwidth, direction, and frequency to suppress an interfering signal or to reduce inter-cell interference with another beam of the N beams. Next is disclosed another example related to utilizing frequency sub-units chosen from a plurality of sub-units.

In another aspect of this disclosure, systems, methods, and computer-readable media can provide a beamforming technique which enables the system to choose, from a plurality of frequency sub-units, a frequency sub-unit whose characteristics are better, relative to the respective characteristics of other frequency sub-units, for use when transmitting according to a beamforming strategy. An example method will illustrate the approach.

Assume that there is an available composite frequency spectrum of 200 MHz for use in transmitting data from a first device to a second device. Next, assume that the 200 MHz frequency spectrum is divided into 20 sub-units of 10 MHz each. Beamforming is achieved using multiple antennas to transmit a differently phased signal with a controlled amplitude from each antenna such that the signals cancel at certain directions and add in other directions to create the beam. Although the frequency spectrum of 200 MHz is used to illustrate the possible examples throughout this disclosure, one of ordinary skill in the art will recognize that any other frequency ranges, or bands may be used. For example, in some embodiments, a wide bandwidth of 500 MHz-1 GHz may be divided into multiple sub-units. Other frequency bands such as various bands in the centimeter wave (cmW) or millimeter wave (mmW) ranges may also be used. Similarly, the transmitted spectrums may be divided into any number of fixed or variable sub-units other than 20. Assume in this example, that 4 antennas are used for beamforming, although any number of antennas is contemplated.

Across the entire 200 MHz spectrum and across the different antennas, the amplitude and phase are not always perfect. The amplitude of the signals transmitted from each of the 4 antennas in this example can be different or vary from the desired amplitude across the 200 MHz spectrum to create an efficient beam. Further, the phase desired may not be fully accurate across the entire spectrum. If the desired phase signals transmitted from antenna 1 and antenna 2 are not accurate in a portion of the 200 MHz spectrum, then the cancellation and additive features in that portion of the spectrum will not perform as desired and thus energy is wasted and interference can occur. FIGS. 3A-3D, 4A-4D and 5A-5H, described more fully below, illustrate the point. When the amplitude differential and/or the group delay differential is relatively large, a mismatch can exist between respective signals transmitted from different antennas. Such a mismatch can decrease the efficiency of the system at particular subintervals across the spectrum.

The present disclosure addresses the issue of such a mismatch by dividing the spectrum up into a plurality of frequency sub-units such that the system can select an appropriate sub-unit for use and beamforming. There are several examples. One example relates to functions that occur on a first device such as a base station or remote radio head. The first device is generally considered the device that is stationary and communicates with a number of different second devices, which can be mobile user equipment or the like. Another example covers functions occurring on the second device, such as mobile user equipment, which relates to the beamforming concept. The second example can include data that is transmitted to the first device for improving the selection of a frequency sub-unit and how the beam is formed and data is transmitted from the first device to the second device.

The functions can also be switched in the sense that the second device can perform the steps set forth below with respect to beamforming and transmitting data to the stationary first device. Thus, the functions in this disclosure can occur either on a stationary device or a mobile device.

An example method includes operations including receiving data to be transmitted from a first device to a second device, receiving a direction indicating a location of the second device relative to the first device, a parameter associated with a data amount, and a selection of a frequency sub-unit chosen from a plurality of frequency sub-units across an available frequency spectrum. The method can occur in the context, for example, in which the user of the second device, which could be a mobile device, turns on the second device and selects an application. Based on the data needs for that application, the second device, connected via a network to the Internet, can transmit data to and receive data from the first device. The first device could be, for example, a base station.

The selected frequency sub-unit is preferably chosen based at least in part on one or more factors related to the above user activity and application chosen for which data will be transmitted. These factors can include one or more of the following parameters: the data type (e.g., is the second device using a texting application (low data volume and high latency tolerance), a video application (high data volume and low latency tolerance), or a phone call (low volume data, low latency tolerance)), the application chosen by a user of the second device that requires data transmission/reception, a latency parameter, the mismatch between an amplitude differential and the group delay in the frequency sub-unit, the direction, a range desired, a distance between the first device and the second device, attenuation due to water vapor and/or carbon dioxide, a priority of the user of the second device, and a priority associated with the data (e.g., a phone call having a higher priority than a texting application). Other parameters in any combination are also contemplated.

The system then transmits, in a beamforming manner, the data from the first device to the second device in the direction using the selected frequency sub-unit. The method improves the efficiency of the beamforming technique by enabling the system to determine a beneficial frequency sub-unit based on one or more of the above factors. It is preferable that one of the factors be the mismatch between one of the amplitude differential and the group delay. However, it is not a requirement that the mismatch be part of the selection of a frequency subunit. The amplitude differential is associated with different amplitudes of different signals transmitted from different antennas from the first device. The group delay differential is associated with phase delay differences between the different signals transmitted from the different antennas from the first device. Any one or more of factors could be used as a basis for selecting a particular frequency sub-unit.

Other features also applicable to this first example include the selected frequency sub-unit being either fixed or variable in the portion of the spectrum of the available frequency spectrum. For example, the 200 MHz of spectrum may not be divided into 20 equal frequency sub-units of 10 MHz each, but could be divided into 10 sub-units of unequal widths. The system could also be flexible in terms of the number of frequency sub-units in the plurality of sub-units that are selected for a particular data transmission. For example, a 320 MHz bandwidth can be divided up into 16 sub-bands of 20 MHz each, and a MMIMO antenna array may provide 12 orthogonal beams per sub-band, thus totaling 192 orthogonal channels.

The system can further select more than one sub-unit. If the data amount/type need calls for a higher bit rate than one frequency data sub-unit can deliver, then the system could select two frequency data sub-units, more than two frequency sub-units, or up to all of the frequency sub-units in the plurality of frequency sub-units. Where two or more frequency sub-units are selected, they can either be contiguous or non-contiguous frequency sub-units. Where three or more frequency sub-units are selected, the three sub-units can be contiguous, non-contiguous, or a combination of contiguous and non-contiguous.

In another aspect, the particular set of frequencies covered in a selected frequency sub-unit can be variable. Across the entire available spectrum of 200 MHz, there will be variability of the mismatch between the amplitude differential and the group delay. The system could have a sliding window of frequency sub-unit such that a more closely tailored frequency sub-unit could be determined for an optimal or preferred window size and chosen spectrum. For example, consider a system operating in the millimeter frequency range with transmissions between 70.0 GHz and 70.2 GHz (a 200 MHz frequency range in the millimeter wavelength). In one scenario, the frequency sub-units would be fixed and start with a first sub-unit at 70.00 GHz-70.01 GHz, a second frequency sub-unit at 70.01 GHz-70.02 GHz, and so forth. In this windowing example, the chosen frequency sub-unit can be any width (e.g., 12.5 MHz), and at any location along the spectrum (e.g., at 70.54 GHz-70.665 GHz). This particular location and size on the spectrum can correlate to or be chosen based on one or more of the factors disclosed herein. For example, the user might require a high data throughput, and thus a wide frequency sub-unit may be created and a portion along the frequency spectrum where the mismatch is at a minimum along that size of spectrum may be chosen. The beam may then be formed for transmission to the device associated with the user and utilize that created frequency sub-unit.

The first device can be a base station or a mobile station and the second device can be a mobile device. However, other examples can apply as well where the first device can be a mobile device and the second device can be a base station. Both devices could be base stations as well. In other scenarios, both the first device and the second device can be mobile devices. In such a case where both devices are mobile devices, the frequency at which the beamforming sub-units are switched to transmit data could increase given the potential for constantly and rapidly changing directions of the relative position of one device to the other.

In an alternate feature, inasmuch as beamforming requires more than one antenna, the "device" or system disclosed herein could encompass physical separate devices each with one or more antennas. Therefore, two mobile devices, each with 4 antennas, could coordinate beamforming such that 8 total antennas are used to perform the beamforming techniques. They could communicate between each device using Bluetooth or some other wireless protocol but coordinate via known information about their location relative to one another such that their combined antennas act as a single array. A stationary device and a mobile device could also coordinate to create a larger array that is used for beamforming.

The parameter associated with the data amount/type can relate to an application on the second device chosen by a user, the application requiring the data. For example, the user may open up a texting application or a video on-demand application on the second device. The second device can transmit a parameter indicating which application is going to be used and thus decisions need to be made regarding which frequency sub-unit(s) to select to handle the required data associated with that application.

The selected frequency sub-unit can be selected based on at least one of a direction, a data amount or type, a latency parameter, an application chosen for use on the second device, a priority of the second device, atmospheric conditions (e.g., temperature, humidity, rain in a particular direction, etc.), a distance between the first device and the second device, a location of an interfering signal, predicted needs or changes in the future after transmission is to begin, and a mismatch between an amplitude differential and a group delay differential. The amplitude differential can be associated with different amplitudes of different signals transmitted from different antennas from the first device. The group delay differential can be associated with phase delay differences between the different signals transmitted from the different antennas from the first device.

The selected frequency sub-unit can be one of a fixed frequency width or a variable frequency width. For example, the frequency width can be fixed at 10 MHz or range from 2 MHz to 20 MHz depending on the data needs. The selected frequency sub-unit can have one of a fixed frequency range and a variable frequency range. In this case, the range could be set in advance or could involve a variable approach where a sliding window is used to identify the appropriate frequency range for the selected frequency sub-unit. In an example, a set of frequencies within the selected frequency unit can be chosen based on a mismatch between an amplitude parameter and a group delay parameter across the available frequency spectrum. The amplitude parameter can include an amplitude differential which identifies differences in amplitude between a first signal transmitted from a first antenna and a second signal transmitted from a second antenna. The group delay parameter can include a group delay differential which identifies a difference in phase delay from the first signal and the second signal.

The bandwidth of a particular chosen sub-unit for transmission can also change dynamically in the middle of a transmission. In other words, if the application selected on a mobile device is a video streaming application, the system may begin streaming data using a 20 MHz frequency sub-unit but due to any number of parameters monitored after the first time of beginning the streaming, the system could change the bandwidth up or down.

The set of frequencies within the selected frequency sub-unit can be chosen based on characteristics of the mismatch between the amplitude differential and the group delay differential.

Another aspect of this example is the creation of nulls in particular directions from the first device. A null or nullity is created by transmitting in a certain direction signals that cancel each other out and thus result in no signal or very little signal in a chosen direction. The purpose of creating nullities is to avoid interference from a device in the particular direction. The device may be on a different network, or be interfering with signals transmitted from the first device. Thus, the system can identify the direction of the offending device and transmit or create a nullity along the path leading to the device. All of the characteristics associated with transmission signals in a beamforming manner can apply to creating a nullity in that the nullity is a beam of signals transmitted such that rather than being additive in particular directions, the parameters such as amplitude and phase are coordinated such that the signals cancel each other out in particular directions.

The selection of the frequency sub-unit can be based in part on a parameter associated with how the first device can equalize any mismatch in frequencies associated with the selected frequency sub-unit between an amplitude parameter and a group delay parameter. Depending on the characteristics of the mismatch, the amount of energy needed, and/or other factors, the ease of equalizing or compensating for the mismatch can have different requirements. In other words, for one 10 MHz span of frequencies within the available range for 200 MHz, it might take less energy to compensate for the mismatch than it would take for a different 10 MHz span. The system can identify these differences in costs for performing compensation or correlation to adjust for the mismatches and select the preferred frequency sub-unit. Or, as noted herein, the system could create a preferred frequency sub-unit having a selected set of frequencies and a width based on one or more factors, which can include the cost of compensation. In this regard, a first potential frequency sub-unit might have a lower mismatch value than a second potential frequency sub-unit, but the second potential frequency sub-unit might have a lower cost to perform compensation than the first potential frequency sub-unit. In this case, the system could select the second potential frequency sub-unit for use in transmitting data via beamforming.

The data is often transmitted in a stream of data and thus can be considered as having different portions. For example, if the first device is transmitting a large amount of data to the second device, it may transmit a first portion of the data via the beamforming technique using the selected frequency sub-unit. However, circumstances can change in the environment. Movement of the second device, the introduction of interfering devices or terrain, changes in atmospheric conditions, change in data requirements, and so forth, can cause the system to switch the transmission from the selected frequency sub-unit to another frequency sub-unit. Similarly, the system might switch from using 2 frequency sub-units to only using 1 frequency sub-unit or to start using 4 frequency sub-units. The system can also maintain using a single frequency sub-unit but switch the set of frequencies used or the width of the chosen frequency sub-unit. Once the change is made to the use of frequency sub-units, the system then transmits a second portion of the data to the second device using the newly configured frequency sub-unit(s).

In another aspect, rather than switching sub-units, the system, if it experiences interference, can determine a subset of frequencies within the selected frequency sub-unit that experiences the interference. In some cases, for example, if the width of the frequency sub-unit is, for example, 10 MHz, the width of an interfering signal can be 1 MHz. The system can excise the subset of frequencies within the selected frequency sub-unit when transmitting the data. In this case, the system could carve out of the spectrum within the frequency sub-unit the offending set of frequencies associated with the interference and continue to transmit the data.

In another aspect, the system can receive a selection of a second frequency sub-unit chosen from the plurality of frequency sub-units to yield a second selected frequency sub-unit. Then, transmitting the data further can include transmitting the data, via the beamforming technique, from the first device to the second device at the data amount/type and using the selected frequency sub-unit and the second selected frequency sub-unit. The selected frequency sub-unit and the second selected frequency sub-unit can have a contiguous frequency range or a non-contiguous frequency range.

One example relates to processes performed on the mobile device or a user device. The user would first turn on the device and would select a mode or an application. For example, the user would select on their iPhone® or Samsung® device or tablet, an application such as a texting application, an email application, a phone application, an Internet browser, a game, another type of application, etc. Each of these applications would have an expected upload and download requirements for data. A texting application would require much less download data than a streaming video application. Parameters/data is transmitted from the device to a remote radio head or base station. The data can include location of the device to determine a direction for the device relative to the remote radio head. The remote radio head will determine an assignment of frequency sub-unit(s) or request the assignment from an Evolved Packet Core (EPC), gateway, or other device. The mobile device could also provide an assignment or a suggestion for frequency sub-units to use for the uplink and/or the downlink based on local data in whole or in part. The remote radio head will utilize beamforming with the selected frequency sub-unit(s) and transmit data in the beam to the user device. The user device will receive the data transmitted via a beam that is formed using selected frequency sub-units, the frequency sub-units selected based at least in part on the application-related data. The selection is preferably done based on a parameter that will reduce the need for equalization or compensation due to mismatch or other factors. The user device can also generate a selection or receive instructions on which frequency sub-unit(s) to use for uplink communication.

BRIEF DESCRIPTION OF THE DRAWINGS

FIG. 15 illustrates an example of possible frequency assignments on square cells;

DETAILED DESCRIPTION

Figure 1:
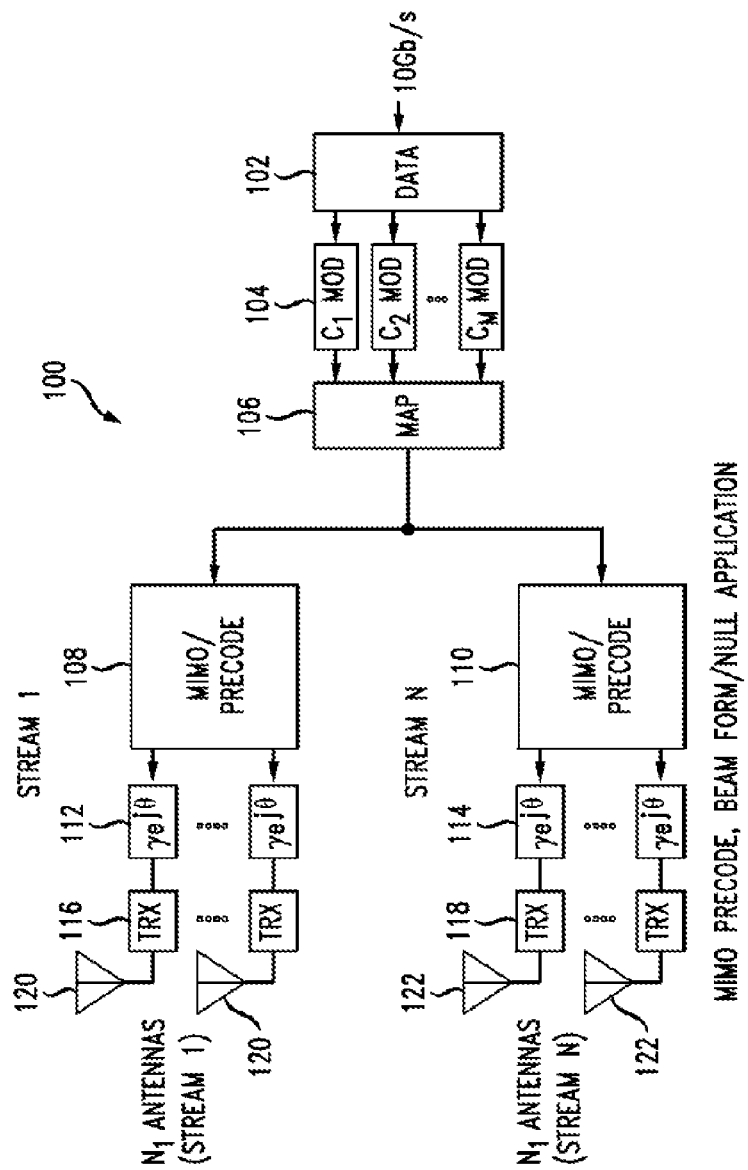
FIG. 1 illustrates a known spatial massive multiple-in and multiple-out system in which the entire signal is used for beamforming.

A system, method and computer-readable storage devices are disclosed for providing an improved beamforming approach applicable to the evolving 5G industry standard or any other approach that uses beamforming. Beamforming is anticipated to be used in 5G and as such, several requirements should be met to properly utilize beamforming. Beamforming will reduce the power needed to communicate and will extend the range of the signals. Beam nulling also may be used to avoid interference from devices. 5G will need to support a lot of user devices with a data rate in the range of 100 Mb/s. A plurality of antennas will be needed to perform beamforming. As power and processing capability become available, enough antennas (2-256, or more) will be deployed, which can enable the creation of more focused beams with fewer side lobes. Previous approaches used a single dimension of spatial separation to distinguish the beams. However, this disclosure adds another dimension of frequency to subdivide the bandwidth into smaller, more focused, and tailored sub-units chosen for particular users based on one or more factors which can enhance the system.

The approach disclosed divides the overall available spectrum into frequency sub-units such that when a particular beam is formed for communicating data from one device to another device, the system can be assigned one or more sub-units of the spectrum based on a parameter. Many different parameters are disclosed herein that drive the decision-making process for beamforming. One example parameter can be a value associated with an amount of equalization or compensation that would be used to enable the beam to be formed. One such parameter is a mismatch between an amplitude differential and a group delay. The amplitude differential relates to different amplitudes of different signals being transmitted from different antennas in an antenna array on the transmitting device. A group delay relates to a comparison of delays in phase between the different signals transmitted from the different antennas. The higher the difference between actual amplitudes and expected amplitudes, and actual delays and expected delays, the higher the mismatch between these values and thus the resulting need for equalization or compensation to properly form the beam to transmit the data from the transmission device to the receiving device. Within this disclosure are various concepts surrounding how to select frequency sub-units in such a way as to increase the signal-to-noise ratio (SNR) and render the system more efficient by reducing the amount of compensation needed.

One issue that this disclosure also addresses is interference at bordering cells. The orthogonality of the channel is an important feature required to support a multiple-access system. To achieve reliable communications, the channel needs to have low interference to allow the receiver to obtain high SNR resulting in a low bit error rate. Achieving a high SNR and low bit error rate is difficult for a composite spectrum MIMO/BFN approach due to the warping or tilting of the channel beams. In addition, beamwidth control is difficult since it is dependent on the antenna deployment and the angle of incidence. In a practical system, due to the above reasons, an antenna beam tends to cover more than the cell area, resulting in the transmitted spectrum leaking into neighboring cells. The leaking of undesired spectrum intended for one cell into another introduces interference. With a low SNR, the receiver error rate is high, which may be a limitation for this approach.

The spatial on sub-band MMIMO/BFN algorithm disclosed herein (particularly with FIG. 15 and its associated discussion) alleviates the problem of interference in bordering cells by applying the sub-band MIMO/BFN algorithm, where the frequencies are permuted or staggered to increase the Euclidean distance between the cells with the same frequency.

In the overall assessment, when transmitting wideband signals with the composite wide band MMIMO, due to the problems of amplitude and phase mismatch between antennas, and the location dependent channel characteristics, the antenna beam pattern for certain directions and/or frequencies may warp, or have undesired nulls. The problems will cause gain loss for beamforming, reduce the null depth for beam nulling, and interference to neighboring users.

The effect of the above-identified problems is alleviated with the use of spatial on sub-band MMIMO/BFN. Furthermore, the technique would enable the transmission device (e.g., eNB, base station, user equipment, mobile device, etc.) to flexibly generate a very large set of orthogonal signals to support a large number of users in a point-to-multipoint communication system. The advantages of sub-band massive MIMO/BFN include enabling the transmitting device to support a larger number of orthogonal channels for point-to-multipoint communication systems. In some examples, the system implementing the sub-band massive MIMO/BFN can support up to 10 Gb/s of data rate, a large number of UE (1,000-10,000 per RRH), and 90% power reduction. The modular nature of the sub-band massive MIMO/BFN design allows it to support legacy 3GPP signals (e.g., LTE 5-20) and be scalable for wideband systems (e.g., non-3GPP). One aspect of the disclosure also covers a receiving device that establishes communication with a remote device that is transmitting a signal according to the algorithm.

Figure 2:
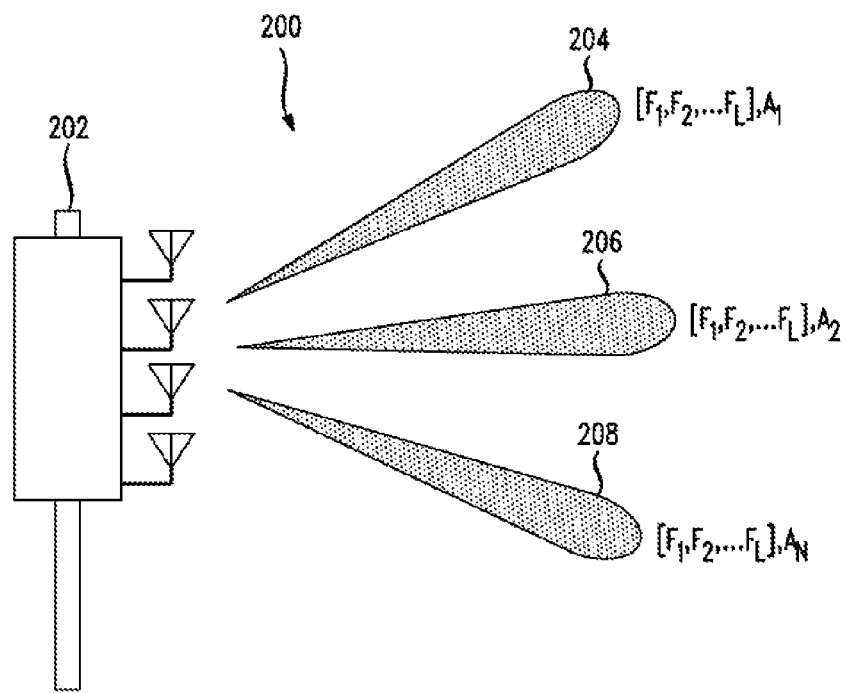
FIG. 2 illustrates the beams formed according to the system of FIG. 1 in which the entire signal is used.

This disclosure will next discuss known beamforming systems in FIGS. 1 and 2. The disclosure will then step through the principles introduced above with respect to the issues of expected amplitudes of signals versus actual amplitudes of signals, as well as expected signal delays (phase delays needed for beamforming) versus actual signal delays. This disclosure will then introduce a system or device for forming and transmitting a beam according to the principles disclosed herein using frequency sub-units. A discussion of creating nullities also is included for handling interfering devices within a transmission device's range. Examples disclosed herein include devices such as remote radio heads or base stations that include an array of antennas and communicate with a number of mobile devices. Other examples can include a mobile device or a device that provides communication for a single user to another device. Examples of a mobile device can be a smartphone, a laptop, a tablet device, or a wearable computing device. The "device" or "system" could also encompass multiple separate devices which communicate through a wireless protocol to coordinate beamforming through antennas on each separate device. For example, two mobile devices together, each with 2 antennas, could coordinate to generate a beam using the combined 4 antennas. Yet other examples disclosed herein include methods practiced on a transmitting device (whether a stationary device, such as a base station, or a mobile device, such as a smartphone) related to selecting frequency sub-units for beamforming operations. This disclosure now turns to a known beamforming system in FIG. 1.

FIG. 1 illustrates a spatial sub-band massive multiple-in and multiple-out (SS MMIMO) system 100. The signal processing in this figure moves from right to left. Data 102 is received in a bit stream at an exemplary rate of 10 gigabits per second. The data is modulated in one or more streams 104 and communicated to a mapper 106. The system processes each of the one or more streams by performing MIMO precoding, beamforming, and nulling. MIMO precoding is done as is shown in features 108, 110. Features 112 and 114 represent the signals that are generated to enable beamforming or the application of nulls. These signals have the appropriate amplitude and phases necessary to form beams having at least one of a particular signal strength, range, bandwidth, chosen direction and so forth. If applicable, signals can have amplitudes and phases to form nulls in particular directions. Final processing for transmission is illustrated as features 116, 118, and a plurality of antennas 120, 122 on each stream transmit each stream's signals accordingly.

FIG. 2 illustrates three beams 200 transmitted in a beamforming fashion. The transmitter structure and plurality of antennas are shown as feature 202. Beams 204, 206 and 208 illustrate three beams of electromagnetic energy focused in respective directions. The number of antennas associated with the transmission system 202 is preferably between 2 and 256. As the number of antennas increases, the ability of the system to transmit a focused beam of energy in a particular direction increases. Not shown in FIG. 2 is the existence of side lobes of energy, which will typically have a much shorter range than the formed beams and are to the left and/or right of any particular beam. Each of the beams 204, 206, 208 can be associated with a respective frequency $F_L$ and a direction $A_N$. The beams in FIG. 2 are meant to illustrate the general concept of beamforming and can represent wideband beams as in use or narrowband beams according to this disclosure.

As noted above, one of the challenges with wideband beamforming is the mismatch of several parameters across the spectrum. The following will provide a discussion and deeper explanation of that mismatch. FIGS. 3A-5D illustrate the concepts of amplitude mismatch and delay mismatch across a wideband spectrum. The example composite spectrum is 200 MHz, but of course could be more or less than this bandwidth. Following the discussion of wideband mismatches, FIGS. 5E-6D will then be used to address the improvement in gain mismatch and delay mismatch when sub-bands are used for beamforming. The disclosure now turns to FIG. 3A.

Figure 3A:
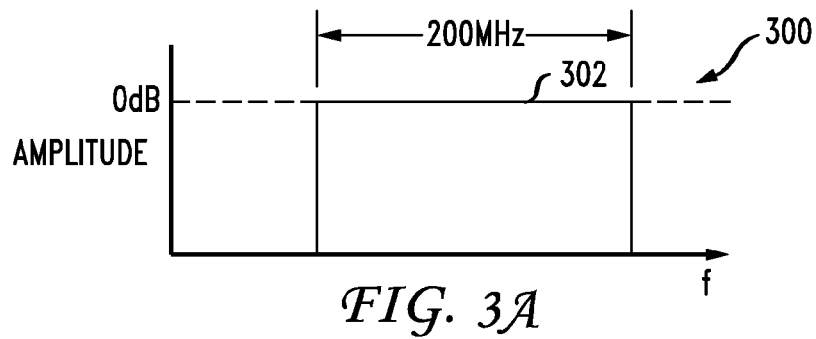
FIG. 3A illustrates the desired amplitude differential of signals transmitted from an antenna across the frequency spectrum.

FIG. 3A illustrates a graph 300 of the amplitude of a signal transmitted as part of a beam. On the horizontal axis is the frequency and on the vertical axis is the amplitude of the signal in decibels. Signal 302 is shown having a bandwidth of 200 MHz. Ideally, the beam transmitted across this frequency band would have consistent amplitudes across each frequency. However, in practice, this does not occur as shall be discussed next.

Figure 3B:
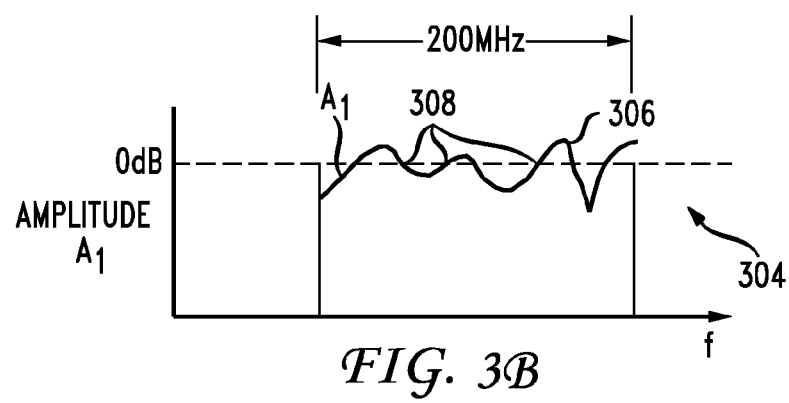
FIG. 3B illustrates a typical variation in amplitude of signals transmitted from the antenna across the frequency spectrum in a practically realizable system.

FIG. 3B illustrates a graph 304 of an example of ideal amplitudes of the signals in a band of frequencies in a beam transmitted from the antennas. Signal 306 represents the amplitude of signals transmitted from an antenna $A_1$ across the frequency band of 200 MHz. Points 308 in FIG. 3B represent several of the locations in the graph in which the amplitude 306 crosses the 0 dB threshold. As can be seen, the actual amplitude represented in FIG. 3B differs from the ideal consistent amplitude shown in FIG. 3A. It is noted that FIG. 3B represents a signal $A_1$ transmitted from a single antenna.

Figure 3C:
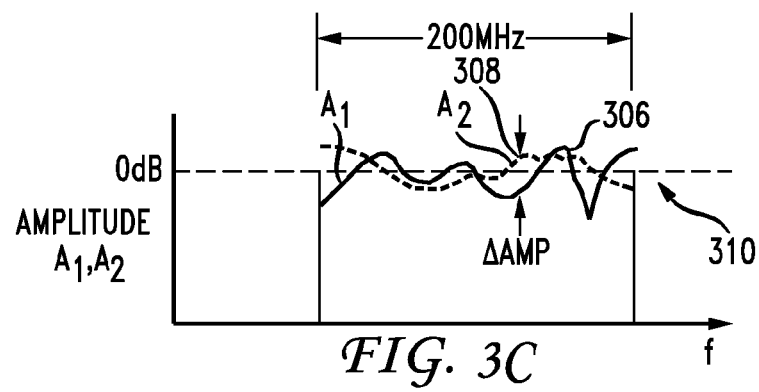
FIG. 3C illustrates a differential of the amplitude of signals transmitted from two antennas in the system.

FIG. 3C illustrates a graph 310 of the amplitudes of two signals $A_1$, $A_2$, where signal $A_1$ is transmitted from a first antenna, and signal $A_2$ is transmitted from a second antenna. Line 306 represents the first signal $A_1$ transmitted from the first antenna and line 308 represents the second signal $A_2$ transmitted from the second antenna. FIG. 3C identifies a difference between the amplitudes of signal $A_1$ and signal $A_2$. This difference in amplitude identifies a value that represents how far away the combined signal is from the ideal amplitude value represented in FIG. 3A.

Figure 3D:
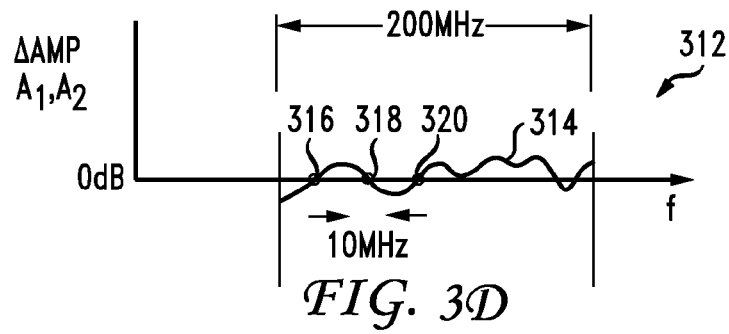
FIG. 3D illustrates a graph of the amplitude differential of the signals transmitted from the two antennas across the frequency spectrum.

This difference value is further represented in FIG. 3D. Graph 312 illustrates a signal 314 which represents, along the exemplary 200 MHz bandwidth, the difference in amplitude between signals $A_1$ and $A_2$. Graph 312 illustrates how closely along the bandwidth the difference in amplitude between the two signals is from the ideal value.

As has been noted above, in order for beamforming and null forming to properly and efficiently occur, the amplitude of signals transmitted from the various antennas need to be controlled such that the interaction of the signals at different phases is either additive or destructive such that either a beam is formed or a null is formed. To the extent that the differences between the amplitudes of the signals transmitted from the various antennas is a high value, corrective measures may need to be performed in order to ensure a successful beamforming or null forming. Accordingly, this information will be important, as is discussed further below, in the context of this disclosure.

Also shown in FIG. 3D is a point 316 at which the amplitude differential crosses the 0 dB line. An exemplary 10 MHz frequency sub-unit is shown with the point 318 at its center frequency. Note that at such a location, less amplitude differential (and similarly less group delay differential) around that frequency exists, particularly when compared with the amount of amplitude and frequency variations across the entire 200 MHz bandwidth. Other points 316 and 320 where the amplitude differential is 0 dB are also shown. One exemplary approach is to create the frequency sub-units such that the center frequency is at a crossing point of one or more parameters: the amplitude differential, the group delay differential (shown below), a mismatch, or any combination of these parameters. These are only some example parameters that can be part of the decision-making process in beamforming. The center frequency can be positioned on a crossing point, and bandwidth of any given frequency sub-unit could also then vary based on the characteristics across the spectrum. For example, the bandwidth around point 318 could be 10 MHz, but if point 320 is chosen as the center frequency, the change in the amplitude differential extending from point 320 might be more dramatic, thus resulting in the system choosing a more narrow bandwidth of 5 MHz for that frequency sub-unit because that range has less variation compared to a wider bandwidth.

Figure 4A:
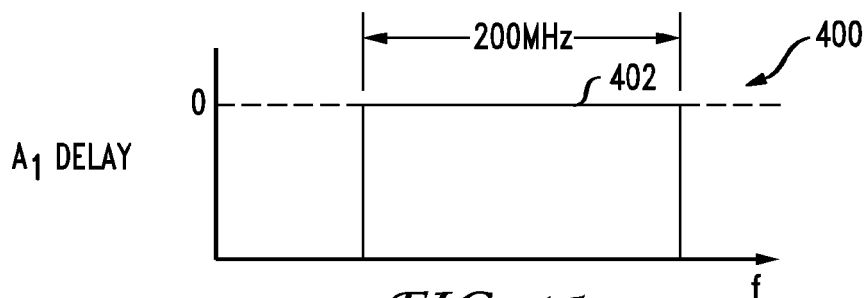
FIG. 4A illustrates the desired signal delay across the frequency spectrum for signals transmitted from an antenna.
Figure 4B:
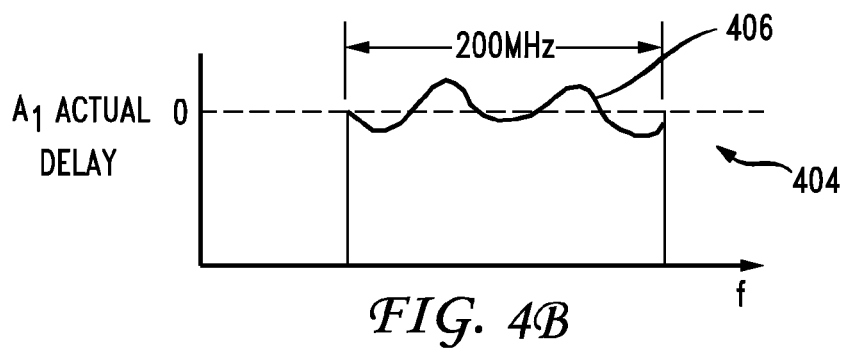
FIG. 4B illustrates the delay of signals transmitted from the antenna relative to the desired delay across the frequency spectrum.

FIG. 4A illustrates another aspect of signal processing with respect to proper beamforming and null forming. Graph 400 shows a signal 402, representing the delay of a signal $A_1$ transmitted from an antenna across the exemplary 200 MHz bandwidth, also known as a composite bandwidth. The bandwidth, however, need not be specifically 200 MHz and could be other smaller or larger bandwidths such as 320 MHz or 500 MHz. Generally the sub-bandwidths disclosed herein are in the range of single digits or tens of MHz (e.g., 5 MHz, 20 MHz or 50 MHz) and the composite bandwidth is generally considered in the hundreds of MHz (e.g., 200 MHz, 300 MHz, 500 MHz). Signal 402 is the ideal delay for the signal $A_1$. In this ideal scenario, the phase of the signal $A_1$ is exactly as expected. However, as is illustrated in FIG. 4B, graph 404 represents an example of the actual delay of signal $A_1$ transmitted from the antenna. Line 406 represents an example of the actual variation in the phase of the signal $A_1$ transmitted from the antenna in a practical system.

Figure 4C:
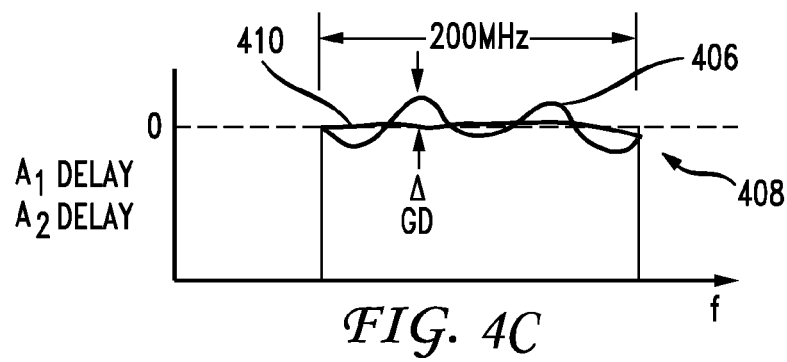
FIG. 4C illustrates a differential of the delay in transmission of signals transmitted from the two antennas in the system.

FIG. 4C illustrates graph 408 in which another exemplary actual signal $A_2$ is shown in line 410. In this case, FIG. 4C further identifies the difference in the delay between line 406 (signal $A_1$) and line 410 (signal $A_2$). This is defined as the delta group delay. In this case, where the signal $A_1$ from the first antenna and the signal $A_2$ from the second antenna differ dramatically in phase from their expected phase or necessary phase for creating the appropriate beam or null, further corrective measures may need to be taken in order to properly form the transmitted signal.

Figure 4D:
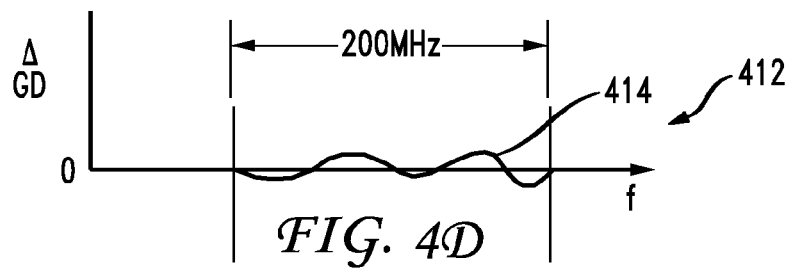
FIG. 4D illustrates a graph of the delay differential of the signals transmitted from the two antennas across the frequency spectrum.

FIG. 4D illustrates the graph of the delta group delay between the signals $A_1$, $A_2$ transmitted from two antennas. Graph 412 illustrates a line 414 representing the delta group delay across the 200 MHz spectrum. This information is further utilized in the context of this disclosure.

Figure 5A:
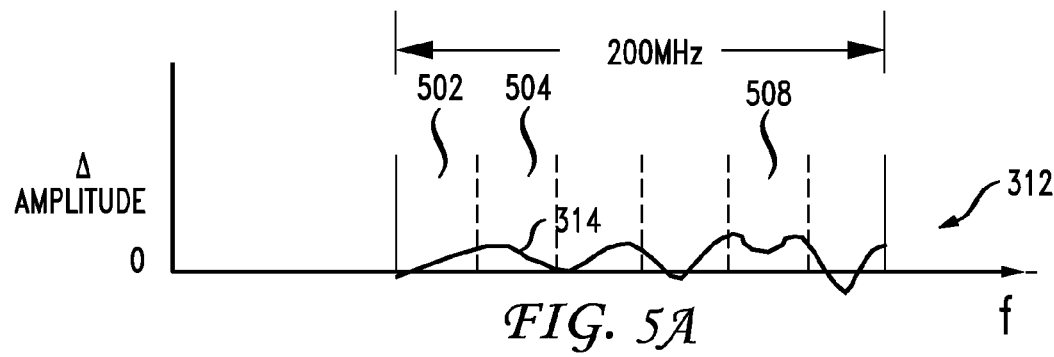
FIG. 5A illustrates the frequency spectrum being divided into sub-units to show the amplitude differentials.
Figure 5B:
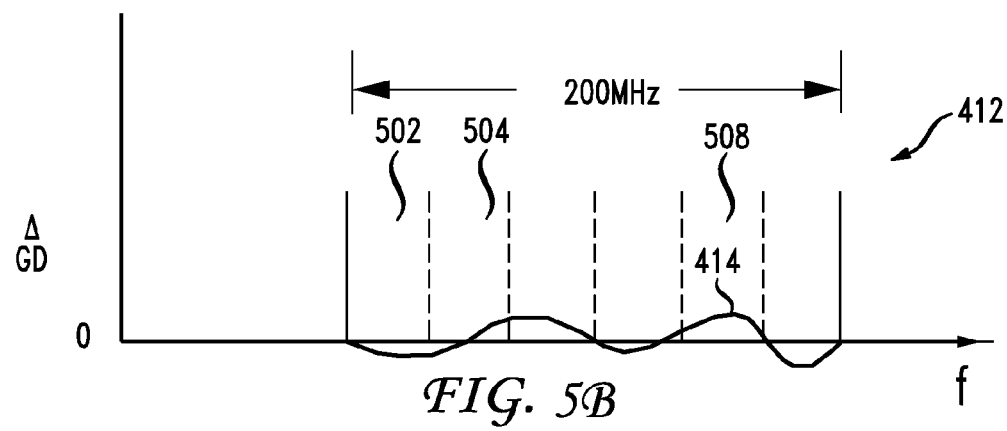
FIG. 5B illustrates the group delay differentials across the spectrum.
Figure 5C:
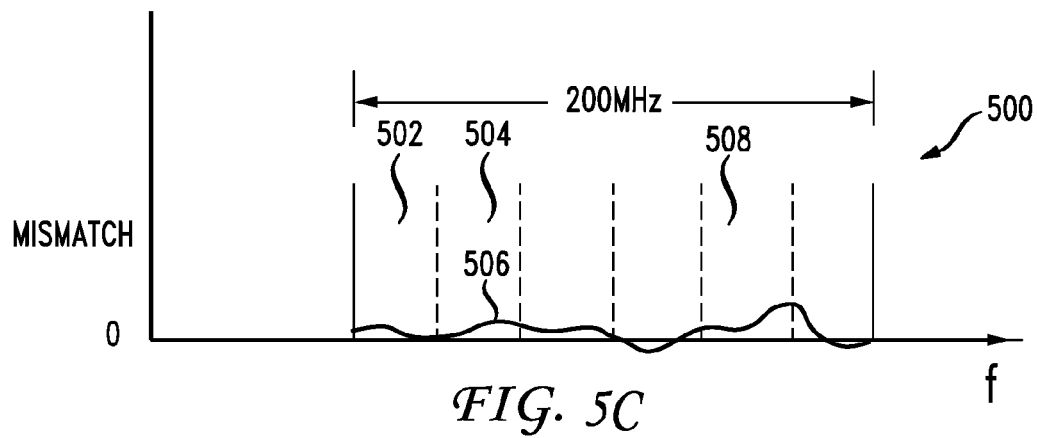
FIG. 5C illustrates the mismatch between the amplitude differentials and the group delay differentials across the spectrum.

FIGS. 5A, 5B and 5C combine FIGS. 3D and 4D. These figures focus on the wideband approach to beamforming and its challenges. FIG. 5A illustrates graph 312 which shows the delta amplitude signal, and FIG. 5B illustrates graph 412 with a delta group delay signal. As can be seen, across the 200 MHz spectrum used in this example, the spectrum can be divided into sub-units such as sub-units 502, 504, and so forth. In one example, each sub-unit could be fixed bandwidth such as 10 MHz or could be variable and/or part of a sliding window. However, as can be seen, when the entire spectrum is divided up into sub-units, the system can identify a mismatch between the delta amplitude for any given sub-unit and the delta group delay in that given sub-unit. In some cases, the mismatch between the delta amplitude and the delta group delay for a particular sub-unit may be more dramatic than the mismatch between these defined values in another sub-unit. Where the mismatch is greater, extra power, energy, or processing is necessary for corrective approaches. By dividing up the overall spectrum into these sub-units, the system can choose particular sub-unit(s) to use for particular users in order to perform communication via beamforming or avoid interference through creating nulls. For example, if a high-data user having a mobile device establishes a communication with a base station, the system could choose, amongst the various sub-units shown in FIG. 5C, those sub-units with the least amount of mismatch. Alternatively, the system could choose those sub-units that are available with the least amount of mismatch and select 3 sub-units, which can be contiguous such as 502 and 504 or non-contiguous such as 504 and 508, and then utilize those sub-units as the chosen frequencies for beamforming and transmission of a signal in the appropriate direction of the mobile device.

FIG. 5A is essentially FIG. 3D reproduced with frequency sub-units identified as 502, 504, 508. FIG. 5B is FIG. 4D with the frequency sub-units 502, 504, 508 identified. Six sub-units are shown but the structure of these can vary. For example, in one aspect, 20×10 MHz frequency sub-units can be created out of the exemplary 200 MHz bandwidth. FIGS. 5A and 5B provide an example of how the system could utilize mismatch information across various sub-units to make beamforming or null forming decisions. For example, In FIG. 5A, sub-unit 504, the amplitude mismatch is relatively high across that sub-unit. However, the group delay mismatch is 0 in the middle of the sub-unit as is shown in FIG. 5B. The system, given channel conditions, can choose to select sub-unit 504 because of its superior performance with respect to group delay notwithstanding the amplitude issue for sub-unit 504.

FIG. 5C illustrates a comparison of the mismatch between the amplitude differentials shown in FIG. 5A and the group delay differentials shown in FIG. 5B. The sub-units can be of different widths and can be chosen based on any number of factors, including regions along the 200 MHz spectrum that have a low amount of mismatch. For example, in FIG. 5C, sub-units 502 and 504 could be combined into a single sub-unit because the mismatch is minimal along that spectrum, whereas sub-unit 508 has a larger amount of mismatch variation. Note that a feature of the approach to divide the spectrum into sub-units is the ability to craft sub-units that require a reduced amount of equalization with respect to taking corrective measures on amplitude or phase of transmitted signals to properly and efficiently form beams. In other words, it would take less corrective measures to form a beam using frequency sub-units 502, 504 than it would be to perform corrective measures across the entire 200 MHz spectrum. Also see from FIG. 5C that more corrective measures would be needed for sub-unit 508 relative to sub-unit 502. The need for corrective measures can be one factor when the system generates beams.

Figure 5D:
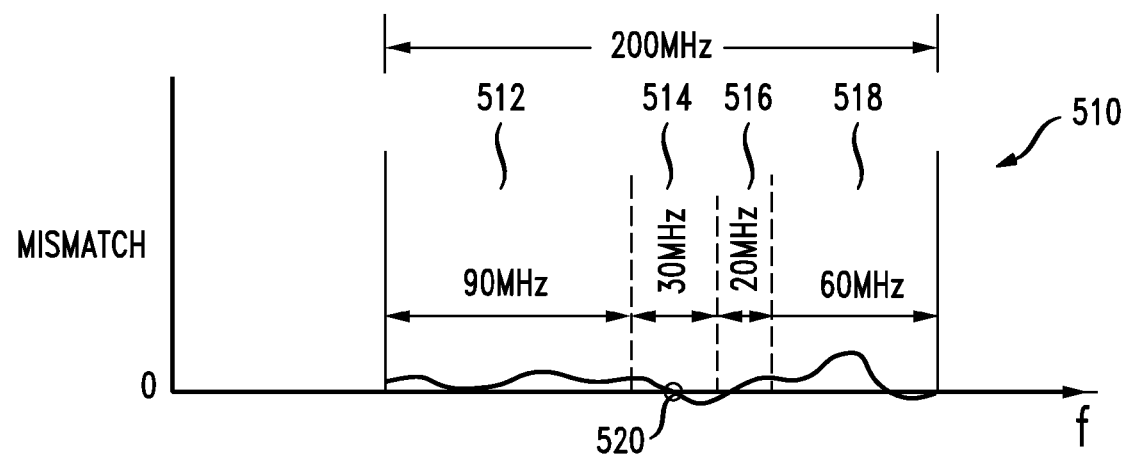
FIG. 5D illustrates an alternate approach to crafting and selecting frequency sub-units.

FIG. 5D illustrates an alternate approach to crafting and selecting frequency sub-units. FIG. 5D represents an example graph 510 of the mismatch between the amplitude differential and the group delay differential. It could also represent any other parameter across the frequency spectrum. In this example, the frequency bandwidths of the different sub-units are non-uniform and are tailored to the mismatch characteristics. Note that in sub-unit 512, the mismatch is generally constant. Sub-unit 514 experiences some more dramatic mismatch. Sub-unit 516 is also generally constant, whereas sub-unit 518 exhibits an increase in mismatch over its frequency spectrum. FIG. 5D illustrates the principle that the frequency sub-units do not have to have fixed widths but could be created based on the characteristics of the mismatch across the spectrum.

Assume, given the arrangement in FIG. 5D, that the system determines that there are 4 mobile devices that request communication with a remote radio head. The system determines that User 1 is 3 kilometers away from the remote radio head and requires a high data rate for a video streaming application or a video conferencing application. User 2 is using a texting application and is 1 kilometer away. User 3 is also using video streaming but is 0.5 kilometers away, and User 4 is using an email application and is 2 kilometers away. The system can utilize the information known about the mismatch across the spectrum and form frequency sub-units to communicate information to the users in the cell in a way that transmits beams formed according to the individual needs and overall system characteristics. User 1 needs high bandwidth and is relatively far away. Thus, much power may be required to transmit the beamformed signal to User 1. The system may create sub-unit 512, which has a large bandwidth (90 MHz) as well as low mismatch characteristics that may require less equalization cost. Thus, sub-unit 512 will provide efficient use of the system resources.

User 2 is texting and is relatively close. Sub-unit 514 is 30 MHz wide but has poor mismatch characteristics. The system can determine, given the text-based application used, that minimal equalization techniques will be needed for successful communication, notwithstanding the mismatch. Thus, sub-unit 514 is created and assigned for communications to User 2. User 3 requires high bandwidth for video streaming but is close to the remote radio head. Thus, the range is short and a shorter bandwidth of 20 MHz (where little equalization is required because of the minimal amount of mismatch) in the chosen frequency band can adequately service this user's data needs. Finally, although the mismatch is high in sub-unit 518, the frequency bandwidth is chosen to be 60 MHz. This large bandwidth may enable adequate communication of the needed data although the mismatch is high and perhaps the system seeks to avoid using energy or resources to equalize for the mismatch.

The benefits of the system disclosed herein include an easier and simpler beamforming/beam steering approach when there are amplitude and/or group delay mismatches between antenna elements. Furthermore, when beamforming, the best or preferable beam is at the middle of the frequency band. If high variations exist at the middle of the spectrum for a sub-unit, then problems can occur. For example, the characteristics of sub-unit 514 will likely be better in that at the center frequency of this frequency sub-unit, the mismatch is zero. In contrast, the mismatch is relatively large around the center frequency of sub-unit 518. Similarly, if a frequency sub-unit is going to be used for nulling, then a similar principle applies. Frequency sub-unit 514 will enable better nulling characteristics given the zero mismatch at the center frequency, whereas sub-unit 518 would not have good nulling characteristics given the mismatch.

Point 520 in FIG. 5D represents the location where the mismatch is zero. A zero mismatch position could be chosen as a center frequency for a frequency sub-unit such as 514. In other words, the particular frequencies within the sub-unit can be chosen in a sliding window that can center on a zero mismatch point for maximum efficiency for that sub-unit. The frequency bandwidth of a sub-unit could be chosen based on the mismatch characteristics across the spectrum such that minimal variation is experienced (and thus minimal or reduced compensation required) across the sub-unit.

The use of multiple frequency sub-units selected in this way further provides the benefit with respect to user demand without the need of dramatically altering algorithms in the system. For example, an evolved packet core (EPC) or other entity could assign a 10 MHz bandwidth per user device to support a 100 Mb/s link. But if there is a demand for more data, the EPC or other entity can assign 10×10 MHz to support a 1000 Mb/s demand. Alternatively, the system could assign 5×20 MHz frequency sub-units, or 2×10 MHz and 4×2 MHz frequency sub-units, and so forth. Any variation of sizes of frequency sub-units could be combined to arrive at the desired bit rate for the user data.

The above discussion only provides an example of how the system can utilize the information about the characteristics of a parameter (such as the mismatch) across the available frequency spectrum to make decisions regarding how to structure frequency sub-units and where to assign those sub-units for handling data communications.

Figure 5E:
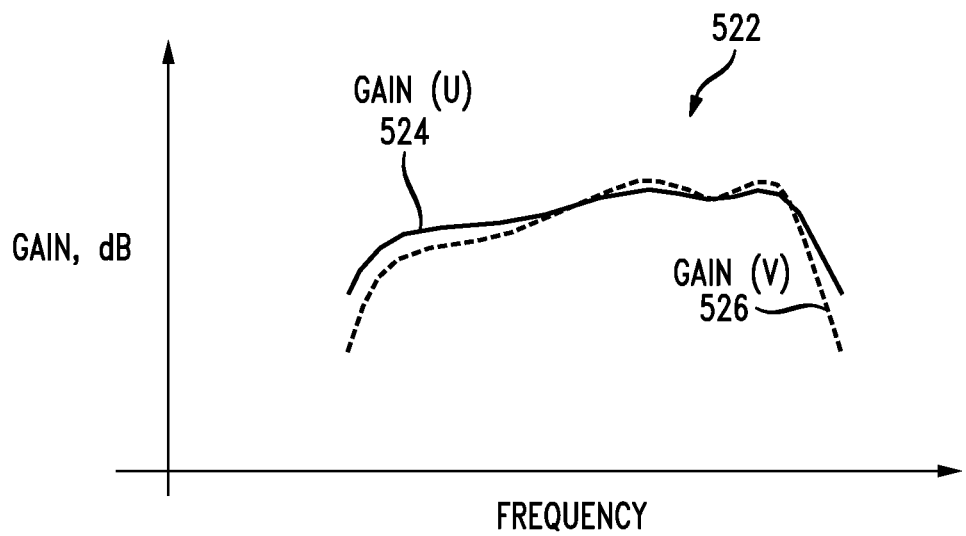
FIG. 5E illustrates different gains for different locations U and V of different antennas.

FIGS. 5E-6D show some of the benefits of the Spatial on Sub-Band Massive MIMO/BFN approach to beamforming. FIGS. 5E-5H illustrate gain and group delay mismatches between transmission antennas in a sub-band context. When the radio frequency (RF) bandwidth is wide as in the earlier figures, the analog sections of the transmission modules (e.g., mixers, intermediate frequency (IF) and radio frequency (RF) filters, power amplifiers (PA), amplifiers such as low-noise amplifiers (LNA), and antennas) have significant gain and group delay (and hence phase) variations over a frequency as shown in FIGS. 5E and 5G. The frequency applied in these figures is a sub-band frequency compared to the 200 MHz of FIG. 5A. For example, the bandwidth used in FIGS. 5E-5H can be 20 MHz, 35 MHz, or any other bandwidth that is a sub-unit of a larger wideband spectrum. The mismatches between the two transmission paths can vary with temperature and/or other factors and cause distortions and errors in the MMIMO/BFN algorithm. In the presence of such frequency-dependent mismatches, the MMIMO/BFN algorithm will be able to estimate the MMIMO/BFN solution (e.g., coefficients) with only a low signal-to-noise ratio.

Figure 5F:
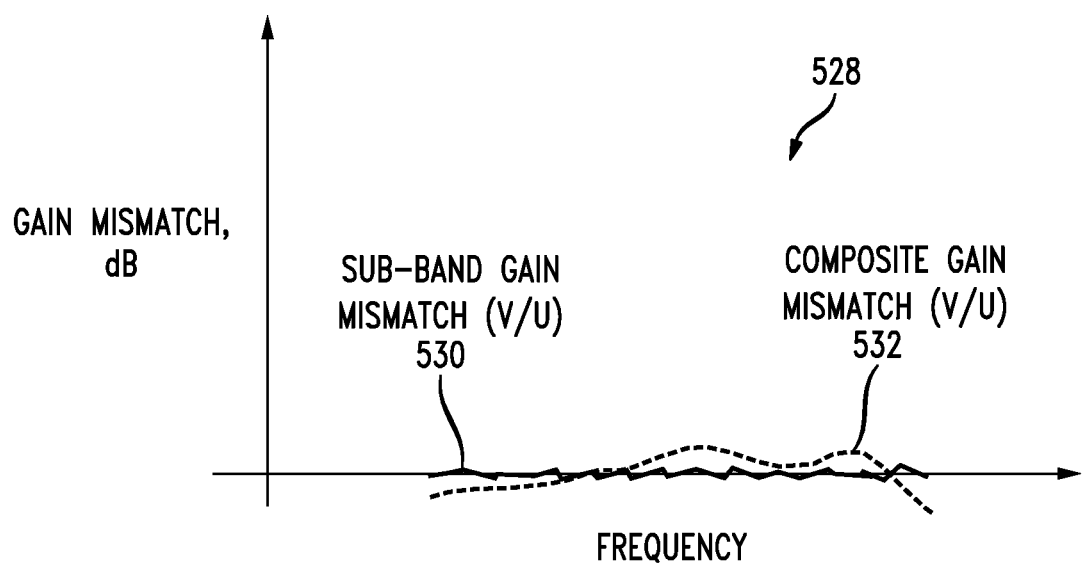
FIG. 5F illustrates the sub-band gain mismatch and the composite gain mismatch between the different locations U and V in FIG. 5E.

FIG. 5E illustrates a graph 522 showing the gain 524 of antenna (U) and the gain 526 of antenna (V). As can be seen across the frequency spectrum, the gain is not identical but does have some mismatch. Note that the gain across the sub-band, however, does not vary as much as the amplitude differences across the wideband spectrum of FIG. 3D. FIG. 5F shows a graph 528 illustrating the sub-band gain mismatch 530 between antennas (V/U) and compares that mismatch to the composite gain mismatch 532 between antennas (V/U).

For the composite MMIMO/BFN data discussed above, the channel estimation is for the composite spectrum (e.g., not just one sub-unit) and for many locations in the beamwidth. Using the composite bandwidth will not produce an accurate MMIMO/BFN solution since, even though the same beam is used, the users at closer locations and the users at farther locations may have different channel characteristics (e.g., due to multipath reflections from objects surrounding the cell location). The multipath reflection/refraction changes from one location and/or frequency to another. In other words, the channel characteristics can differ among different locations and/or at different frequencies. A result of such differences is a low SNR.

The Spatial on Sub-Band Massive MIMO/BFN disclosed herein does not have the above-described limitations since the channel is unique with a distinct frequency and beam. The MMIMO/BFN algorithm using this technique will yield a significantly higher SNR than that in the previous case.

Figure 5G:
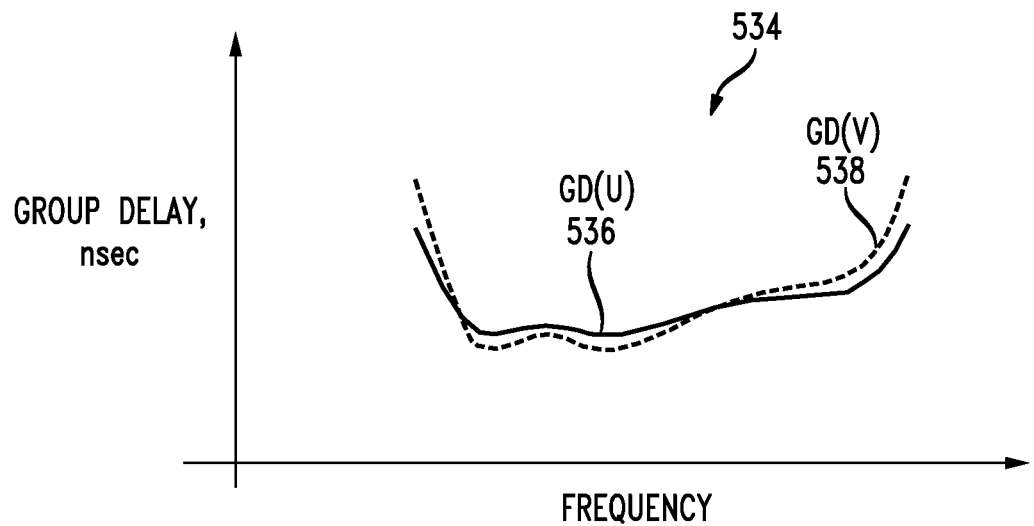
FIG. 5G illustrates the group delay for the different locations U and V in FIG. 5E.
Figure 5H:
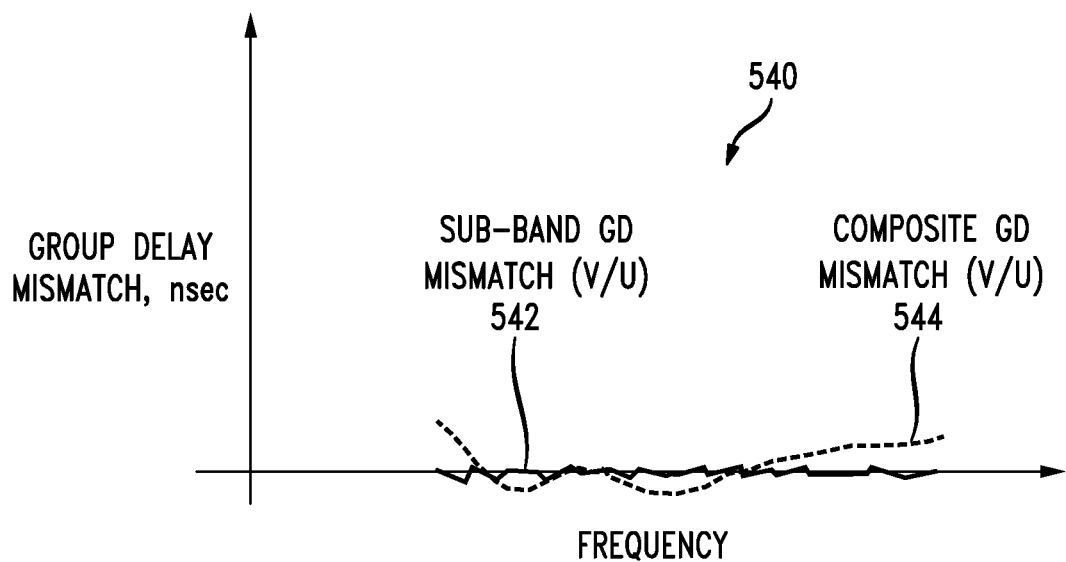
FIG. 5H illustrates the sub-band group delay mismatch and the composite group delay mismatch for locations U and V.

FIG. 5G shows a graph 534 that represents the group delay 536 of antenna (U) and the group delay 538 of antenna (V). FIG. 5H shows a graph 540 of the net group delay mismatches for the sub-band group delay mismatch 542 between antennas (V/U) and the composite group delay mismatch 544 between antennas (V/U).

Figure 6A:
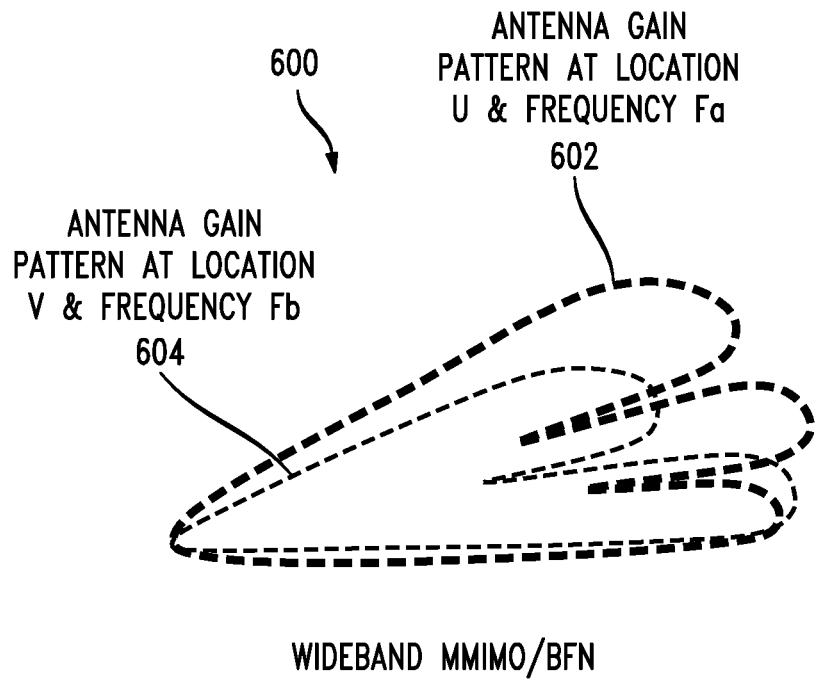
FIG. 6A illustrates different antenna gain patterns for wideband MMIMO/BFN.
Figure 6B:
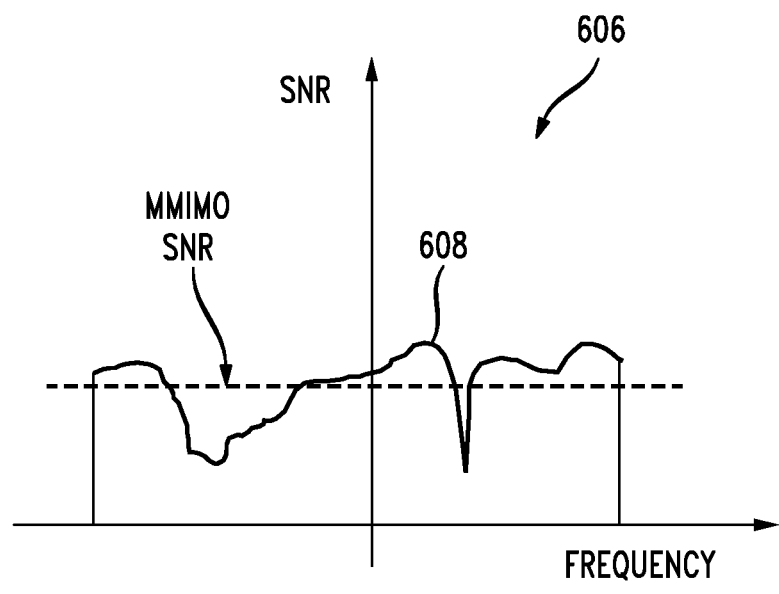
FIG. 6B illustrates the signal-to-noise ratio for wideband MMIMO/BFN.

As a result of the mismatches in gain and group delay illustrated in FIGS. 5E-5F, different frequencies in the beam forming process will have warps, tilts, or nulls in the resulting antenna patterns as shown in FIGS. 6A and 6B.

If the wide radio frequency bandwidth is divided into smaller sections (e.g., a 320 MHz bandwidth is divided into 16 sub-bands, each of 20 MHz bandwidth), the gain and group delay variation over any particular sub-band will be much smaller (as shown in FIGS. 5F and 5H), and thus the distortion over sub-bands is smaller. The MMIMO/BFN algorithm will have a high signal-to-noise ratio, and the transmitted beams will have less warping, less tilting, and fewer and shallower nulls. Therefore, MMIMO/BFN is more effective when processed on sub-bands.

FIGS. 6A-6D illustrate the improvement providing through the SS MMIMO/BFN approach. FIG. 6A shows wideband gain patterns 600 including the antenna gain pattern 602 at a location U and a frequency $F_a$. Also shown is the antenna gain pattern 604 at location V and frequency $F_b$. As can be appreciated, in a wideband MMIMO/BFN system, the transmission mismatches across the spectrum can cause a distorted antenna pattern across different antennas and frequencies. FIG. 6B illustrates a graph 606 showing the signal-to-noise ratio (SNR) 608 across the wideband spectrum with the large variation experienced by the system implementing a wideband MMIMO/BFN algorithm. The distortion due to the transmission mismatches yields a low SNR for the wideband MMIMO/BFN algorithm.

Figure 6C:
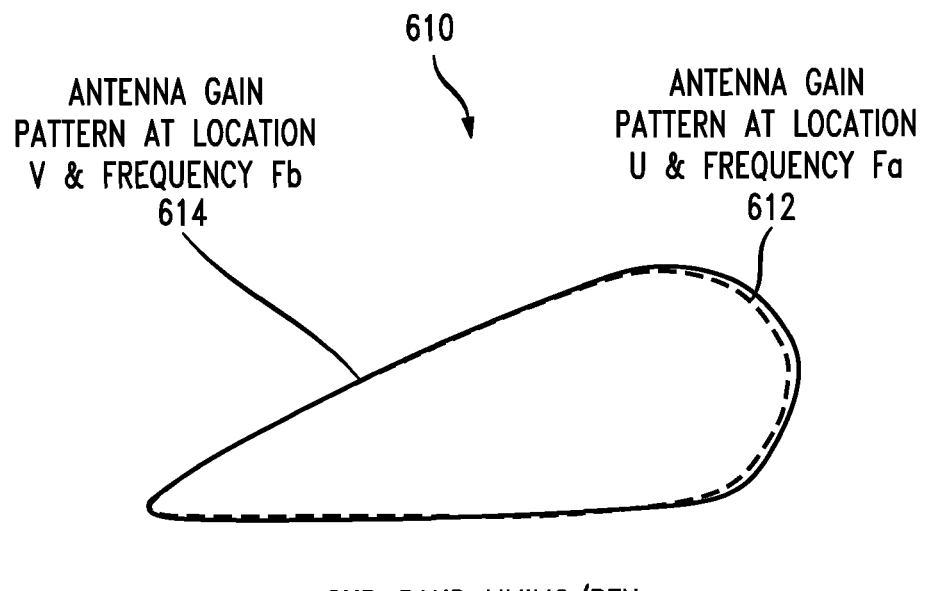
FIG. 6C illustrates the antenna gain for the disclosed sub-band MMIMO/BFN.
Figure 6D:
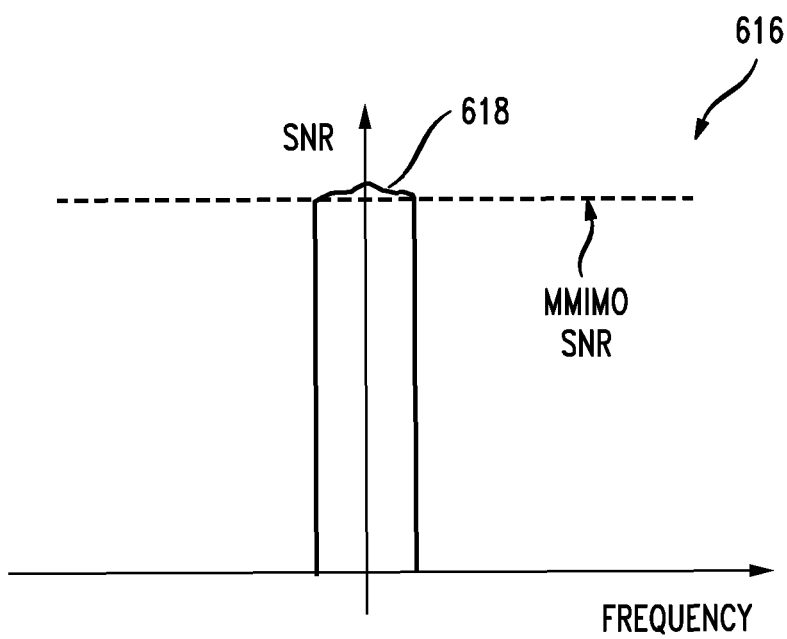
FIG. 6D illustrates the signal-to-noise ratio for the disclosed sub-band MMIMO/BFN.

FIGS. 6C and 6D illustrate the improvement due to the spatial sub-band algorithm disclosed herein. FIG. 6C shows a graph 610 with the antenna gain pattern 612 for a signal at a location U of frequency $F_a$ and the antenna gain pattern 614 for a signal at a location V having a frequency $F_b$. The antenna gain pattern in FIG. 6C is more closely aligned between the different locations due to the use of sub-band MMIMO/BFN. FIG. 6D illustrates a graph 616 of the SNR 618 across the frequency spectrum of the sub-band MMIMO/BFN. The clean antenna pattern for the narrowband MMIMO/BFN is due to the small transmission mismatches and ultimately yields a high SNR across the narrow band spectrum.

One or more of the following features can be selected based on one or more parameters for beamforming: which frequencies along an available frequency spectrum will be assigned to a frequency sub-unit, the bandwidth of a frequency sub-unit, the power (range) of the beam that is formed, the amount of equalization or compensation for a beam the is formed; the direction the beam will be transmitted in, which fixed or variable frequency sub-unit will be selected for a particular device, how many frequency sub-units will be assigned for communicating data, whether to switch a current assignment of frequency sub-unit(s) to a different set, whether to adjust the characteristics (e.g., width, frequency set) of a frequency sub-unit currently communicating data via beamforming; whether to cancel a frequency sub-unit or remove a frequency sub-unit from an available list of frequency sub-units, 4 given change of characteristics in the system, whether to maintain, increase, or decrease the amount of compensation for a frequency sub-unit based on changes such as environment changes, changes in mismatch values or other parameters, or changes in data needs for a current communication between devices, a location of a zero mismatch across the spectrum, and so forth.

Additionally, an atmospheric or weather condition of a region where a user is located may be taken into account when selecting frequency sub-unit(s) for beamforming signals to communicate with that user. For example, in the millimeter wave spectrum, the water content in the atmosphere can affect the attenuation or absorption level of a signal to varying degrees depending on the frequency sub-unit chosen. Thus, a certain frequency sub-unit that is known to be more tolerant to attenuation in humid air can be reserved for communicating with a user located in a region where it is raining, while another frequency sub-unit that is known to be affected by the water content in the atmosphere to a higher degree can be assigned for communicating with another user located in a different region where there is no rain or humidity.

One or more of the following parameters can be used to make the types of decisions discussed above relative to creating and assigning frequency sub-units for beamforming communications: the mismatch between an amplitude differential and a group delay differential, an amplitude differential between any two or more signals transmitted from different antennas, a delay differential between any two or more signals transmitted from different antennas, environment conditions, signal attenuation characteristics across a spectrum, a location of any given device, a location of an interference source, a range of an interfering source from a transmitting device, a range of a receiving device from a transmitting device, relative ranges of receiving devices, relative locations of receiving devices, a data amount or type, a priority of a user, relative priorities of different users, available power for compensation techniques in the system for achieving beamforming, cost in money for operating the system or for individual users, energy efficiency issues, changing conditions in the system after a frequency sub-unit assignment is made, consideration of newly added receiving devices to a cell, time of day considerations, atmospheric considerations, relative requirements regarding data needs for different devices, a chosen application causing data to be received on a device, a priority of a chosen application relative to other applications receiving data in the system, a system-based policy, a user policy, and so forth. Any combination of the above parameters can be used as a basis for any combination of the decision points when creating and utilizing frequency sub-units disclosed herein.

Figure 7A:
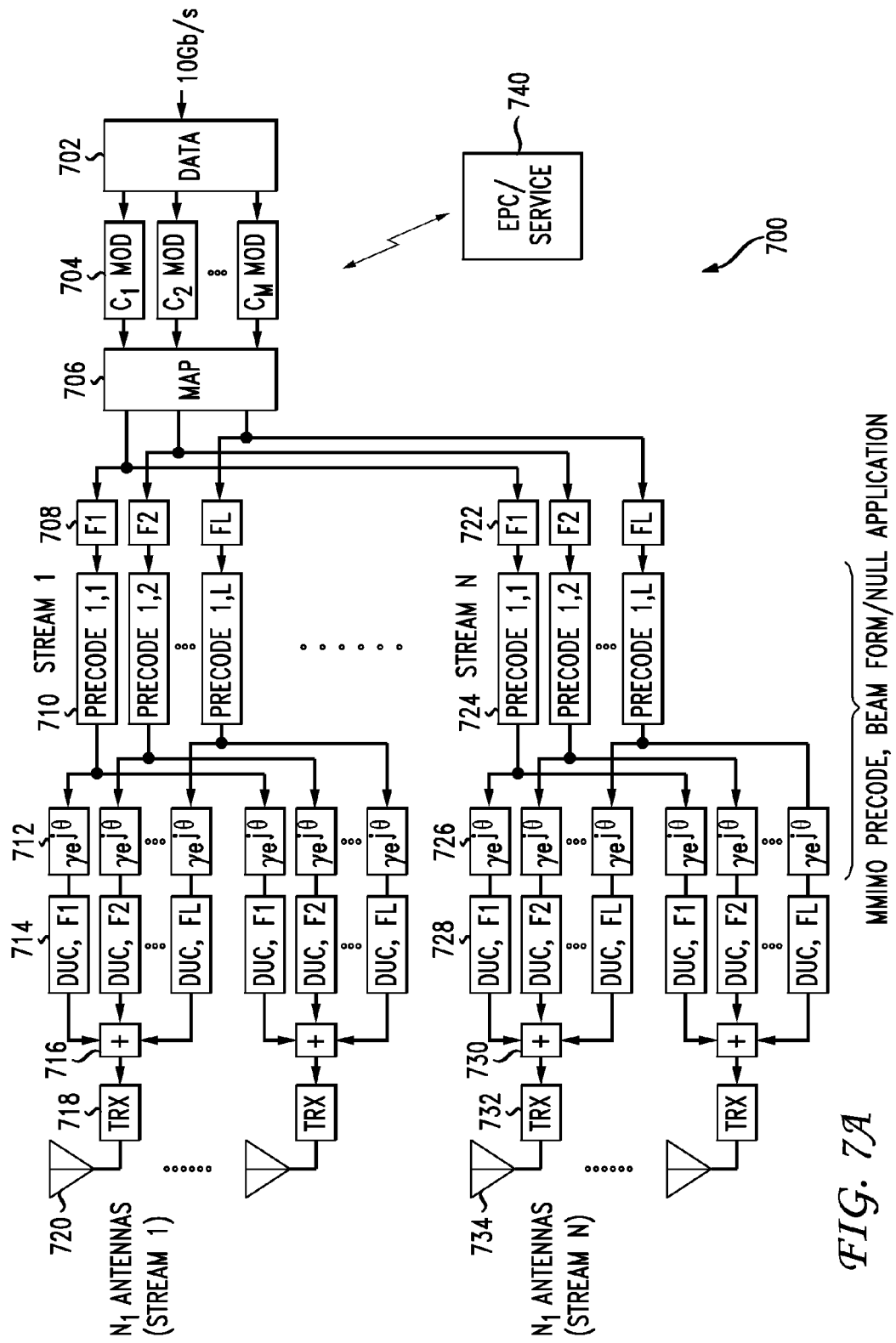
FIG. 7A illustrates an example frequency and spatial-based massive multiple-in and multiple-out system.

FIG. 7A illustrates a massive MIMO system 700 that utilizes the concepts disclosed herein and which includes selecting one or more frequency sub-units or carrier signals for use in performing beamforming or nullification. As shown in FIG. 7A, data 702 is received at a bit rate (which is 10 Gb/s in this example) and modulation of the data occurs in feature 704 along one or more channels which results in data being transmitted to a mapping unit 706. The mapper 706 causes the data to be associated with particular frequencies 708, 722, which also relate to which antenna or antennas (720, 734) the data will ultimately be transmitted from in beamforming. The data is divided amongst different streams. In FIG. 7A, stream 1 contains data which is to be transmitted to a device via antenna(s) 720. The process of the signal in stream 1 will be discussed. Feature 708 represents the frequency sub-units which are chosen to communicate the data to the receiving device. In FIG. 7A, frequency 1, frequency 2, up to frequency L are chosen out of a plurality of available frequency sub-units from the overall available bandwidth. The system could choose, for a particular stream, a single frequency sub-unit or multiple frequency sub-units. For each chosen frequency sub-unit, the system precodes 710 the data to generate the signals 712 at the appropriate amplitudes and phases for use in performing beamforming or creating a null. Each signal is further processed by a digital up-converting unit DUC 714 and added together 716 for transmission 718 via the plurality of antennas 720 for stream 1.

Other streams, such as stream 2 through N may also be transmitted to appropriate receiving device(s) through a similar process. For example, frequency sub-units 722 may be chosen for transmitting stream N to its receiving device. Note that the frequency sub-units 722 may be chosen differently from the frequency sub-units 708 used for transmitting stream 1. For each chosen frequency sub-unit, the system may precode 724 the data to generate signals 726 at the appropriate amplitudes and phases. Each signal is further processed by a digital up-converting unit (DUC) 728 and added together 730 for transmission 732 via the plurality of antennas 734 for stream N.

As can be appreciated, the system in FIG. 7A can perform, in one example, spatial and sub-band massive MIMO precoding beamforming and application of nulls using a chosen frequency or carrier signal based on at least in part a level of mismatch identified for a particular frequency sub-unit. The choice of beamforming could also be based on the location of the remote device receiving the transmission or the data demand for the device. The disclosed approach can increase the number of orthogonal signals on transmission and reception. The technique utilizes the frequency dimension to increase the number of orthogonal signals plus the number of signals transmitted and received on different directions. FIG. 2 above illustrates beamforming as using, according to the present example, the entire composite 200 MHz bandwidth in order to form beams 204, 206 and 208. However, by choosing frequency sub-units, an increase in the number of orthogonal signals that can be transmitted and received in various directions can be achieved. Each device at a given location, or a given direction relative to the transmitter, will be assigned a particular frequency sub-unit at a dedicated beam. Devices that particularly interfere with the transmission will be addressed through nulling in a way that does not suppress the other desired transmissions. The system in FIG. 7A, given a total transmit power, can dedicate the signal to selected users and thus increase the range and preserve beam signals for the desired target. Further, given a range of a device, the base station can reduce the total transmit power by not transmitting signals in unused directions or in locations where no devices exist to receive a signal.

Further, by selecting sub-units based on the mismatch between the delta amplitude and the delta group delay, the system can simplify the equalization necessary for proper beamforming. In other words, it can reduce the amount of calibration and compensation needed amongst the antennas. As noted above, if the entire 200 MHz bandwidth is used to create the beams as is shown in FIG. 2, a large amount of equalization would be necessary given the actual performance of the system. By choosing sub-units in the manner disclosed herein, better beamforming and nulling performance can be achieved and simplified equalization is possible. Using spatial and sub-band massive MIMO in the context of 20 sub-units×10 MHz can provide an increased number of beams in increased capacity, more effective power usage, more independent beams and nulls, and increased simplicity in equalization than is available in a 200 MHz MIMO system. Such an approach would be well-suited for the developing 5G standard and would also support backward compatibility with 3G or 4G standards including the ability to perform carrier aggregation by selecting appropriate sub-units regardless of whether they are contiguous or non-contiguous.

The selection and assignment of frequency sub-unit(s) to use for a given communication from a transmitter to a receiver can be done at the device 700 or can be performed by a separate entity. An Evolved Packet Core (EPC) or similar service 740 is generally shown in FIG. 7A as communicating with the device 700. The EPC/Service 740 can have knowledge of one or more of the overall network, mobile device, environment conditions, policies, and signal characteristics (amplitude, delay, mismatches, etc.). Using this knowledge, the EPC/Service 740 can communicate the chosen frequency sub-unit(s) for use by the transmitter 700. The EPC 740, when making sub-unit decisions, can also determine not to choose a frequency sub-unit having undesirable characteristics. Note that in FIG. 7A, the transmitter 700 in one example can be a base station/remote radio head device or may even be a mobile device or single-user mobile device that receives the instructions on a selection of one or more frequency sub-units for use in beamforming.

The EPC 740 can perform a number of different functions. One function is to identify the necessary weights to apply to transmitted signals to create the beams or the nulls in the proper direction. The EPC 740 will get Eigen vector values $W_i$ which will provide data about weights on the various signals transmitted from the array of antennas for creating a beam of energy in one direction and nulling other signals in the other directions. The EPC 740 can utilize any approach for obtaining the $W_i$ values. The system could obtain a covariance matrix across the signals in the system to identify how much variance there is in the various dimensions or directions. Using an Eigen analysis, such as a singular value decomposition or a similar analysis, EPC 740 can arrive at a matrix of eigenvalues that represent the power of the strongest signal seen, the power of the next strongest signal, and so forth down to the power of the weakest signal. From the eigenvalues the system can obtain eigenvectors $W_i$ for use in applying the appropriate weights to the transmitted signals to obtain the gain in the right direction and nulling other directions of signal transmission for beamforming. Using this information, the EPC 740 or other entity, can make frequency sub-unit assignments for transmission and reception.

In another example, in a particular frequency range covering one or more sub-units, the system might experience excess signal loss and in a particular direction. If a user device is in a similar direction, those affected sub-units will not be chosen for beamforming for signals to the user device. The EPC 740 could choose different frequencies (different frequency sub-units) to assign to first and second devices in which they are positioned in the same direction from the transmitting device. Further, the EPC 740 can decide power issues, modulation techniques (e.g., 4PSK, 256-QAM, etc.), error correction approaches, diversity techniques, security issues, quality of service issues, etc. to improve the characteristics of the uplink or downlink communications. Of course, any device, including the base station, that is making decisions regarding which frequency sub-unit(s) to select, can make decision based on one or more of the above factors. The EPC 740 can also provide the source data bits 702 that are processed by the device 700. The various parameters described above can also be provided through one or more other services to ultimately determine the beamforming characteristics.

Figure 7B:
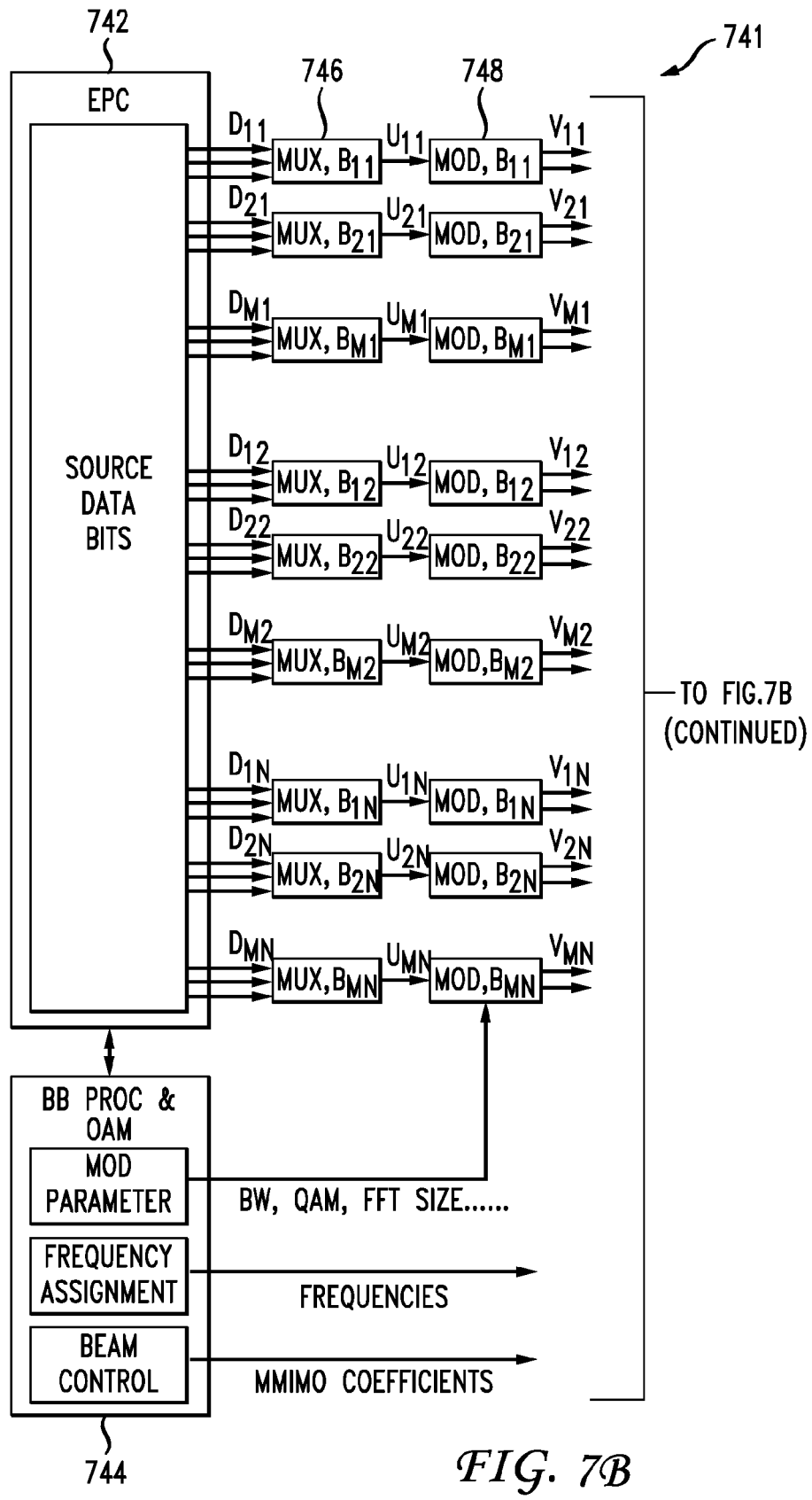
FIG. 7B illustrates a block diagram of an example down-link device applying SS MMIMO/BFN.
Figure 7B:
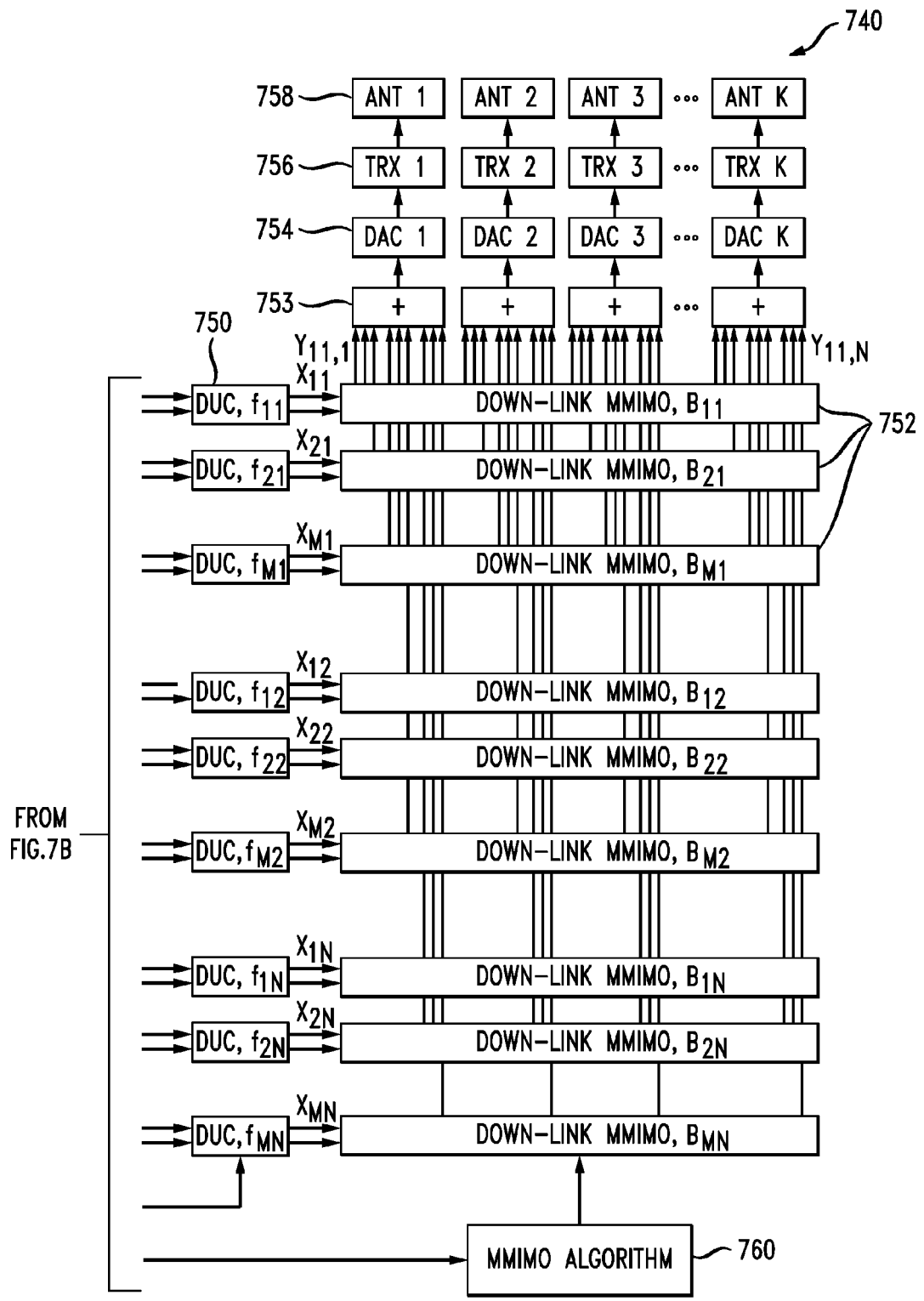

FIG. 7B provides a further illustration of a block diagram of a down-link system 741, such as an eNB for transmitting signals, according to this disclosure. In another aspect, the device 741 in FIG. 7B could represent a user equipment (UE) or mobile device that transmits a signal according to the principles disclosed herein.

The Evolved Packet Core (EPC) 742 can send transmit source data packets to the device 741. To configure the device 741, a baseband processor 744, in coordination with the EPC 742, can send modulation parameters to the device 741. In addition, the baseband processor 744 also can send an assigned cell frequency and location beam control features. It also can perform general operation and maintenance for the system. For example, one or more of the following parameters can be provided by the baseband processor 744: modulation parameters (such as quadrature amplitude modulation, or some other form of modulation), frequency assignments, bandwidth assignment, Fast Fourier Transform (FFT) size, beam control MMIMO coefficients, etc. It is noted that these parameters do not need to be assigned by or received from the baseband processor 744. The parameters could be provided in whole or in part by other components within a network or the system 741. At the device 741, the data streams are grouped into user equipment groups that are located at a particular cell $A_{ij}$. These data $D_{ij}$ will be transmitted on frequency band $F_{ij}$ (centered at $f_{ij}$), and will use the MMIMO/BFN coefficient set $B_{ij}$. Generally, the use of "$F_{ij}$" herein refers to a sub-band and the use of "$f_{ij}$" refers to the center frequency of the $F_{ij}$ sub-band.

Following the processing shown in FIG. 7B, the user data set $D_{ij}$ are grouped 746 into data bit stream $U_{ij}$. The data bit stream $U_{ij}$ is then modulated 748 to data symbols $V_{ij}$, and data symbols $V_{ij}$ are divided into L bit streams, where L is a transmit MIMO order. The $U_{ij}$ data stream refers to the UE group located in $A_{ij}$ location, which communicates with the base station via sub-band $F_{ij}$. The signal $V_{ij}$ is then processed through a digital up-convert (DUC) block 750 to produce intermediate frequency (IF) signals at frequency $f_{ij}$ to produce signal stream $X_{ij}$. The MMIMO/BFN blocks 752 then apply the MMIMO/BFN coefficients (BO to the signal $X_{ij}$ to produce the transmit signals $Y_{ij,1}, Y_{ij,2}, \ldots, Y_{ij,N}$ (where N is the number of antennas) that will be added together with other transmit signals before transmit through the digital-to-analog converters (DACs) 754, transmission processors (TRXs) 756, and antennas 758. The TRXs 756 include the transmit/receive blocks of a device and can include transmit/receive filters, mixers, power amplifiers, low noise amplifiers, etc.

The technique can be used for any MMIMO/BFN method. However, generally the MMIMO/BFN is a linear process. On each sub-band $F_{ij}$, and each beam coefficient set $B_{ij}$, the MIMO processor can perform the following example function for signal targeting at location $A_{ij}$:

$$\begin{bmatrix} Y_{ij}^{(1)} \\ \ldots \\ Y_{ij}^{(K)} \end{bmatrix} = \begin{bmatrix} B_{ij,1}^{(1)} & \ldots & B_{ij,1}^{(L)} \\ \vdots & \ddots & \vdots \\ B_{ij,N}^{(1)} & \ldots & B_{ij,N}^{(L)} \end{bmatrix} \begin{bmatrix} X_{ij}^{(1)} \\ \ldots \\ X_{ij}^{(L)} \end{bmatrix}$$

where:

$X_{ij}^{(L)}$ is the L-th MIMO data stream;

$Y_{ij}^{(N)}$ is the T-th output of the MIMO processor, that will be sent to N-th antenna;

$B_{ij,V}^{(U)}$ are the MMIMO coefficients (precode) for U-th stream and V-th antenna;

L is the number of data streams of the MIMO (for L=1, the MMIMO/BFN processing is known as antenna beam forming/nulling); and K is the number of antennas.

The signal $Y_{ij}^{(T)}$, T=1: K, when transmitted with K element array antennas, will form a beam to location $A_{ij}$. The MMIMO/BFN method along with its algorithm can be for different designs, and the disclosed technique can be transparent from those MIMO techniques.

Since MMIMO/BFN is a linear process, many transmitted signals from different beams and frequencies can be added together (as shown in feature 753 of FIG. 7B) to form signals to be transmitted to DACs 754 that will form multiple beams toward different locations $A_{ij}$, or nulls to target locations. Since the MMIMO/BFN 752, DUC 750 and many sections of the modulators are linear, the blocks can be interchanged to minimize the complexity depending on the specific design. For example, the MMIMO/BFN signal processing blocks 740 can be placed prior to the DUC 750 without performance impact. Further, FIG. 7B shows the baseband processor 744 providing certain data to certain blocks, such as the FFT size being provided to the blocks 748. Such parameters can be provided wherever the parameters can be used by various blocks in the system 741.

Figure 7C:
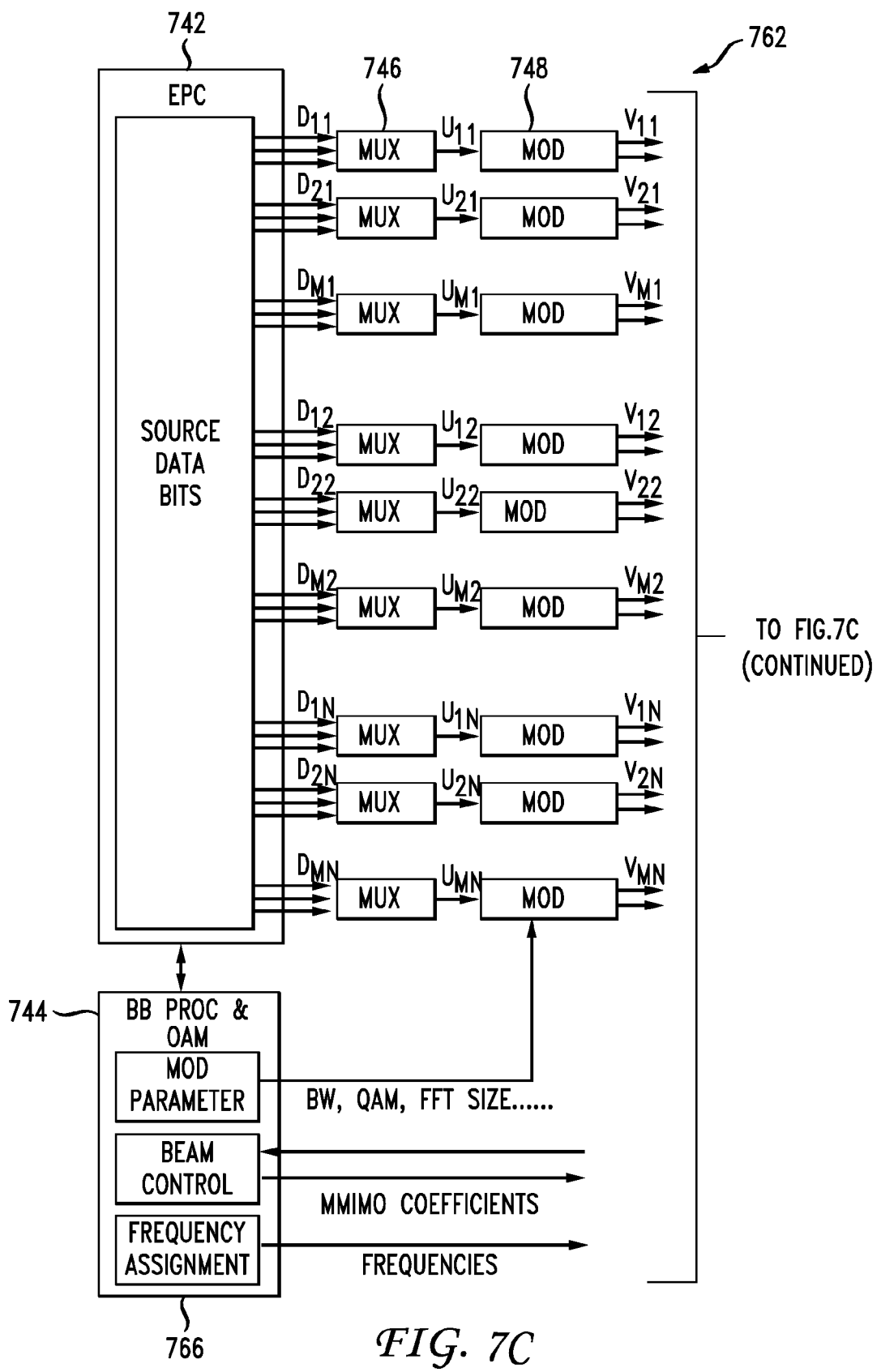
FIG. 7C illustrates a variation of the down-link device of FIG. 7B.
Figure 7C:
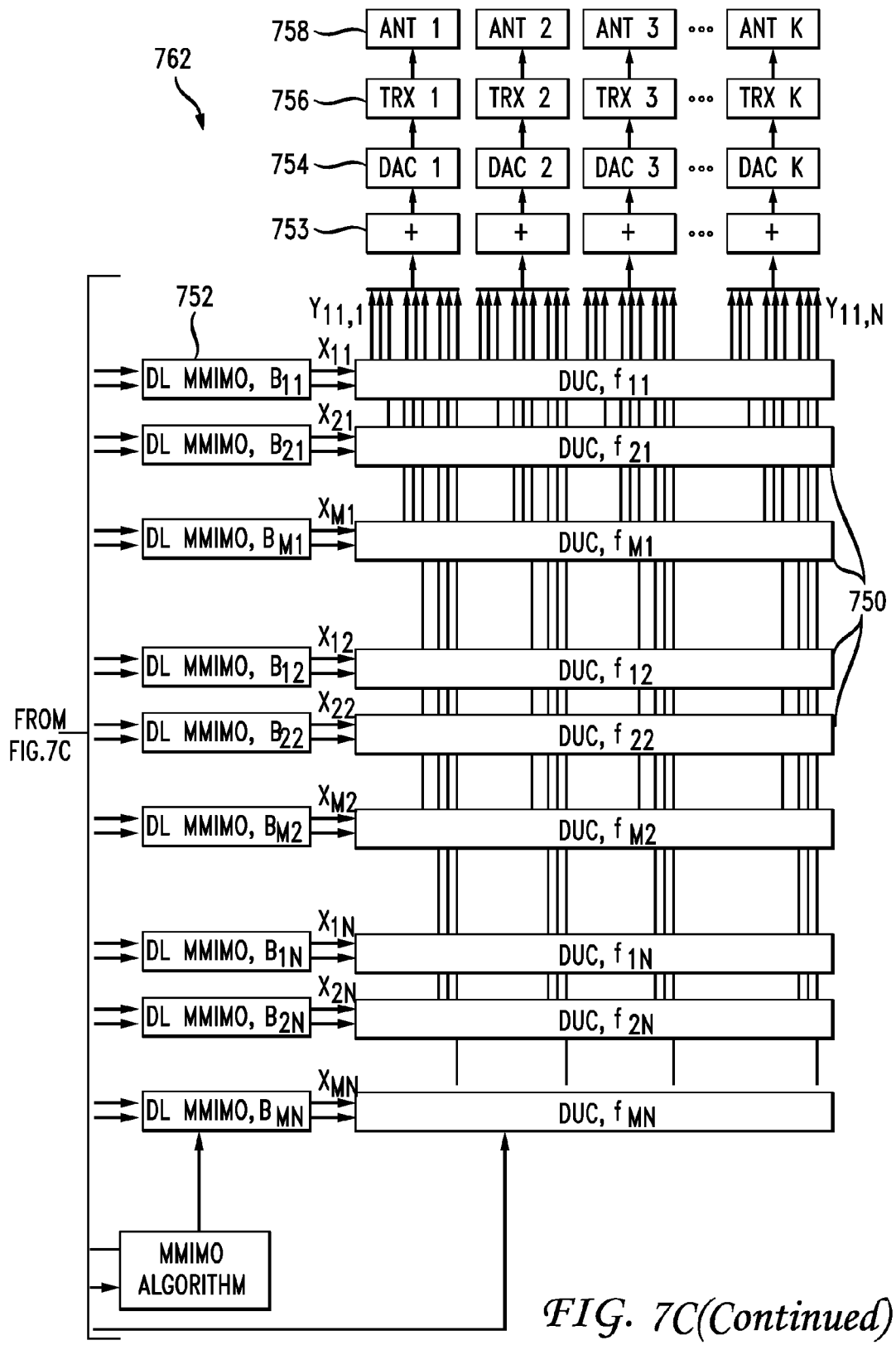

FIG. 7C illustrates a variation 762 on FIG. 7B, and shows how the DL MMIMO blocks 752 can be switched with the DUC blocks 750. In this scenario, as noted above, the spatial on sub-band MMIMO processing still occurs using blocks 750 and 752, but the ordering of the signal processing is switched. Thus, FIG. 7C shows the interchangeability of the DUC and MMIMO processing in this example system.

Figure 7D:
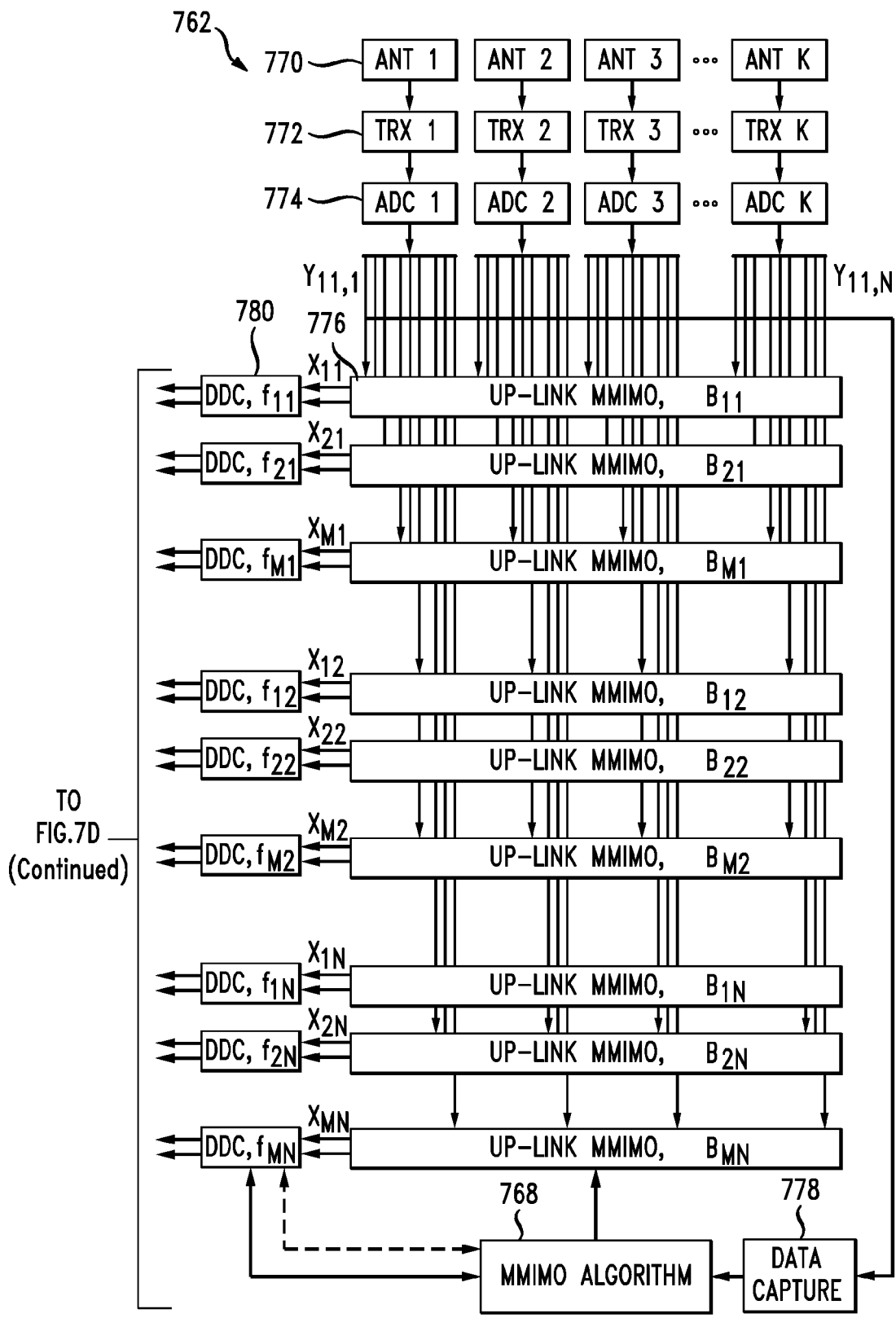
FIG. 7D illustrates a block diagram of an example up-link device applying SS MMIMO/BFN.
Figure 7D:
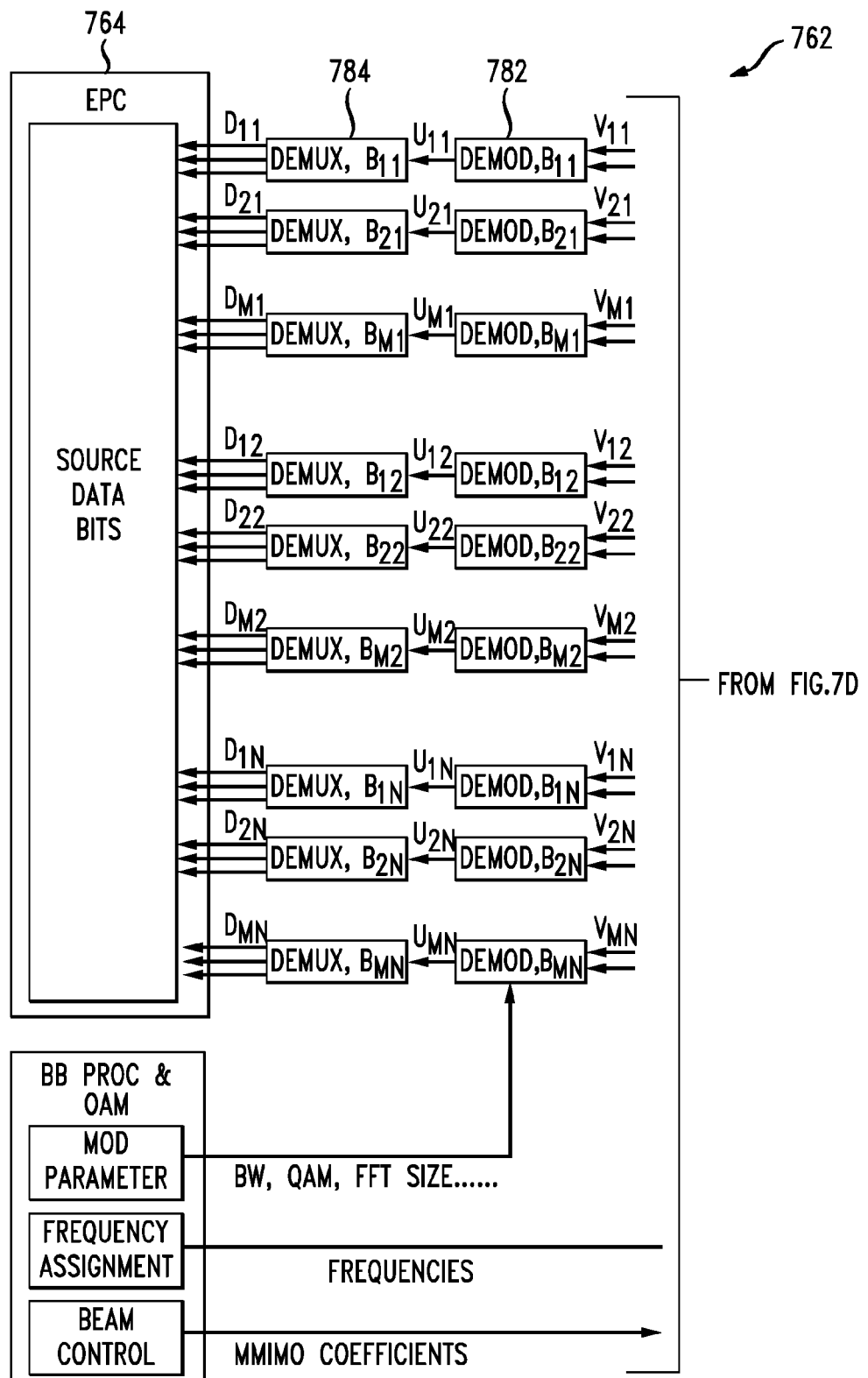

FIG. 7D illustrates an up-link or receive device 762 for spatial-sub-band MMIMO/BFN transmissions. Such a device could be a base station or a mobile user device (or any other device), as device 762 represents any device that receives signals that are formed according to the principles disclosed herein.

FIG. 7D shows the block diagram 762 of an up-link process of a device such as, for example, an eNB. The up-link process is the reverse process of the down-link process. The signals $Y_{ij}$ represent the signals in the system after the transmitted signals from a remote station are received by the antennas 770 and processed through the transmission/reception modules 772 and analog to digital converters 774 have processed the received data. The $Y_{ij}$ signals are applied to the MMIMO/BFN blocks 776 to align the channel for each of the sub-bands. The MMIMO/BFN can be different for different methods, but the technique is to produce the maximum signal that is also free of interference from interferers. In this section, these variables are associated with FIG. 7D, and not to be confused with the same notation as in FIG. 7B. Note that a data capture block 778 retrieves data associated with the $Y_{ij}$ signals and communicates the data to the MMIMO algorithm block 768.

Without loss of generality, the technique can be used for any MMIMO/BFN method. However, generally the MMIMO/BFN is a linear process, performing the following function for signal targeting at location $A_{ij}$:

$$\begin{bmatrix} X_{ij}^{(1)} \\ \ldots \\ X_{ij}^{(L)} \end{bmatrix} = \begin{bmatrix} B_{ij,1}^{(1)} & \ldots & B_{ij,N}^{(1)} \\ \vdots & \ddots & \vdots \\ B_{ij,1}^{(L)} & \ldots & B_{ij,N}^{(L)} \end{bmatrix} \begin{bmatrix} Y_{ij}^{(1)} \\ \ldots \\ Y_{ij}^{(N)} \end{bmatrix}$$

where:

$X_{ij}^{(L)}$ is the L-th output of MIMO data stream;

$Y_{ij}^{(N)}$ is the T-th input of the MIMO processor, from N-th antenna;

$B_{ij,V}^{(U)}$ are the MMIMO coefficients (precode) for U-th stream and V-th antenna;

L is the number of data streams of the MIMO (for L=1, the MMIMO/BFN processing is known as antenna beam forming/nulling); and K is the number of antennas.

After the MMIMO/BFN process 776, the signals $X_{ij}$ are down-converted 780 to baseband signals $V_{ij}$, which are then demodulated 782 to data bits $U_{ij}$. The data bits are then de-multiplexed 784 to group the signals into the targeted user data $D_{ij}$. The components disclosed in the figures related to modulation, transmission, baseband processing, up- and down-converting, as well as other signal processing blocks, and variations thereof, are known to one of skill in the art and any variations are contemplated as within the scope of this disclosure.

Since MMIMO/BFN, the digital down-converter (DDC), and many sections of the demodulators are linear, these blocks can be interchanged to minimize the complexity depending on the specific design. For example, the MMIMO/BFN blocks 776 can be placed after the DDC 780 blocks without performance impact.

In addition to the above process, the data capture process 778 occurs after the analog-to-digital converter (ADC) blocks 774 process the signal (or possibly at the DDC 780 output as shown in dashed line). The data captured from block 778 are used to allow the MMIMO/BFN algorithm 768 to compute the MMIMO/BFN coefficients (or precode) $B_{ij}$ that will be applied to the up-link and down-link MMIMO/BFN processors.

Figure 7E:
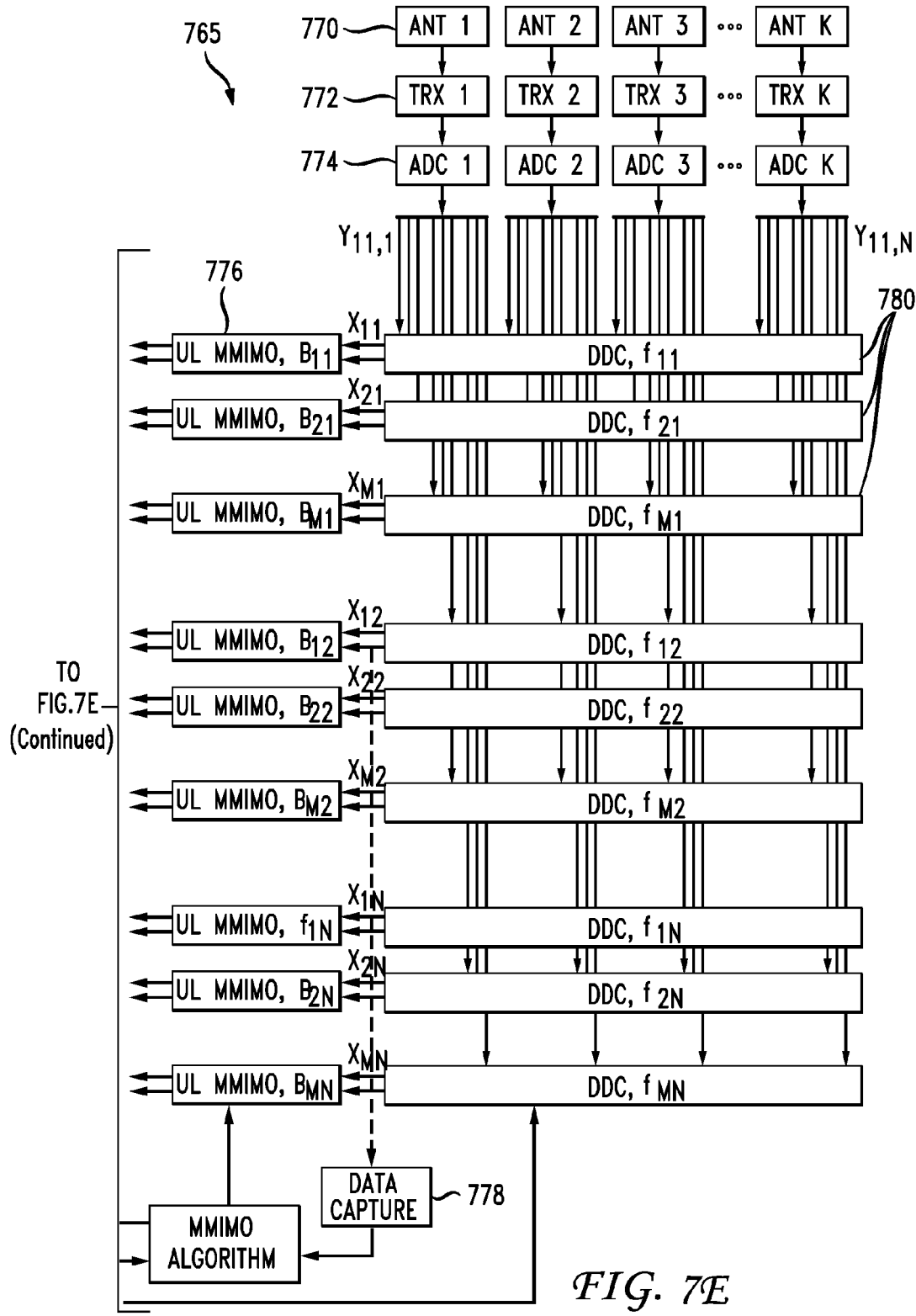
FIG. 7E illustrates a variation on the up-link device of FIG. 7D.
Figure 7E:
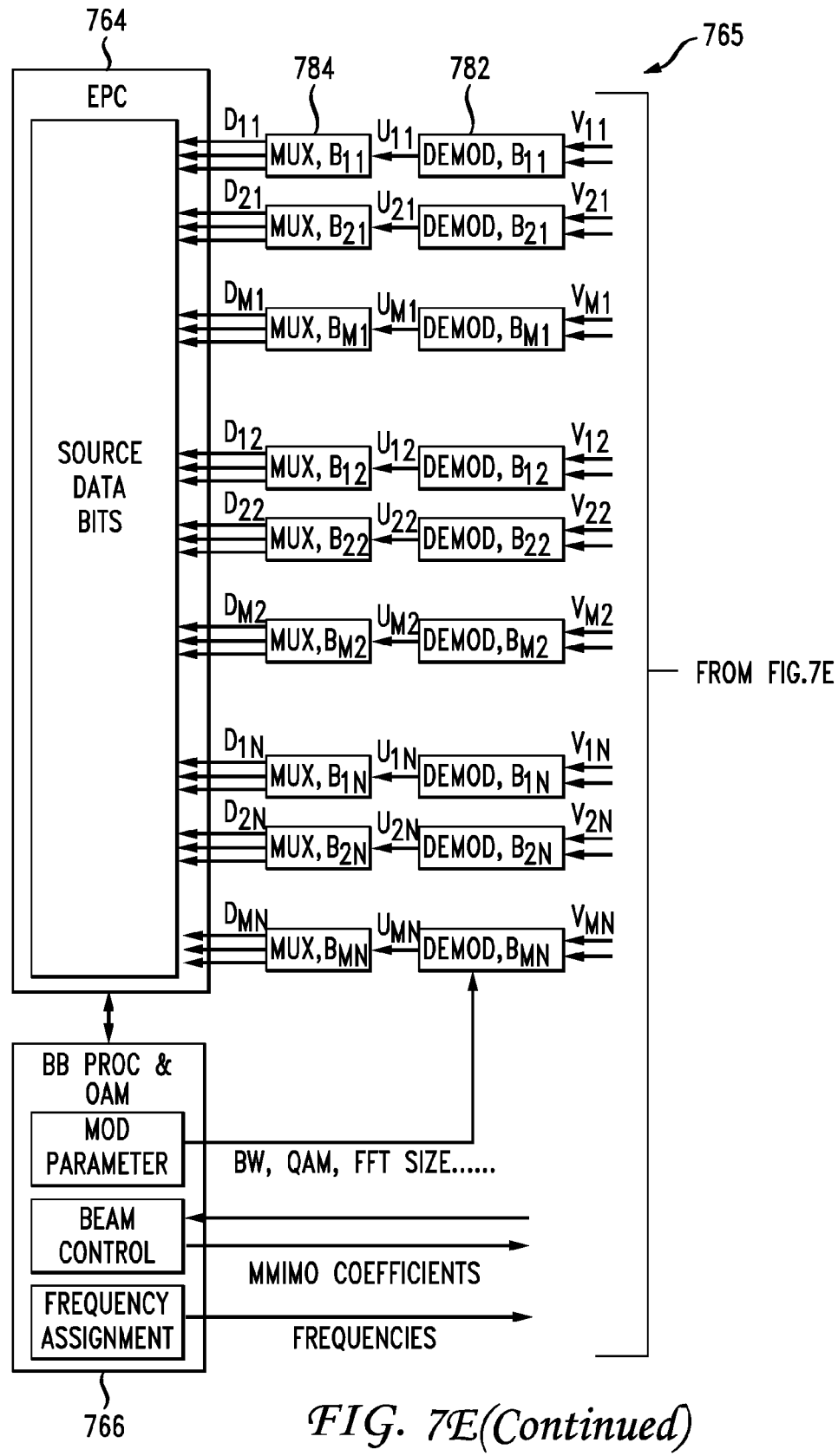

FIG. 7E illustrates a variation 765 on FIG. 7D, and shows how the UL MMIMO blocks 776 of FIG. 7D can be switched with the DDC blocks 780 of FIG. 7E. In this scenario, as noted above, the SS MMIMO processing still occurs using blocks 776 and 780 but the ordering of the signal processing is switched. Thus, FIG. 7E shows the interchangeability of the DDC and MMIMO processing in this example system.

Figure 8:
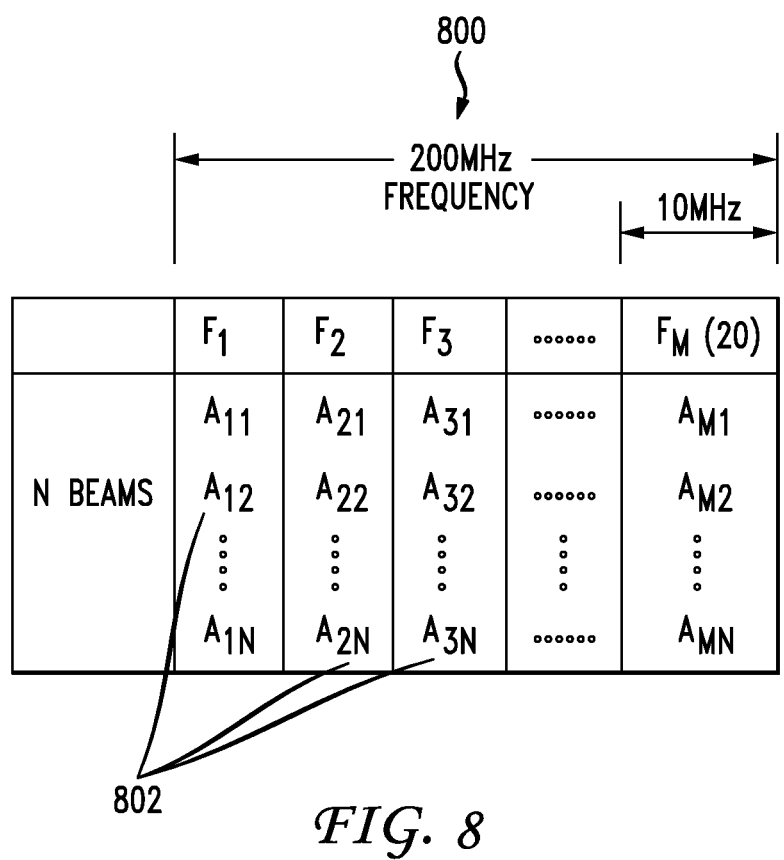
FIG. 8 illustrates a graph of the frequency and beam selections that are available in the frequency and SS MMIMO/BFN system disclosed herein.

FIG. 8 illustrates a table of data 800 associated with the selection of frequency sub-units. The table 800 represents a 200 MHz system with 20 frequency sub-units, each 10 MHz in bandwidth. In this table, there are M frequency sub-units (20), and N beams. Each entry 802 in the table represents a frequency sub-unit for a particular beam. Of course, the particular bandwidths are meant as exemplary only. The composite frequency can be between 100 MHz and 400 MHz, and the sub-units can be anywhere between 1 MHz and 50 MHz. Thus, when the system utilizes this table, or a similar database or algorithm when choosing frequency sub-units, the following exemplary scenario may be followed.

A user turns on her device or user equipment (UE). The user selects an application on the UE such as a texting application, phone application, email application, Internet application, uploading/downloading application, video streaming application, and so forth. The UE sends a signal to a device such as a base station, eNB or remote radio head (RRH). The signal can identify the UE, its location, and include parameters associated with the type and/or amount of data that will be used with the application. The RRH can send a request to the EPC device 740 or other device or service that could perform an analysis, to receive an assignment to get data associated with the frequency sub-units assigned for the UE to communicate data from the RRH to the UE. The EPC 740 is a framework that provides for a convergence of voice and data on networks such as 4G networks or 5G networks. The EPC 740 can include such components as a mobility management entity that manages session states and authenticates and tracks users across the network. It can serve as a serving gateway to route data packets across the network. The EPC 740 can include such functions as a packet data node gateway to act as the interface between different networks and can manage the quality of service and provide packet inspection. Policies and rules can be implemented and enforced through the EPC 740 as well.

In one aspect of this disclosure, some of the functionality disclosed herein can be provided by any device that is configured to perform the functions. However, one example is the EPC 740, which can be modified to include the functionality related to improved beamforming using the selected frequency sub-unit(s) as disclosed herein.

The RRH or EPC returns an exemplary set of frequency sub-units such as numbers 12, 13, and 18, which would correspond to $F_{12}$, $F_{13}$, and $F_{18}$ in the table 800. The location of the UE or the direction of the UE can also be identified or received. A particular beam of the N beams can be assigned as well. The beam assignment can be based on one or more of a number of factors including distance, direction, mismatch parameters, interference issues, cost, priority of user, data needed, past history of transmissions using beam N, etc. For example, for Beam 2, frequency 12, the frequency sub-unit 802 assignment would be $A_{12,2}$. Next, the system shown in any of FIGS. 7A-7E needs to perform the signal processing such that a beam may be formed in the appropriate direction using frequency sub-units 12, 13, and 18, and beam assignments.

Now, the UE might have particular upload needs, which may differ from its download needs. Thus, the uplink in the communication may only utilize frequency sub-units 12 and 13, or may utilize other frequency sub-units such as numbers 5 and 8. Thus, the UE can send data on the same frequency sub-units, different frequency sub-units, or a combination of some that are the same and some that are different. In this manner, beamforming may occur in one direction in the downlink communication between the RRH and the UE, or in both directions (on the uplink and the downlink) in the communications between the UE and the RRH. For example, if the UE has two or more antennas, and UE has the ability (via signal processing power and transmission power) to perform uplink beamforming, then the UE could perform any of the steps disclosed herein. Thus, the UE could transmit beams in particular directions on the uplink, wherein the beams are transmitted based on assigned frequency sub-units, and based on any of the other beamforming techniques and parameters disclosed herein.

It is further expected that the RRH would continue to analyze and refine the communication utilizing the assigned frequency sub-units such that modifications through the communication, if necessary, could occur. For example, the level of mismatch shown in FIG. 5H between the difference in amplitude and the difference in group delay can change over time given a number of factors such as movement of the UE, changes in atmospheric conditions, changes in the amount of data and other factors. Accordingly, if the UE is receiving streaming video on the downlink from the RRH, and frequency sub-units numbers 12, 13, and 18 are assigned, during that transmission, the amount of mismatch associated with the frequency sub-unit 18 could change or increase dramatically. Any of the factors identified above could change as well, such as data needs, priority and so forth. In this case, the system can maintain the use of frequency sub-units 12 and 13, and switch from number 18 to number 4 given the change in conditions such as that the mismatch associated with frequency sub-unit number 4 is less than the recently changed mismatch associated with frequency sub-unit number 18. In this manner, the system can dynamically adjust and refine the frequency sub-unit allocations for communication between the RRH and any given UE.

Figure 9:
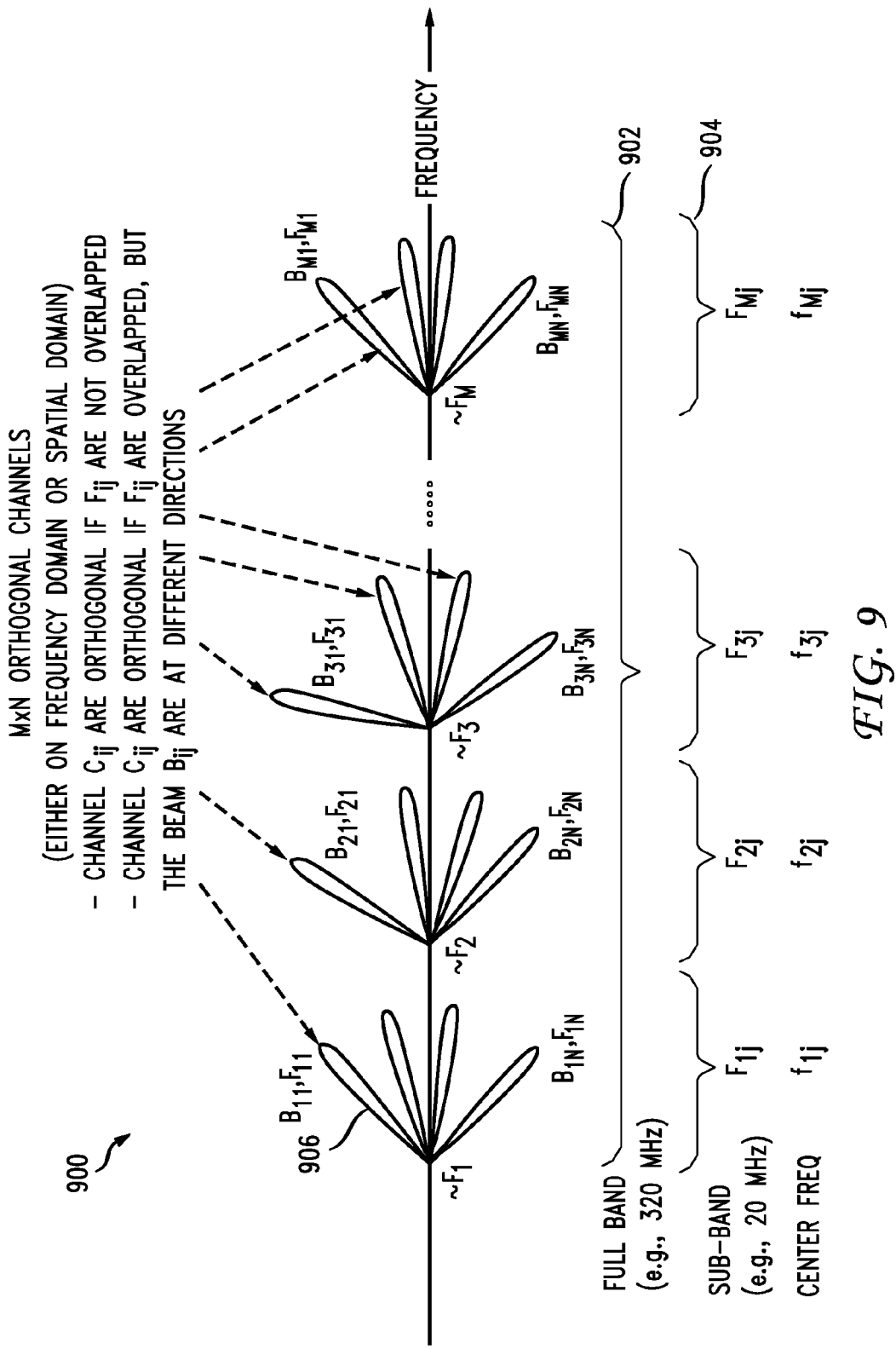
FIG. 9 illustrates the concept of multi-dimensional orthogonality of SS MMIMO/BFN.

FIG. 9 shows various beams 900 illustrating the concept for multi-dimension orthogonality of sub-band MMIMO/BFN. The number of orthogonal channels, with a particular channel being designated as $C_{ij}$ in FIG. 9, can be M×N, where M is the number of sub-bands and N is the number of beams 906 via an array of antennas per sub-band, as introduced in table 800. Thus, the total number of beams can be M×N. In the example of FIG. 9, the composite spectrum of bandwidth 920 is 320 MHz and is partitioned into 16 (M) sub-bands: $F_1, F_2, F_3, \ldots, F_{16}$, each with 20 MHz bandwidth 904. Sub-band $F_1$ is using MMIMO/BFN to transmit 12 (N) beams targeting 12 locations per frequency. Because the 12 beams on a particular frequency are targeting different 12 locations, they are orthogonal. A similar structure is applied and repeated for $F_2 \ldots F_M$ to create altogether 16×12=192 beams. The 192 beams are orthogonal because either (1) they have different frequencies (via a filtering/tuning process) or (2) they have the same frequency but have a different direction (with non-overlapping beams). The different directions for respective beams are illustrated in FIG. 9. It is noted that while FIG. 9 shows equal sub-band bandwidths of 20 MHz, the disclosure contemplates a variable bandwidth per $F_{ij}$. The system can, for example, not only select a frequency and a direction, but based on some other parameters such as data transmission amount, weather conditions, user priority, type of data (e.g., email versus voice call), usage and/or performance of other sub-bands, channel characteristics, etc., the system can select a sub-band bandwidth for a respective beam. Thus, if there is a parameter that indicates a change from a standard 20 MHz bandwidth, the system could increase or decrease the bandwidth for a particular beam to adjust for the parameter. The beam may also include a non-contiguous usage of bandwidths. For example, a beam could be formed using 20 MHz from $F_1$ in FIG. 9 and 20 MHz from $F_3$. Or, the system can expand $F_1$ to be 30 MHz.

In one example, the decision to expand a frequency could also be based on an analysis of a neighboring frequency that could be reduced to accommodate the increase in the neighbor. Assume frequency $F_1$ requires a large amount of bandwidth for some reason. Assume the system performs an analysis on the usage of the system and determines that although the data transmitted using $F_2$ is using 20 MHz, that a parameter indicates that it only requires a low data transmission rate, the system could increase $F_1$ to 30 MHz and simultaneously (or relatively close in time) reduce $F_2$ to 10 MHz. This change could be dynamic to the user of $F_2$ such that it automatically occurs while that user is transmitting or receiving data. In this manner, the system can receive a request for data transmission, analyze use of beams (sub-band units and directions for beams) in the system, and based on results from the analysis, adjust (e.g., broaden or reduce from a predetermined bandwidth) the bandwidth for a beam for the request and make a corresponding adjustment (e.g., broaden or reduce from an existing bandwidth used for a communication) to a currently transmitting beam.

In another example, assume that a particular frequency sub-unit is centered around a zero mismatch frequency. Next assume that given the movement of the receiving device, and a change in channel conditions, that the zero mismatch frequency changes. Thus, the optimal mismatch value (zero) no longer is centered in the sub-unit spectrum. In one example, a sub-unit could be enabled to slide such that it follows the zero mismatch position to keep that optimal frequency as its center frequency for efficiency. Other sub-units could move around or be modified to maintain the adaptive sub-unit.

The sub-band $F_i$ frequencies can be assigned to 12 locations $A_{i,1}$ to $A_{i,12}$, and the $F_i$ frequencies can be expressed as $F_{ij}$, where $j=[1,16]$. Various types of MMIMO/BFN can be used to perform beamforming and to increase data throughput. The technique disclosed herein does not hinder the applications of such MMIMO/BFN algorithms. An advantage of this technique is the degree of freedom available when beamforming using an array of antennas in which beams can be reused for different sub-bands to achieve high performance.

Figure 10:
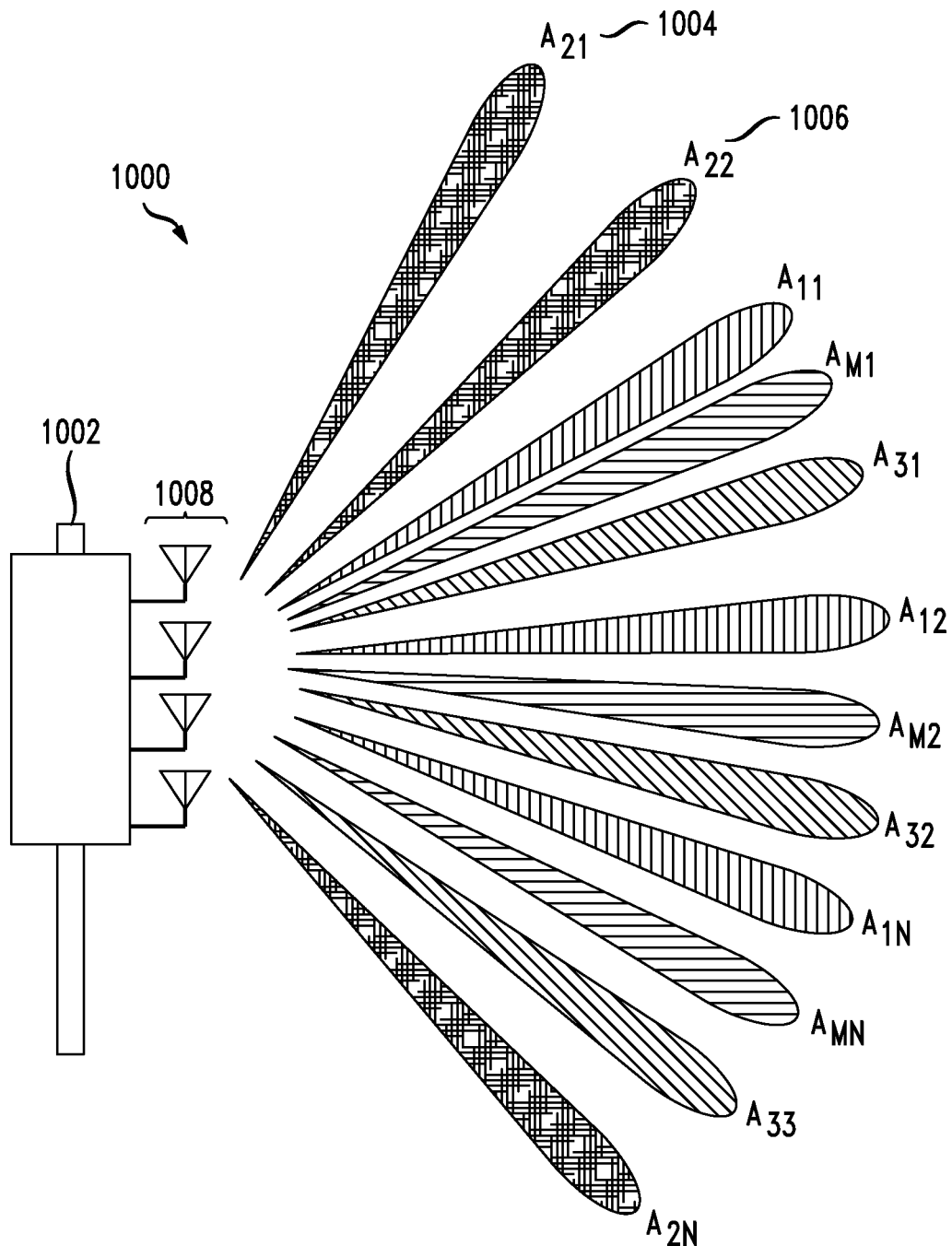
FIG. 10 illustrates the beamforming using the disclosed system.

FIG. 10 illustrates one aspect of the variation of the characteristics of individual beams. In the system 1000, the base station or RRH 1002 transmits a number of different beams to different users via a plurality of antennas 1008. Four antennas are shown but the number could range from 2 to 256 or more. For example, a large antenna array may consist of 64 to 256 individual antennas. In this example, there are M frequency sub-units available and N beams. The various beams shown in FIG. 10 illustrate the individual signal sent on each beam. For example, the various signals shown in FIG. 10 can correlate to the table of FIG. 8. Signal $A_{21}$ shown as feature 1004 represents the signal transmitted on a beam from the second frequency sub-unit transmitted on the first beam. The designation of the first beam can correspond to a direction of the beam. Signal $A_{22}$, feature 1006, represents the beam transmitted on the second frequency sub-unit on the second beam. In this manner, the various beams can be distributed on frequency sub-units in such a manner to increase the capacity or the number of available beams using power more effectively and done in such a way that can be more tailored to the specific data requirements for an individual UE. In other words, a UE performing a texting application, for example, may not need 200 MHz of bandwidth in a beam formed as is shown in FIG. 10.

Furthermore, it is noted that not only can the frequency sub-unit be selected based on the mismatch between the difference in amplitude and the difference in group delay, but the directions for individual beams shown in FIG. 10 can be chosen in such a way as to reduce or simplify the amount of equalization or calibration in compensation that may need to be performed. Thus, not only can the frequency sub-unit be selected based on that mismatch, but the direction can also be chosen based on that mismatch or any other factors disclosed herein.

Figure 11:
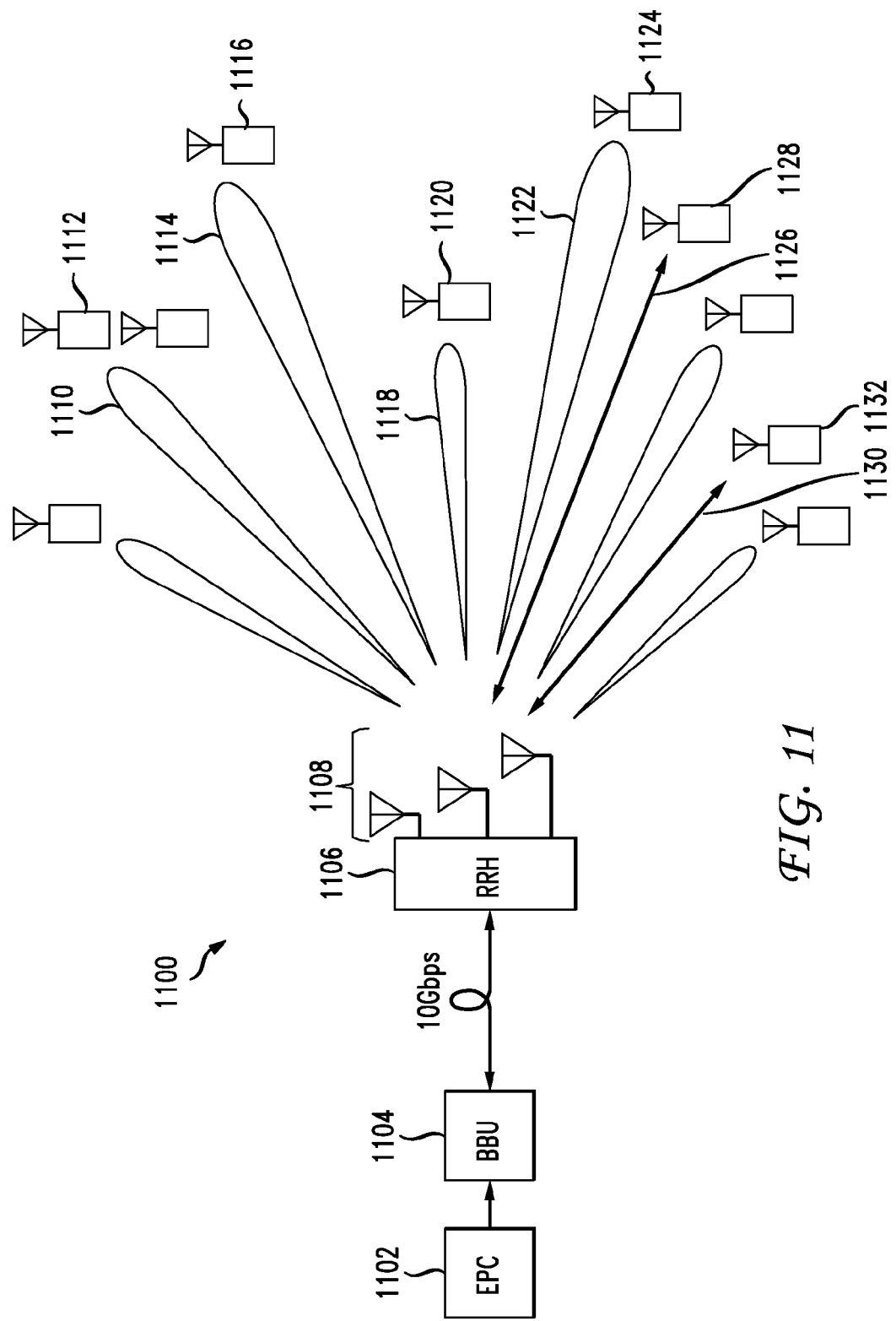
FIG. 11 illustrates beamforming and nulling with various devices in a cell.

FIG. 11 illustrates another example of the system including the creation of nulls. The EPC 1102 transmits data to the baseband unit BBU 1104, which communicates that data at a particular data rate, such as 10 Gbps, to the RRH 1106, which transmits and receives signals to and from antennas 1108. As is shown in FIG. 11, beam 1110 is transmitted in a direction of UE 1112. Note that beam 1110 also has a range that is shorter than a range of other beams such as beam 1114 which transmits data to UE 1116. Shorter beam 1118 is used to transmit data to UE 1120. Beam 1122 is used to transmit data to UE 1124. Also represented in FIG. 11 is an interfering device 1128. The interfering device 1128 can represent a device on a different network or a device that is transmitting data on frequencies that may cause interference with the system 1100.

Signal 1126 represents the transmission of a null in the direction of UE 1128. Similarly, feature 1130 represents a null transmitted or created in the direction 1130 interfering UE device 1132. The choice of the characteristics of a null (e.g., strength, distance, frequency, bandwidth, etc.) can be based on one or more of the factors disclosed in this application. Additional cell-related concepts regarding beamforming and the use of nulls will be presented below with FIG. 14.

Figure 12:
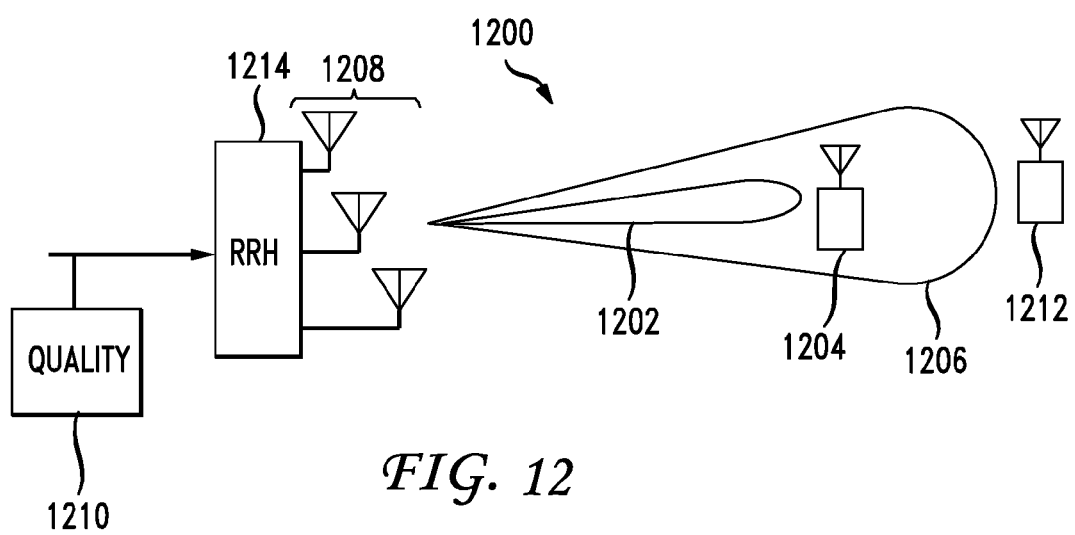
FIG. 12 illustrates multiple beams in a same direction using different frequencies and ranges.

FIG. 12 illustrates the use of beamforming with respect to creating different ranges for the transmitted beams. A quality parameter 1210 can be identified for a particular UE which can include an indication of the range of the UE relative to the RRH 1214. Data associated with the quality of a signal can include a bit error rate, signal-to-noise ratio, and distortion values. The system 1200 has a plurality of antennas 1208 for use in beamforming. If UE 1204 is one half kilometer away from RRH 1214, then a beam 1202 of a shorter range, using less power, can be transmitted to adequately service the data needs of UE 1204. Utilizing the concepts disclosed herein, an appropriate frequency sub-unit could be selected to transmit in the direction of 1204 to meet those needs. Similarly, assume that UE 1212 is in the same direction from RRH 1214 as UE 1204. However, assume that UE 1212 is 2 kilometers away from the RRH 1214 and thus has a greater range. Beam 1206 can be transmitted from RRH 1214 to communicate data according to the needs of UE 1212. In one example, because UE 1204 is much closer to the RRH 1206 than UE 1212, and because less power is required to create beam 1202 relative to beams 1206, the system could choose a frequency sub-unit for use in connection with beam 1202 that has a greater mismatch relative to the mismatch associated with the frequency sub-unit used to transmit beam 1206. This could be because it is tolerable to require some power to perform equalization for beam 1202 because its range is much less than beam 1206. Thus, the selection of frequency sub-units based on any factors disclosed herein including the amount of mismatch between the difference in amplitude and the difference in group delay can also have bearing relative to the range required for a particular beam. Further, the bandwidth for each sub-unit associated with beams 1202, 1206, as well as any other parameters, can be chosen to tailor the beams 1202, 1206 appropriately.

Figure 13:
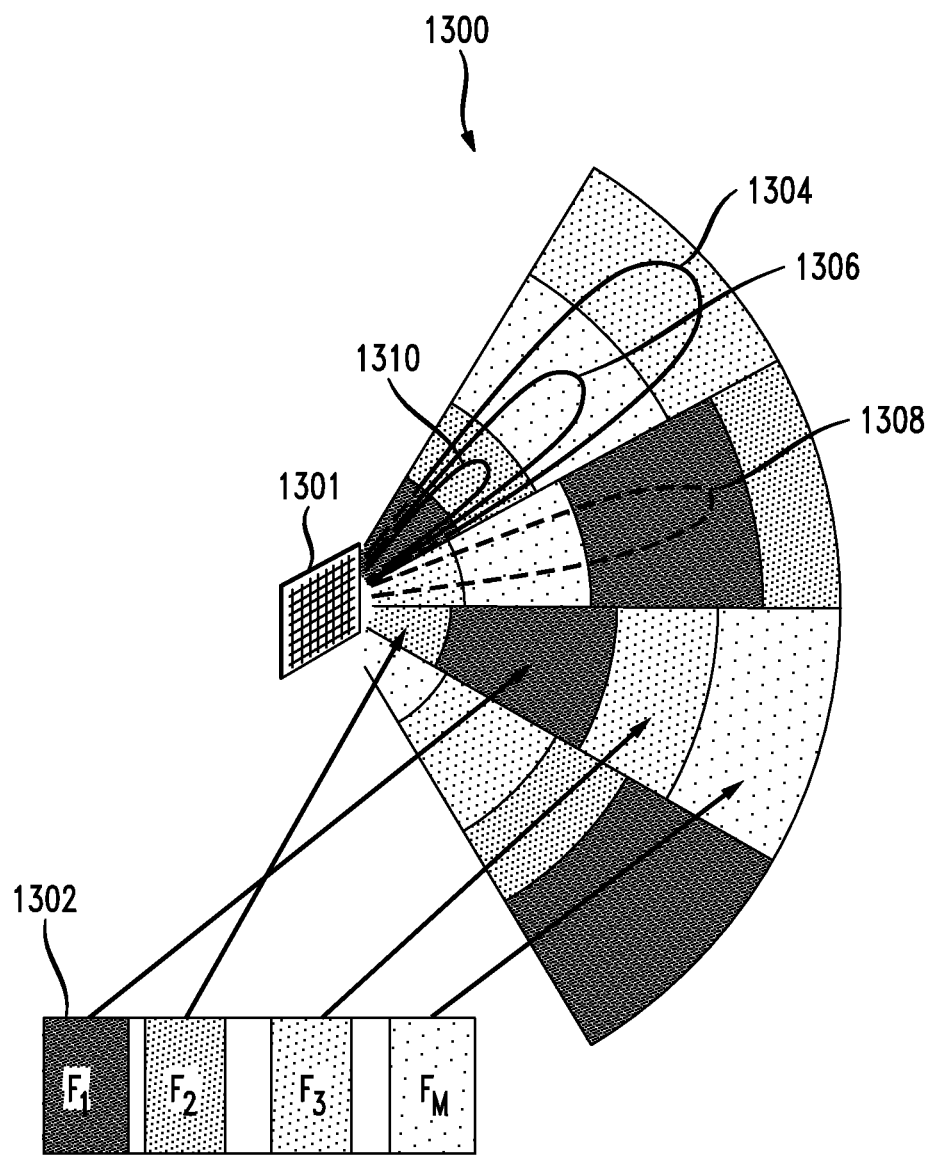
FIG. 13 illustrates an example polar cell assignment of permuted sub-bands.

FIG. 13 illustrates an approach 1300 of providing various beams including nulls for interference suppression. Within the coverage area of a base station 1301, or even beyond the coverage area, numerous sources of interference can exist. The SS MMIMO/BFN algorithm with a large number of antennas has sufficient degrees of freedom to suppress such interference. The advantage of this technique is that the interferer would be narrowband, and the MMIMO/BFN would null a narrow band of spectrum in the direction of the interfering signal without wasting the whole available frequency spectrum in that direction. For example, the system 1301 could structure a narrow beam (1-5 MHz) 1308 in the direction of interference to suppress the interference. This allows the system 1301 to achieve high signal-to-interference ratio (SIR) of, for example, 40 dB interference rejection or better.

Alternatively, the baseband processor 1301, knowing the location (or direction) of the interferers, can adjust the frequency planning such that a non-interfering sub-band would be assigned to the direction of the interferers. This permits the orthogonality between the user channel and the interference channel.

FIG. 13 also introduces a concept of cell deployment with orthogonal channels. The SS MMIMO/BFN technique is used to develop the signaling structure to provide large coverage. The coverage can be divided into polar cells shown in FIG. 13, square cells introduced in FIG. 14, hexagon cells or cells of other shapes. In this technique the eNB 1301 could have M×N orthogonal channels (channel=sub-band and beamforming), where M is the number of sub-bands and N is the number of beams the array antenna can support. Polar cells can be practical for a stadium or in rural areas since people are located around the center. FIG. 13 shows an example of the use of polar cells where the beams are formed with equal angular spacing and the bandwidth services the beam, where the bandwidth is divided into sub-bands distributed along the beam direction. With sub-band frequency permutation, the channels to the polar cell are orthogonal.

Feature 1302 shows different frequencies $F_1$, $F_2$, $F_3$, $F_4$. These are shown as being assigned to beams in a same direction but having different, orthogonal frequencies. The "cells" are also illustrated in a polar fashion with different sizes. For this deployment, the sub-band bandwidths do not need to be equal, and the cell areas do not have to be uniform.

Beams 1304, 1306, 1310 are also shown as being directed to different cells in the system. Null 1308 is also shown as being directed to a certain cell.

Figure 14:
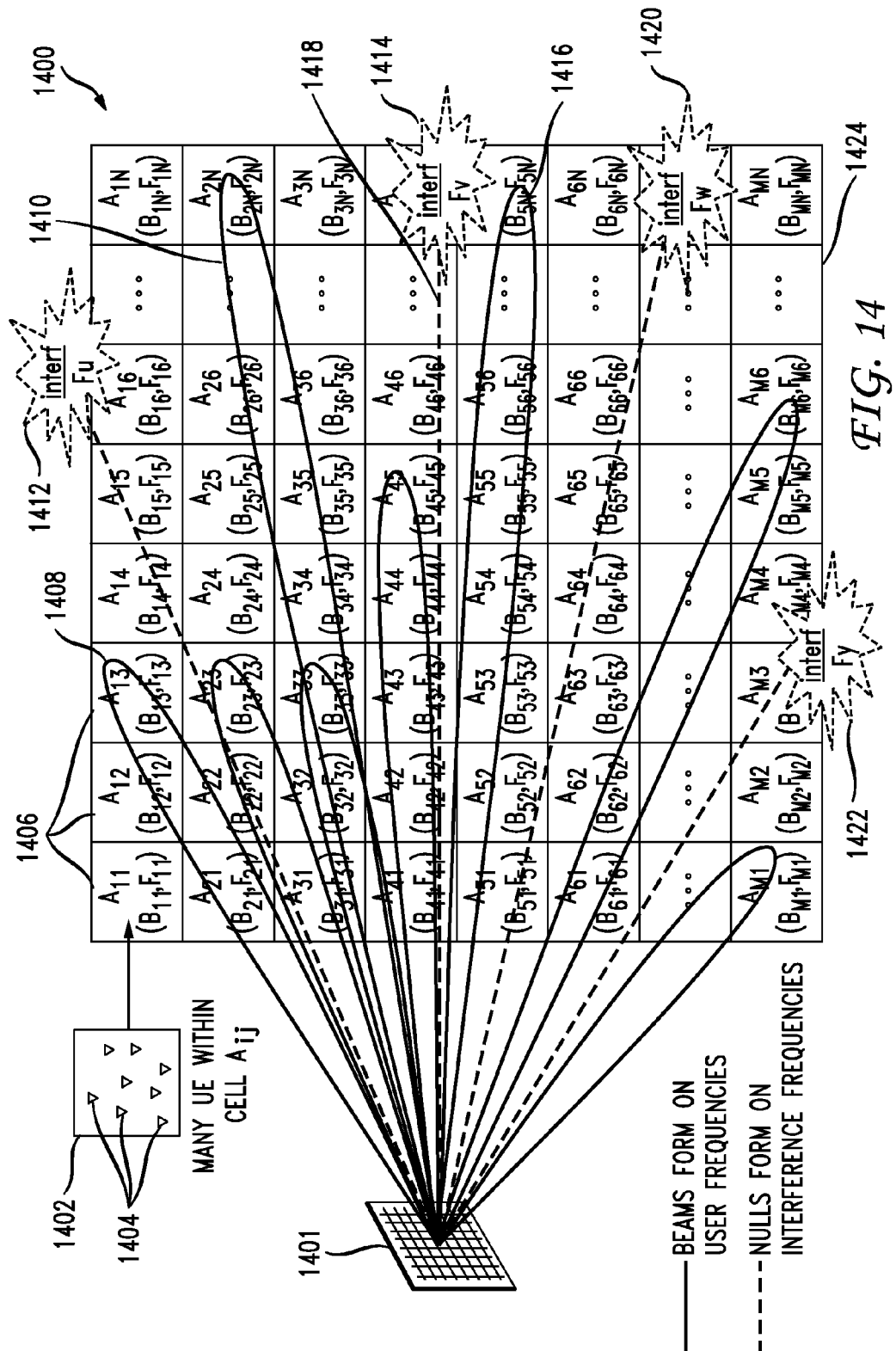
FIG. 14 illustrates an example of a square cell assignment of frequency sub-bands and beams showing channel orthogonality.

FIG. 14 illustrates a system 1400 having a square cell assignment of frequency and beams showing the channel orthogonality. A mapped region 1424 is assigned a number of cells that can be used to generate targeted beams and/or nulls. The square cell planning scenario 1424 is relatively straightforward. Many UE's 1404 are within a cell 1402. The cell units can be designated as $A_{ij}$. Each cell unit $A_{ij}$ has an associated Beam Number $B_{ij}$ and frequency $F_{ij}$. The use of "$B_{ij}$" refers to MMIMO beam steering for the sub-band $F_{ij}$. One channel is typically dedicated to a particular cell. The square cell scenario is practical for most scenarios such as city streets, shopping areas, etc., because the streets and walkways are often in surrounding square blocks. FIG. 14 shows an example of the rectangular cells where the cells are forming grids.

With the deployment of FIG. 14, an area is divided into M×N cells. N sub-bands are permutated and assigned by the system 1401 to the cell in such a way that the frequencies are not close to each other in order to provide channel orthogonality. As shown in FIG. 14, beam 1408 is directed to cell $A_{13}$. Beam 1410 is directed to cell $A_{2N}$. Beam 1416 is directed to cell $A_{5N}$. Similarly, nulls are also created and directed to reduce interference. For example, interference $F_v$ 1414 is handled by null 1418. A hexagon cell deployment is similar to that of rectangular cell deployment. Other shapes such as circular cells or triangle cells could also be determined.

In another aspect, an assignment of cell shapes and structures could include varying shapes and/or sizes. The decision on how to structure different sizes and/or shapes can be based on one or more of contours of the physical land, buildings, vehicles, trees or bushes, weather patterns, moisture in the air, time of day, expected patterns of users in various areas, and so forth. For example, the cell assignments within the region may change during rush hour when many users are on the street and making calls or receiving data. The assignments of frequency, bandwidth, beam number, etc. can also change based on these parameters as well. The cell structure can thus change throughout a day as patterns of usage change to improve the use of the spectrum through beamforming. Thus, the cell-based region can be a rectangular region, a square region, a circular region, a polar region, and so forth. The cell-based region can be dynamic and change based on the various factors disclosed herein such as a time of day, a physical configuration of the environment (trees, buildings, etc), a number of devices in a particular area, and location of the devices in the cell-based region. The cell-based region changes according to one of cell size and cell shape. It can also change its overall size and overall configuration of cells. For example, the overall cell-region could change from rectangular cells overnight to a polar cell-region during rush hour.

As shown in FIG. 14, the interference $F_u$ 1412, $F_v$ 1414, $F_w$ 1420, and $F_y$ 1422 are all shown on a border of the mapped region 1424. One concept disclosed herein relates to the alleviation of border or surrounding cell interference. From the above discussion, the frequency sub-bands $F_{ij}$ can be different for each target location $A_{ij}$ as long as $F_{ij}$ for different j are disjoint. The term "$A_{ij}$" refers to a particular cell location to be serviced by a channel $C_{ij}$, which is established via beam $B_{ij}$ on sub-band $F_{ij}$. The cell assignment provides channel orthogonality if the beams are orthogonal (focus only on the target cell). However, in reality, the beams can be wider and cover more than the target cell. The overlapping of these beams would cause interference on the borders of the cells. To prevent the interference effect, the system can create sub-band patterns that are not only disjoint but have large Euclidean distance between the cells with same frequency. The result of providing a large distance between cells can be done by re-ordering or staggering the sub-bands assigned to the cells 1424.

As an example, consider the sub-bands $F_{ij}$ that can be selected from a set of $\{F_1, F_2, F_3, F_4, F_5, \ldots F_M\}$:

$$F_{ij} \in \{F_1, F_2, F_3, F_4, F_5, \ldots, F_M\}.$$

Figure 15:
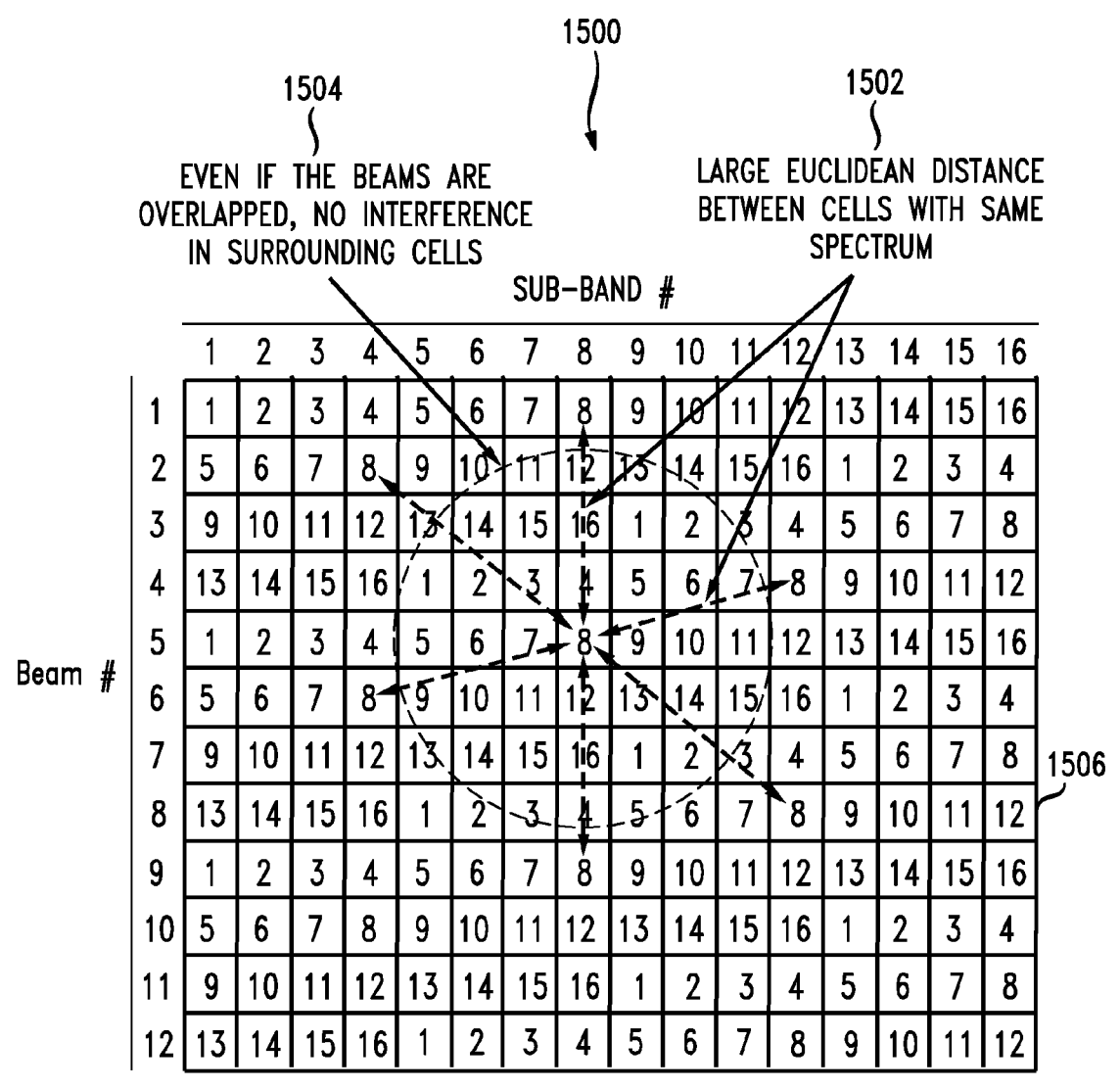

The selected frequency sub-bands can be permutated or staggered to create a pattern that has large Euclidean distances. FIG. 15 shows an example 1500 of sub-bands staggered (by 4) for M=16 and N=12, assigned to 192 cells. The numbers within the region 1506 represent a cell having the same spectrum. For example, the number 8 represents a particular sub-band assignment, i.e. $F_8$. As shown, the number 8 is within a number of different cells at positions (X,Y), where X is the Sub-band# and Y is the Beam#: (8,1), (12,4), (8,5), (4,6), (12,8), and (8,9). Note how each of these cells has a large Euclidean distance between them. In this example, the Euclidean distance is about 7 times the beam radius. The system can make a sub-band frequency assignment for those cells based on UE in those cells but that avoids interference in surrounding cells. The Euclidean distance is large, and the beamwidth has to be larger than 2 times the cell size to create interference. Depending on the number of sub-bands, higher staggering or permutation can further increase the Euclidean distance to avoid beam interference. With these staggering sub-bands, even though the beams are overlapped, the signal has minimal interference from the unintended cells to assure reliable communications. The patterns of distributing these numbers in the cells for reducing interference in this manner can be based on any number of factors rather than or in addition to the distance between cells. Again, the contour of the region 1506 can drive the assignment of cell numbers. Bandwidth needs can drive the assignment as well as cell size. The cells in FIG. 15 can be presented with different sizes and/or shapes. One reason for this might be that in part of region 1506, the typical density of UE's might be large or small. In a large density of users, the size of the cells may shrink to enable focused beams. If part of region 1506 is a cornfield, for example, then the system may not need to have multiple cells for assignment to cover that region.

The approach disclosed herein provides for a large number of orthogonal channels. Next, this disclosure provides two examples that demonstrate how the technique, when applied to Long Term Evolution (LTE) signals, can provide a high data rate transmission. Consider a possible scenario for future radio access communications with the following design parameters:

Total signal bandwidth: 320 MHz
Sub-band bandwidth: 20 MHz (not necessarily equal, but it is used for this illustration)
Number of sub-bands: 320/20=16
Signal type: LTE20 (not necessarily the same, but it is used for this illustration)
Data rate per LTE20: 75 Mb/s for L=1; 150 Mb/s for L=2 (per CPRI Specification v6.0, Aug. 30, 2013)
L: Number of streams in MIMO processing
Number of beams: 12 (that can be supported by array antenna)
Transmit/Receive mode: TDD with T/R ratio of 0.7/0.3

Table 1 shows the data rate for SS MMIMO/BFN for L=1, 2, 4, and 8 with a 320 MHz composite bandwidth.

TABLE 1

| | Channel BW (MHz) | Sub-band BW (MHz) | No. sub-bands | No. beams for Array Antenna | No. Orthogonal Channels | Data Rate per LTE20 (Mb/s) | FDD Data Rate Gb/s | FDD Channel Efficiency (b/s/Hz) | TDD Data Rate @ TR = 0.7/0.3 (Gb/s) |
|---|---|---|---|---|---|---|---|---|---|
| L = 1 | 320 | 20 | 16 | 12 | 192 | 75 | 14.4 | 45 | 10.08 |
| L = 2 | 320 | 20 | 16 | 12 | 192 | 150 | 28.8 | 90 | 20.16 |
| L = 4 | 320 | 20 | 16 | 12 | 192 | 300 | 57.6 | 180 | 40.32 |
| L = 8 | 320 | 20 | 16 | 12 | 192 | 600 | 115.2 | 360 | 80.64 |

Consider two cases: In a case 1, for L=1, the MIMO has single stream on the MIMO processor. With a single stream, beamforming and nulling is used. Using beamforming and nulling will support a channel efficiency of 45 b/s/Hz, Frequency Division Duplex (FDD) downlink rate of 14.4 Gb/s, and a Time Division Duplex (TDD) downlink data rate of 10 Gb/s. The advantage for the first case (L=1) is that the data rate is not sensitive to the channel condition, especially for centimeter wave or millimeter wave signals (mostly line of sight (LOS) as it has low reflection/refraction characteristics), and can be used with a UE with a single antenna and without MIMO. Furthermore, the technique of the first case is simpler to implement both for the MMIMO processing and from the MMIMO algorithm because of L=1.

In a second case, for L=2-8, the MIMO has multiple streams on the MIMO processor. For the second case, in addition to the beamforming and nulling, the data rate is increased. The second case will support a channel efficiency of 90 b/s/Hz, and a TDD downlink data rate of 20 Gb/s. The uplink could be improved as well. However, the data rate is only supported if the UE has 2-8 antennas, and the channel is subjected to a rich multipath environment. For this reason, the cases where L=2-8, the performance for centimeter wave or millimeter wave signals (mostly LOS type) may have some limitations. In addition, the MIMO processing and especially the required algorithms implemented on the eNB and the UE can be more complicated. One of skill in the art would understand the basic components needed to implement the improvements disclosed herein.

Figure 16:
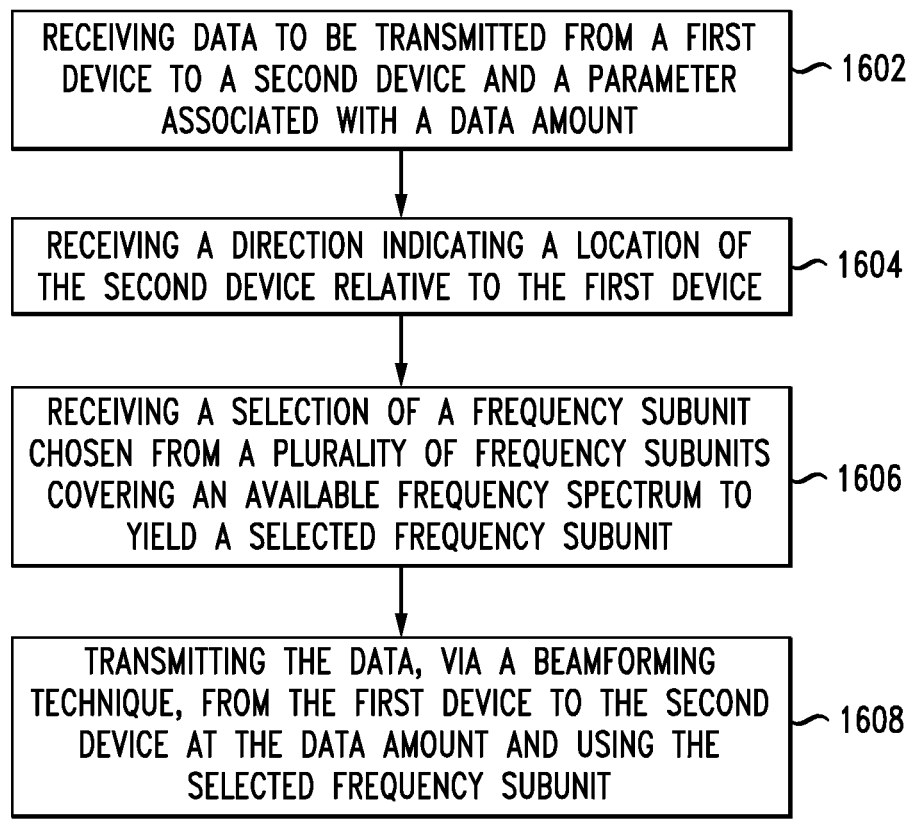
FIG. 16 illustrates an example method of this disclosure.

FIGS. 16-21 illustrate various aspects of this disclosure from a general system point of view to methods practiced on different devices such as a base station and a mobile device. FIG. 16 illustrates a first method example of the disclosed concepts. The method can be practiced by a device, which can be a stationary device or a mobile device. Typically, the device will have multiple antennas to enable it to perform beamforming. The device can be transmitting on the uplink or the downlink of a communication between two devices or may be a peer-to-peer communication. The number of antennas will preferably be between 2 and 256, although more antennas are also contemplated. The number of antennas can depend on the application. A handheld device might have 1-8 antennas, while a vehicle may have 1-32. A train or plane may use 32-64. A repeater or a remote radio head (RRH) will likely use between 32-256. The method includes receiving data to be transmitted from a first device to a second device, and a parameter associated with a data amount/type (1602), receiving a direction indicating a location of the second device relative to the first device (1604), receiving a selection of a frequency sub-unit chosen from a plurality of frequency sub-units covering an available frequency spectrum to yield a selected frequency sub-unit (1606), and transmitting the data, via a beamforming technique, from the first device to the second device at the data amount/type and using the selected frequency sub-unit (1608). In one example, the first device is a base station and the second device is a mobile device. In another example, the first device is a mobile device and the second device is a base station. In yet another example, both the first device and the second device can be mobile devices. In still yet another example, both the first device and the second device can be base stations.

The parameter associated with the data amount/type can relate to an application on the second device, the application chosen by a user and requiring the data. For example, when the user of the second device chooses a texting application, that application will inherently require less data than a video streaming application. The differences in the amount of expected data to be transmitted in total or on a per second basis can be a factor in determining which frequency sub-unit(s) and/or how many frequency sub-units are assigned to the second device for communication of data from the first device.

The selected frequency sub-unit(s) can be selected based on at least one of the direction, the data amount/type, a latency parameter, an application chosen for use on the receiving device, a priority of the receiving device, atmospheric conditions, a distance between the first device and the second device, and a mismatch between an amplitude differential and a group delay differential. The amplitude differential can be associated with different amplitudes of different signals transmitted from different antennas from the first device. The group delay differential can be associated with phase delay differences between the different signals transmitted from the different antennas from the first device.

The selected frequency sub-unit can have a fixed frequency width or a variable frequency width. The choice of the width can depend on one or more of the factors disclosed herein such as data needs, environment conditions, a priority of the user relative to other users, and so forth. Similarly, the selected frequency sub-unit can have a fixed frequency range or a variable frequency range. A set of frequencies within the selected frequency unit can be variable and can be chosen based on a mismatch between an amplitude parameter and a group delay parameter across the available frequency spectrum. The set of frequencies, and any other parameter associated with beamforming, can be chosen based on any factor related to reducing energy usage or equalization/compensation issues for forming any given beam. For example, there may be a case where, although a certain frequency sub-unit has a very low mismatch value, there is some other factor such as interference, or atmospheric absorption of the signal versus the range needed for a user device, that causes the system to select a different frequency sub-unit that might have a higher mismatch but be more acceptable when considering other parameters.

The amplitude parameter can include an amplitude differential which identifies differences in amplitude between a first signal transmitted from a first antenna and a second signal transmitted from a second antenna. The group delay parameter can include a group delay differential which identifies a difference in delay from the first signal and the second signal. In another aspect, the amplitude differential can reflect differences in amplitudes between more than two antennas and can reflect a number of different ways of identifying or characterizing amplitudes across multiple antennas to determine a value which indicates how well the plurality of antennas is actually performing. In a similar manner, the group delay can characterize delay issues across the plurality of antennas which can include more than two antennas.

The set of frequencies within the selected frequency sub-unit can be chosen based on characteristics of the mismatch between the amplitude differential and the group delay differential. Transmitting signals from a plurality of antennas from the first device can result in a signal with characteristics that cause a null in a second direction.

The selection of the frequency sub-unit is based in part on a parameter associated with how the first device can equalize any mismatch in frequencies associated with the selected frequency sub-unit between an amplitude parameter and a group delay parameter.

The data that is transmitted can include a first portion of data and the transmitting can include transmitting the first portion of data. This is often the case where the data is a stream with various portions being transmitted in series. The method can include, after transmitting the first portion of data, receiving a selection of a second frequency sub-unit to yield a second selected frequency sub-unit and transmitting a second portion of data to the second device using the second selected frequency sub-unit. A frequency range in the second selected frequency sub-unit can differ from a frequency range of the selected frequency sub-unit.

Figure 17:
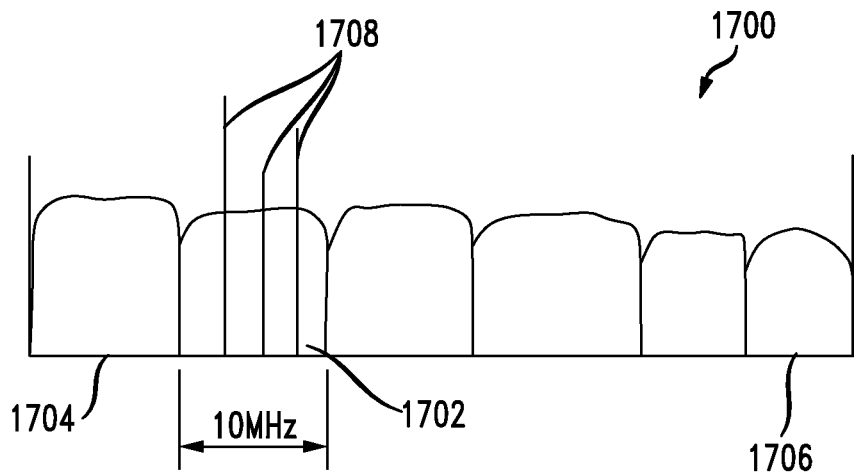
FIG. 17 illustrates spectral incision.

Another aspect of this disclosure relates to excising particular narrow frequencies out of a sub-unit. The system can determine a subset of frequencies within the selected frequency sub-unit that experiences interference and excise the subset of frequencies within the selected frequency sub-unit when transmitting the data. An example of such excising is shown in FIG. 17. In graph 1700, various frequency sub-units 1702, 1704, 1706 are shown. In a chosen frequency sub-unit 1702 which has a bandwidth of 10 MHz, there are narrow bands of spectrum 1708 in which interference exists. The system can excise such narrow spectral components by nulling or removing the "bins" within a sub-unit. For example, after the inverse Fourier Transform in signal processing, and prior to transmission from the antennas, the system can perform spectral excision on the interfering frequencies and otherwise use the remaining frequencies within the chosen frequency sub-unit 1702 for beamforming.

The method can also include receiving a selection of a second frequency sub-unit chosen from the plurality of frequency sub-units to yield a second selected frequency sub-unit. Transmitting the data can further include transmitting the data, via the beamforming technique, from the first device to the second device at the data amount/type using the selected frequency sub-unit and the second selected frequency sub-unit. The selected frequency sub-unit and the second selected frequency sub-unit may have a contiguous frequency range or a non-contiguous frequency range. For example, assume that the two frequency sub-units 1704 and 1706 in FIG. 17 are chosen. These are non-contiguous. Frequency sub-units of different spectral widths could also be chosen. For example, sub-unit 1704 in FIG. 17 could be 12 MHz and sub-unit 1706 could be 5 MHz. Both of these frequency sub-units could be chosen for beamforming.

Figure 18:
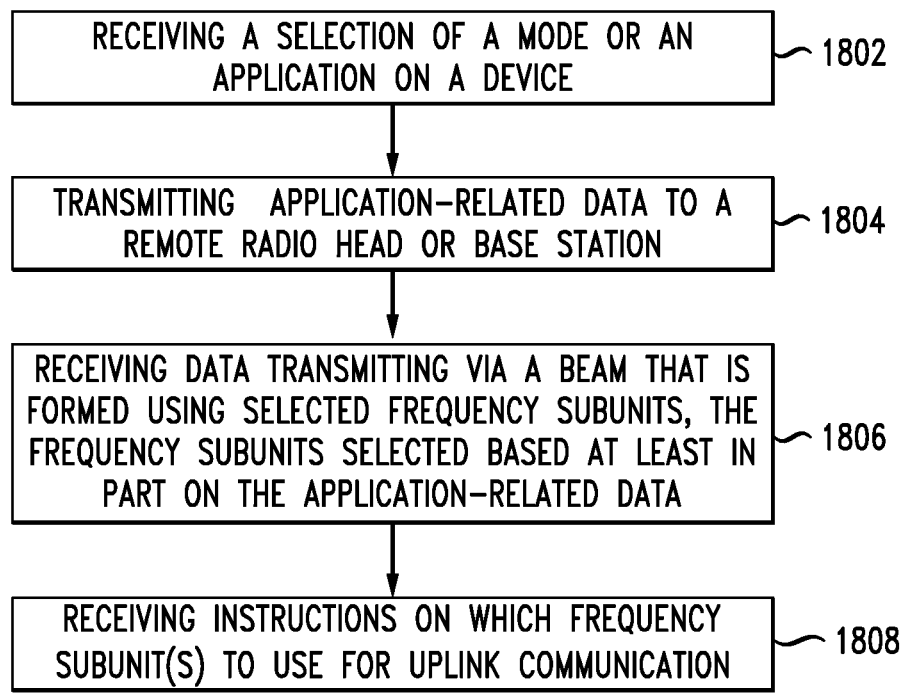
FIG. 18 illustrates another example method.

FIG. 18 illustrates a method example that is practiced on a mobile or user-based device. A user would first turn on the device and would select a mode or an application (1802). For example, the user would select on their iPhone® or Samsung® device or tablet, an application such as a texting application, an email application, a phone application, an Internet browser, etc. Each of these applications would have an expected upload and download requirements for data. A texting application would require much less download data than a streaming video application. A parameter or data is transmitted from the device to a remote radio head or base station (1804). The data can include location of the device to determine a direction for the device relative to the remote radio head. The remote radio head will determine an assignment of frequency sub-unit(s) or request from an EPC, gateway or other device assignment. The remote radio head will utilize beamforming with the selected frequency sub-unit(s) and transmit data in the beam to the user device. The user device will receive the data transmitting via a beam that is formed using selected frequency sub-units, the frequency sub-units selected based at least in part on the application-related data (1806). The selection is preferably done based on a parameter that will reduce the need for equalization or compensation due to mismatch or other factors. The user device can also generate a selection or receive instructions on which frequency sub-unit(s) to use for uplink communication (1808). The user device might have a single antenna and not utilize beamforming, but if so, it can receive instructions from the remote radio head or can generate an assignment from its own analysis of which sub-units to use for uplink communication. The remote radio head can continue to transmit data and to refine its analysis such that updated frequency sub-unit assignment for transmissions can occur if it can improve the efficiency of the system.

Figure 19:
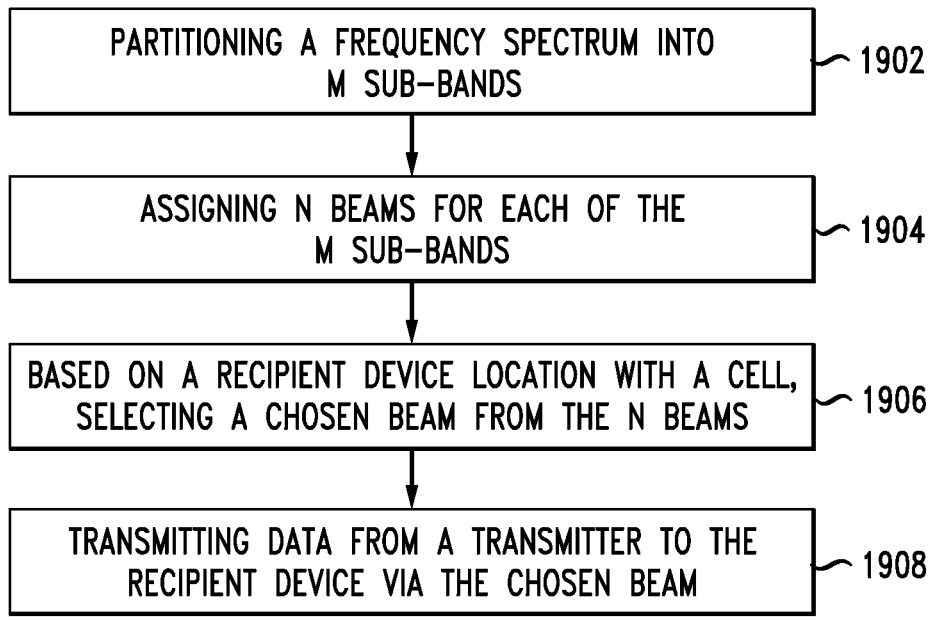
FIG. 19 illustrates another method example related to an overall system algorithm.

FIG. 19 illustrates another method example. In FIG. 19, the method includes partitioning the frequency spectrum into M sub-bands (1902), assigning N Beams for each of the M sub-bands (1904), and based on a recipient device location within a cell, selecting a chosen beam from the N Beams (1906). The values of M and N can be chosen or based at least in part on a number of beams per sub-band that is supported by an antenna array on the system. The use of sub-bands can generate a large number of orthogonal channels (M×N). The final step is transmitting data from the transmitter to the recipient device via the chosen beam (1908). Each of the N beams can have an associated respective range which can be the same or different from other respective ranges. Each of the M sub-bands can cover a same or different frequency range or bandwidth. For example, at least one of the M sub-bands can have a different frequency range from at least one other of the M sub-bands. Other steps can include transmitting the data such that the structure and direction of beams are chosen to provide frequency domain orthogonality and spatial domain orthogonality. The method can also include selecting a chosen beam in such a way as to stagger or provide a permutation of frequency sub-band assignments, which can result in an increase of a Euclidean distance between cells having the same frequency. In this manner, the system can select a chosen beam for the transmission of data that can reduce inter-cellular interference with other beams of the N Beams. The method can further include transmitting a null chosen in a particular direction and/or having a chosen bandwidth to null an interfering signal. The system can include having a pool of null beams that can be available for cancelling or nulling interference wherein the system based on an analysis selects a null beam. For example, some of the M sub-bands with N beams each can be designated as nulls. The selection of nulls can be based on an effort to suppress narrowband interfering signals via a SS MMIMO/BFN beam to null only the interfering bandwidth which can avoid the wasting of spectrum. Nulls can be available in the pool of beams with varying bandwidths and when the system determines a bandwidth of the interference, the system can choose a correlating null from the pool for suppression.

The technique also shows the ability to effectively suppress interference signals by creating narrow-band nulls without wasting the whole spectrum in that direction. In this regard, the system can tailor the null beam bandwidth according to the interference bandwidth. The system can detect, for example, that the interference has a bandwidth of 8 MHz. The system can select a beam that matches the interference bandwidth. In this manner, the system can avoid wasting spectrum on transmitting nulls to suppress interference. If the system is divided into 10 MHz sub-units, in this case, for example, the system could resize the sub-units, transmit an 8 MHz null on a beam, and also expand a data transmitting beam's bandwidth to 12 MHz. This approach is more efficient in the use of the spectrum.

Alternatively, the flexible structure of the SS-MMIMO/BFN system allows the RRH, eNB, or other device to alleviate the interference by not assigning the same frequency on the direction of interference. For example, assume that in a particular direction there are 10 devices communicating with a transmitter. The system will provide frequency domain orthogonality by transmitting data beams on different frequencies. Say a first device receives a beam sub-unit having 10 MHz of bandwidth at the frequencies 120-130 MHz. A second device receives a beam sub-unit having 10 MHz of bandwidth at the frequencies 160-170 MHz. The other devices have their own frequencies for orthogonality. However, assume that an interfering device is also at the particular direction from the transmitter. The interference might be detected to be at sub-band frequencies 150-160 MHz. To avoid this interference, the system can avoid an assignment of a data beam to a device in that direction by not assigning a data beam sub-unit in the frequency range of 150-160 MHz. If the interference spectrum spans multiple sub-units, the system may avoid data beams on the group of sub-units to completely avoid the interfering spectrum.

Transmitting data can also include combining signals in a transmitter that are assigned for different receiving devices. The SS MMIMO signals are combined and then transmitted from a plurality of antennas. As receiving device, the system will receive multiple signals from various transmitters, which signals must be combined after they are received from the transmitting devices. The above principles apply to each example disclosed herein.

Figure 20:
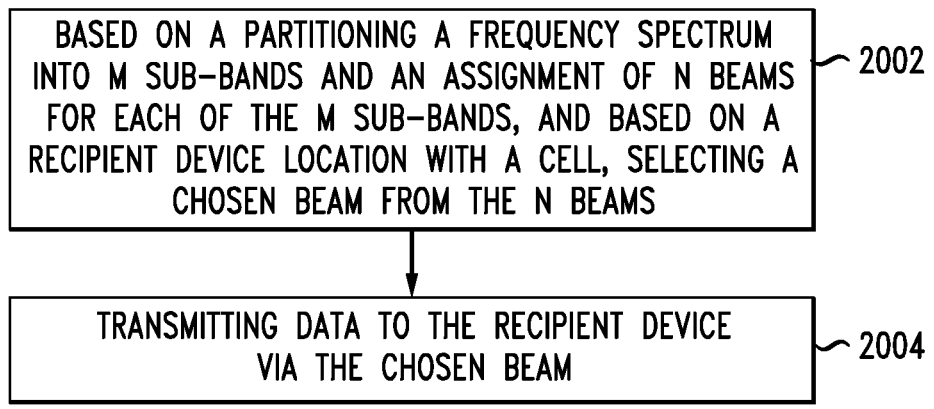
FIG. 20 illustrates yet another method example directed to a base station beam forming process.

The method shown in FIG. 20 includes, based on a partitioning of a frequency spectrum into M sub-bands and an assignment of N beams for each of the M sub-bands, and based on a recipient device location within a cell, selecting a chosen beam from the N beams (2002) and transmitting data to the recipient device via the chosen beam (2004).

Figure 21:
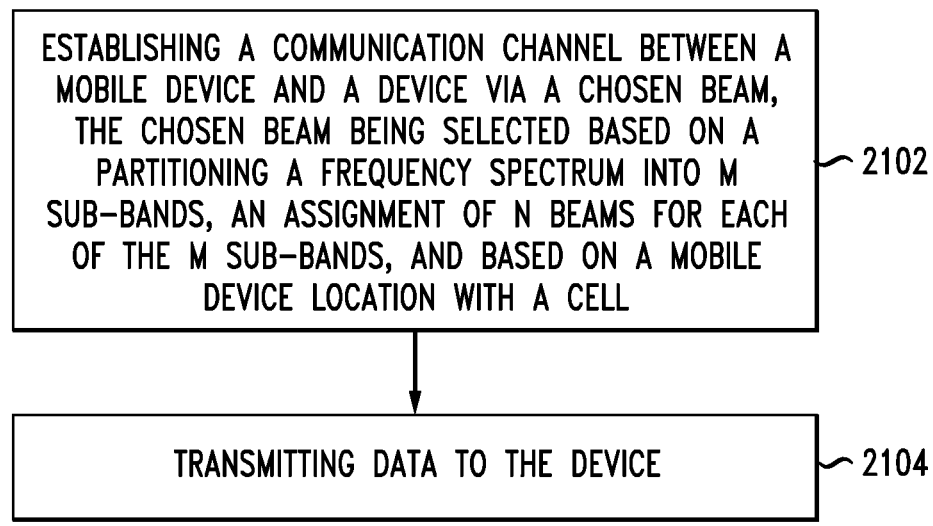
FIG. 21 illustrates yet another example directed to a mobile device process.

The method of FIG. 21 includes establishing a communication channel between a first device and a second device via a chosen beam, the chosen beam being selected based on a partitioning of a frequency spectrum into sub-bands, an assignment of N beams for each of the M sub-bands, and based on the first device location within a region (2102), and transmitting data to the second device (2104). The first device can be a mobile device and the second device can be a base station or similar stationary device. Both devices could also be mobile. In another step of the method, the mobile device receives data from the device via the chosen beam.

The example system disclosed herein includes basic hardware components associated with base stations, remote radio heads, transmission devices, etc. The basic components can include processors, whether virtual, generic or specialized processors for performing certain tasks, memory (e.g., cache, RAM, short-term memory, or long-term memory such as a hard drive or optical disk), input and output devices (e.g., keyboards, touch-sensitive pads, speech sensors, motion sensors, and/or display units), and a communication bus for connecting components together and for communication of data. Any known programming language can be used to program devices to perform any of the functionality disclosed herein and different programming languages will be known to those of skill in the art. In a general system example, a processor and a computer-readable storage medium or device are included. The medium stores instructions which, when executed by the processor, cause the processor to perform certain steps which are disclosed herein. Software modules can also include code which, when executed by a processor, cause the processor to perform certain operations.

One or more parts of the example device can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately, however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

It is expressly stated that the application of the various steps and functions disclosed herein are interchangeable between examples and that any order of the steps is possible. The examples are provided generally to help understand the claims.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. Each example is provided to aid in understanding what is claimed and any individual feature in each example can be mixed and matched with any other feature in a same or different example to aid in understanding the claims. For example, the principles herein apply to speech dialog systems generally and can be used for any application thereof. Various modifications and changes may be made to the principles described herein without following the examples and applications illustrated and described herein, and without departing from the spirit and scope of the disclosure. Claim language reciting "at least one of" a set indicates that one member of the set or multiple members of the set satisfy the claim.

I claim:

1. A method comprising:
receiving data, to be transmitted from a first device to a second device, and a parameter;
receiving a direction indicating a location of the second device relative to the first device;
based on the parameter and the direction, receiving a selection of a frequency sub-unit chosen from a plurality of frequency sub-units covering an available frequency spectrum, to yield a selected frequency sub-unit, wherein a set of frequencies within the selected frequency sub-unit are variable and are chosen based on a mismatch between an amplitude parameter and a group delay parameter across the available frequency spectrum; and
transmitting the data, via a beamforming technique, from the first device to the second device using the selected frequency sub-unit.

2. The method of claim 1, wherein the first device is a base station and the second device is a mobile device.

3. The method of claim 1, wherein the first device is a mobile device and the second device is a base station.

4. The method of claim 1, wherein both the first device and the second device are mobile devices or both the first device and the second device are base stations.

5. The method of claim 1, wherein the parameter is associated with a data type of an application on the second device, the application being chosen by a user and requiring the data.

6. The method of claim 1, wherein the selected frequency sub-unit is selected based on at least one of the direction, a data type, a latency parameter, an application chosen for use on the second device, a priority of the second device, an atmospheric condition, a distance between the first device and the second device, and a mismatch between an amplitude differential and a group delay differential, wherein the amplitude differential is associated with different amplitudes of different signals transmitted from different antennas from the first device, and wherein the group delay differential is associated with phase delay differences between the different signals transmitted from the different antennas from the first device.

7. The method of claim 1, wherein the selected frequency sub-unit has one of a fixed frequency width and a variable frequency width.

8. The method of claim 1, wherein the selected frequency sub-unit has one of a fixed frequency range and a variable frequency range.

9. The method of claim 1, wherein (1) the amplitude parameter comprises an amplitude differential which identifies differences in amplitude between a first signal transmitted from a first antenna and a second signal transmitted from a second antenna, and (2) the group delay parameter comprises a group delay differential which identifies a difference in delay between the first signal and the second signal.

10. The method of claim 9, wherein the set of frequencies within the selected frequency sub-unit are chosen based on characteristics of the mismatch.

11. The method of claim 1, further comprising transmitting signals from a plurality of antennas from the first device having characteristics that cause a null in a second direction.

12. The method of claim 1, wherein the selection of the frequency sub-unit is based in part on a parameter associated with how the first device can equalize any mismatch in frequencies associated with the selected frequency sub-unit between an amplitude parameter and a group delay parameter.

13. The method of claim 1, wherein the data comprises a first portion of data and the transmitting comprises transmitting the first portion of data, the method further comprising:
after transmitting the first portion of data, receiving a selection of a second frequency sub-unit to yield a second selected frequency sub-unit; and
transmitting a second portion of data to the second device using the second selected frequency sub-unit.

14. The method of claim 13, wherein a frequency range in the second selected frequency sub-unit differs from a frequency range of the selected frequency sub-unit.

15. The method of claim 1, further comprising:
determining which frequencies within the selected frequency sub-unit experience interference.

16. The method of claim 15, further comprising
excising the frequencies within the selected frequency sub-unit when transmitting the data.

17. The method of claim 1, further comprising:
receiving a selection of a second frequency sub-unit chosen from the plurality of frequency sub-units to yield a second selected frequency sub-unit, wherein transmitting the data further comprises transmitting the data, via the beamforming technique, from the first device to the second device at a data type and using the selected frequency sub-unit and the second selected frequency sub-unit.

18. The method of claim 17, wherein the selected frequency sub-unit and the second selected frequency sub-unit have one of a contiguous frequency range and a non-contiguous frequency range.

19. A system comprising:
a processor; and
a computer-readable storage medium having instructions stored which, when executed by the processor, cause the processor to perform operations comprising:
receiving data, to be transmitted from a first device to a second device, and a parameter;
receiving a direction indicating a location of the second device relative to the first device;
based on the direction and the parameter, receiving a selection of a frequency sub-unit chosen from a plurality of frequency sub-units covering an available frequency spectrum, to yield a selected frequency sub-unit, wherein a set of frequencies within the selected frequency sub-unit are variable and are chosen based on a mismatch between an amplitude parameter and a group delay parameter across the available frequency spectrum; and
transmitting the data, via a beamforming technique, from the first device to the second device using the selected frequency sub-unit.

20. A computer-readable storage device having instructions stored which, when executed by a computing device, cause the computing device to perform operations comprising:
receiving data, to be transmitted from a first device to a second device, and a parameter;
receiving a direction indicating a location of the second device relative to the first device;
based on the direction and the parameter, receiving a selection of a frequency sub-unit chosen from a plurality of frequency sub-units covering an available frequency spectrum, to yield a selected frequency sub-unit, wherein a set of frequencies within the selected frequency sub-unit are variable and are chosen based on a mismatch between an amplitude parameter and a group delay parameter across the available frequency spectrum; and
transmitting the data, via a beamforming technique, from the first device to the second device using the selected frequency sub-unit.

21. A method comprising:
partitioning a frequency spectrum into M sub-bands;
assigning N beams for each of the M sub-bands;
based on a location of a device relative to a cell, selecting a beam of the N beams having a sub-band chosen from the M sub-bands; and
transmitting the beam from a transmitter to the device, wherein the beam is transmitted in a direction associated with the location of the device, and wherein the method further comprises transmitting at least one other beam having a same frequency spectrum as the beam but in a different direction from the direction to maintain spatial domain orthogonality.

22. The method of claim 21, wherein the beam is one of a beam for transmitting data to the device and a null for suppressing interference from a second device.

23. The method of claim 21, wherein the beam is chosen relative to other beams transmitted from the transmitter to maintain one of frequency domain orthogonality and spatial domain orthogonality.

24. The method of claim 21, wherein at least one of the M sub-bands has a different frequency range from at least another of the M sub-bands to maintain frequency domain orthogonality.

25. The method of claim 21, wherein selecting the beam from the N beams is further based on reducing possible inter-cell interference with another beam.

26. The method of claim 21, further comprising:
transmitting the beam to a first cell in a cell-based region covered by the transmitter, the beam having a frequency sub-band; and
transmitting a second beam, the second beam covering the frequency sub-band, to a second cell in the cell-based region, wherein the first cell and the second cell are separated by a predetermined distance.

27. The method of claim 26, wherein a plurality of cells in the cell-based region are assigned for beams having the frequency sub-band and wherein each cell of the plurality of cells is assigned to maintain a chosen distance between other cells of the plurality of cells.

28. The method of claim 26, wherein the cell-based region is structured as one of a rectangular region, a polar region, a square region, and a circular region.

29. The method of claim 26, wherein the cell-based region is dynamic and changes based on one of a time of day, a physical configuration, a number of devices, and location of devices in the cell-based region.

30. The method of claim 29, wherein the cell-based region changes according to one of cell size and cell shape.

31. The method of claim 21, wherein selecting the beam of the N beams is based on a parameter associated with a mismatch in one of amplitude and delay associated with transmitted beams from the transmitter.

32. The method of claim 21, wherein the beam has a frequency sub-unit between 5 MHz and 50 MHz.

33. The method of claim 21, wherein the beam is a null and has a bandwidth chosen based on an interference bandwidth.

34. The method of claim 21, wherein the beam is a data beam and has a sub-band frequency assignment chosen to avoid an interference frequency sub-band.

35. The method of claim 34, wherein the beam is chosen having a different sub-band from the interference frequency sub-band.

36. The method of claim 21, wherein a number of available orthogonal channels is defined by M×N, wherein N is a number of beams per sub-band that is supported by an antenna array associated with the transmitter.

37. The method of claim 21, wherein the transmitter transmits on one of an uplink and a downlink.

38. A system comprising:
a processor; and
a computer-readable storage medium having instructions stored which, when executed by the processor, cause the processor to perform operations comprising:
partitioning a frequency spectrum into M sub-bands;
assigning N beams for each of the M sub-bands;
based on a location of a device relative to a cell, selecting a beam of the N beams having a sub-band chosen from the M sub-bands; and
transmitting the beam from a transmitter to the device, wherein the beam is transmitted in a direction associated with the location of the device, and wherein the method further comprises transmitting at least one other beam having a same frequency spectrum as the beam but in a different direction from the direction to maintain spatial domain orthogonality.

39. A computer-readable storage device having instructions stored which, when executed by a computing device, cause the computing device to perform operations comprising:
partitioning a frequency spectrum into M sub-bands;
assigning N beams for each of the M sub-bands;
based on a location of a device relative to a cell, selecting a beam of the N beams having a sub-band chosen from the M sub-bands; and
transmitting the beam from a transmitter to the device, wherein the beam is transmitted in a direction associated with the location of the device, and wherein the method further comprises transmitting at least one other beam having a same frequency spectrum as the beam but in a different direction from the direction to maintain spatial domain orthogonality.

40. A method comprising:
based on a partitioning of a frequency spectrum into M sub-bands and an assignment of N beams for each of the M sub-bands to yield M×N available beams, and based on a location of a device relative to a cell of a cell-based region, selecting a beam from the M×N available beams; and
transmitting the beam to the device, wherein the beam is transmitted in a direction associated with the location of the device, and wherein the method further comprises transmitting at least one other beam having a same frequency spectrum as the beam but in a different direction from the direction to maintain spatial domain orthogonality.

41. The method of claim 40, wherein each of the N beams has an associated respective range and each of the M sub-bands covers a same frequency range.

42. The method of claim 40, wherein at least one of the M sub-bands has a different frequency range from at least one other sub-band of the M sub-bands.

43. The method of claim 40, wherein the beam comprises one of a null and a data beam.

44. The method of claim 40, wherein transmitting the beam is part of one of an up-link communication and a down-link communication.

45. A system comprising:
a processor; and
a computer-readable storage medium having instructions stored which, when executed by the processor, cause the processor to perform operations comprising:
based on a partitioning of a frequency spectrum into M sub-bands and an assignment of N beams for each of the M sub-bands to yield M×N available beams, and based on a location of a device relative to a cell of a cell-based region, selecting a beam from the M×N available beams; and
transmitting the beam to the device, wherein the beam is transmitted in a direction associated with the location of the device, and wherein the method further comprises transmitting at least one other beam having a same frequency spectrum as the beam but in a different direction from the direction to maintain spatial domain orthogonality.

46. A computer-readable storage device having instructions stored which, when executed by a computing device, cause the computing device to perform operations comprising:
based on a partitioning of a frequency spectrum into M sub-bands and an assignment of N beams for each of the M sub-bands to yield M×N available beams, and based on a location of a device relative to a cell of a cell-based region, selecting a beam from the M×N available beams; and
transmitting the beam to the device, wherein the beam is transmitted in a direction associated with the location of the device, and wherein the method further comprises transmitting at least one other beam having a same frequency spectrum as the beam but in a different direction from the direction to maintain spatial domain orthogonality.

* * * * *